US012347366B1

(12) United States Patent
Song

(10) Patent No.: US 12,347,366 B1
(45) Date of Patent: Jul. 1, 2025

(54) DISPLAY DEVICE

(71) Applicant: LG Display Co., Ltd., Seoul (KR)

(72) Inventor: SangMoo Song, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/767,474

(22) Filed: Jul. 9, 2024

(30) Foreign Application Priority Data

Dec. 28, 2023 (KR) .................. 10-2023-0194353

(51) Int. Cl.
*G09G 3/32* (2016.01)
*B60K 35/22* (2024.01)

(52) U.S. Cl.
CPC ............... *G09G 3/32* (2013.01); *B60K 35/22* (2024.01); *B60K 2360/349* (2024.01); *G09G 2320/068* (2013.01); *G09G 2320/0686* (2013.01); *G09G 2354/00* (2013.01); *G09G 2358/00* (2013.01); *G09G 2380/10* (2013.01)

(58) Field of Classification Search
CPC ............... G09G 3/32; G09G 2320/068; G09G 2320/0686; G09G 2354/00; G09G 2358/00; G09G 2380/10; B60K 35/22; B60K 2360/349
See application file for complete search history.

(56) References Cited

U.S. PATENT DOCUMENTS

| | | | | |
|---|---|---|---|---|
| 2019/0061529 | A1* | 2/2019 | Saisho | G02B 26/10 |
| 2019/0191131 | A1* | 6/2019 | Uchida | H04N 9/31 |
| 2019/0304404 | A1 | 10/2019 | Lin et al. | |
| 2019/0392740 | A1* | 12/2019 | Funabiki | G09G 5/10 |
| 2020/0380900 | A1* | 12/2020 | Inamoto | G03B 21/2053 |
| 2022/0393035 | A1 | 12/2022 | Kimura et al. | |
| 2022/0399529 | A1 | 12/2022 | Shin et al. | |

FOREIGN PATENT DOCUMENTS

| | | |
|---|---|---|
| JP | 2012113965 A | 6/2012 |
| JP | 2012118381 A | 6/2012 |
| KR | 20220022002 A | 2/2022 |
| TW | I765486 B | 5/2022 |
| TW | 202244881 A | 11/2022 |
| TW | 202347762 A | 12/2023 |

* cited by examiner

*Primary Examiner* — Andrew Sasinowski
(74) *Attorney, Agent, or Firm* — Seed IP Law Group LLP

(57) ABSTRACT

A display device according to an example embodiment of the present disclosure includes a display panel having a first area comprising a plurality of first pixels, and a second area disposed adjacent to the first area and comprising a plurality of second pixels, and a brightness controller configured to control brightness of the first area, wherein the brightness controller controls brightness of a second optical area included in each of the plurality of first pixels disposed in the first area.

23 Claims, 17 Drawing Sheets

DISPLAY DEVICE

CROSS-REFERENCE TO RELATED APPLICATIONS

This application claims the benefit and priority to Republic of Korea Patent Application No. 10-2023-0194353 filed in the Republic of Korea on Dec. 28, 2023, the entire of which is expressly incorporated by reference for all purposes as if fully set forth herein.

BACKGROUND

Technical Field

The present specification relates to a display device, and more particularly, for example, without limitation, to a display device capable of controlling a viewing angle.

Description of the Related Art

With the advancement of technologies in the modern society, display devices are being used in various ways to provide information to users. The display devices may be included in electronic display boards, which simply transfer visual information in one direction, and also included in various high-technology electronic devices that identify user inputs and provide information in response to the identified inputs.

For example, the display device may be included in a vehicle and provide various information to a driver and a fellow passenger in the vehicle. However, the display device in the vehicle is required to appropriately display content so as not to hinder the operation of the vehicle. For example, the display device needs to restrict a display of content that may decrease the driver's concentration on driving while the vehicle travels.

The description provided in the description of the related art section should not be assumed to be prior art merely because it is mentioned in or associated with the description of the related art section. The description of the related art section may include information that describes one or more aspects of the subject technology.

BRIEF SUMMARY

An object to be achieved by the present specification is to provide a display device capable of minimizing or reducing a problem of visual recognition of a boundary between a first area, which provides content at a wide viewing angle, and a second area that provides content at a wide viewing angle or a narrow viewing angle.

Objects of the present disclosure are not limited to the above-mentioned objects, and other objects, which are not mentioned above, can be clearly understood by those skilled in the art from the following descriptions.

A display device according to an example embodiment of the present disclosure includes a display panel divided into a first area comprising a plurality of first pixels, and a second area disposed adjacent to the first area in a direction opposite to a first direction and comprising a plurality of second pixels, and a brightness controller configured to control brightness of the first area, wherein the plurality of first pixels each comprises a first light-emitting element disposed in a first optical area, a second light-emitting element disposed in a second optical area, a first optical member disposed in the first optical area and configured to emit light, which is generated from the first light-emitting element, at a first viewing angle and a second optical member disposed in the second optical area and configured to emit light, which is generated from the second light-emitting element, at the first viewing angle, wherein the plurality of second pixels each comprises a third light-emitting element disposed in a third optical area, a fourth light-emitting element disposed in a fourth optical area, a third optical member disposed in the third optical area and configured to emit light, which is generated from the third light-emitting element, at the first viewing angle and a fourth optical member disposed in the fourth optical area and configured to emit light, which is generated from the fourth light-emitting element, at a second viewing angle smaller than the first viewing angle, and wherein the brightness controller controls brightness of the second optical area included in each of the plurality of first pixels disposed in the first area.

Other detailed matters of the example embodiments are included in the detailed description and the drawings.

According to the present specification, it is possible to control, on the basis of a drive mode, the brightness of the display panel to increase the brightness of the first area as the distance from the boundary between the first area and the second area increases in the first mode in which the content is provided at a wide viewing angle.

According to the present specification, it is possible to control the brightness of the area in the first area, which is adjacent to the boundary between the first area and the second area, so that the brightness has a value substantially equal or similar to that of the brightness of the second area, thereby solving the problem in which the boundary between the first area and the second area is visually recognized.

The effects according to the present disclosure are not limited to the contents exemplified above, and more various effects are included in the present specification.

Additional features and aspects of the disclosure are set forth in part in the description that follows and in part will become apparent from the description or can be learned by practice of the inventive concepts provided herein. Other features and aspects of the inventive concepts can be realized and attained by the structures pointed out in the present disclosure, or derivable therefrom, and the claims hereof as well as the appended drawings.

It is to be understood that both the foregoing general description and the following detailed description are explanatory examples and are intended to provide further explanation of the inventive concepts as claimed.

BRIEF DESCRIPTION OF THE SEVERAL VIEWS OF THE DRAWINGS

The accompanying drawings provide a further understanding of the disclosure and can be incorporated in and constitute a part of the disclosure, illustrate embodiments of the disclosure and together with the description serve to explain various principles of the disclosure.

The above and other aspects, features and other advantages of the present disclosure will be more clearly understood from the following detailed description taken in conjunction with the accompanying drawings, in which.

Figure 1:
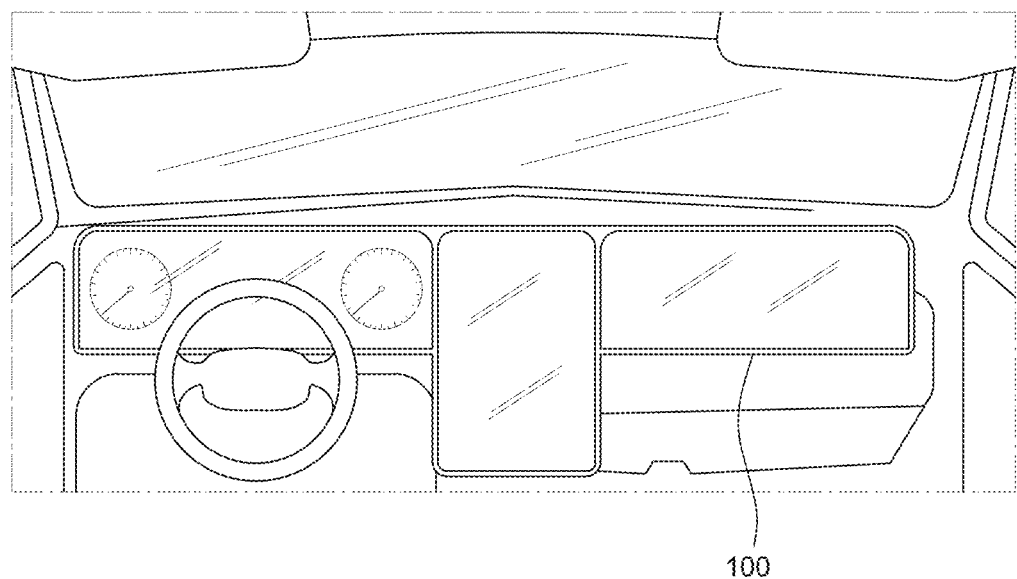
FIG. 1 is an exemplified view illustrating a display device according to an example embodiment of the present specification.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted or can be briefly provided. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations can be selected only for convenience of writing the specification and can be thus different from those used in actual products.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure. Therefore, the present disclosure will be defined only by the scope of the appended claims.

The shapes, sizes, areas, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted or may be briefly provided to avoid unnecessarily obscuring the subject matter of the present disclosure. The terms such as "including," "having," "constitute," "make up of," "formed of," and "consist of" used herein are generally intended to allow other components to be added unless the terms are used with the term "only". Any references to singular may include plural unless expressly stated otherwise.

Components are interpreted to include an ordinary error range or tolerance range even if there is no explicit description of such an error or tolerance range.

When the position relation between two parts is described using the terms such as "on", "over," "above", "below", "beside," "beneath," "near," "close to," "adjacent to," and "next", one or more parts may be positioned between the two parts unless the terms are used with the term "immediately", "closely", or "directly".

When temporally relative terms, such as "after," "subsequent," "following," "next" and "before" are used to define a temporal relationship, a non-continuous situation can be included unless a more limiting term, such as "just," "immediately" or "directly" is used.

Although the terms "first", "second", "A," "B," "(a)," "(b)," and the like are used for describing various components, basis, order, or number of these components are not confined by these terms. These terms are merely used for distinguishing one component from the other components. Therefore, a first component to be mentioned below may be a second component in a technical concept of the present disclosure.

A size and a thickness of each component illustrated in the drawings are illustrated for convenience of description, and the present disclosure is not limited to the size and the thickness of the component illustrated.

The features of various embodiments of the present disclosure can be partially or entirely coupled to or combined with each other and can be interlocked and operated in technically various ways, and the embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" can apply, for example, to a separate circuit or structure, an integrated circuit, a computational block of a circuit device, or any structure configured to perform a described function as should be understood to one of ordinary skill in the art.

The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

The term "at least one" should be understood as including any and all combinations of one or more of the associated listed items. For example, the meaning of "at least one of a first item, a second item, and a third item" encompasses the combination of all three listed elements, combinations of any two of the three elements, as well as each individual element, the first element, the second element, and the third element.

Hereinafter, example embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Hereinafter, example embodiments of the present disclosure will be described in detail with reference to accompanying drawings. All the components of each display device according to all embodiments of the present disclosure are operatively coupled and configured.

FIG. 1 is an exemplified view illustrating a display device according to an embodiment of the present specification.

With reference to FIG. 1, a display device 100 may be disposed on at least a part of a dashboard of a vehicle. The dashboard of the vehicle may include a configuration disposed at a front side of a front seat (e.g., a driver seat or a passenger seat) of the vehicle. For example, the dashboard of the vehicle may be equipped with an input configuration for manipulating various functions (e.g., an air conditioner, an audio system, and a navigation system) in the vehicle.

The display device 100 may be disposed on the dashboard of the vehicle and operate as an input part for manipulating at least some of various functions of the vehicle. The display device 100 may provide various types of information related to the vehicle, e.g., driving information of the vehicle (e.g., a current speed of the vehicle, a remaining fuel amount, and a traveling distance), information on components of the vehicle (e.g., a degree of damage to a vehicle tire), and the like.

The display device 100 may be disposed to traverse the driver seat and the passenger seat disposed as the front seat of the vehicle. Users of the display device 100 may include a driver of the vehicle, and a fellow passenger seated in the passenger seat. Both the driver and the fellow passenger in the vehicle may use the display device 100.

Only a part of the display device 100 may be illustrated in FIG. 1. The display device 100 illustrated in FIG. 1 may be illustrated as a display panel among various components included in the display device 100. Specifically, for example, the display device 100 illustrated in FIG. 1 may be illustrated as at least a part of a display area and at least a part of a non-display area of the display panel. The components, which exclude the components illustrated in FIG. 1 among the components of the display device 100, may be mounted in the vehicle (or at least a part of the vehicle).

Figure 2:
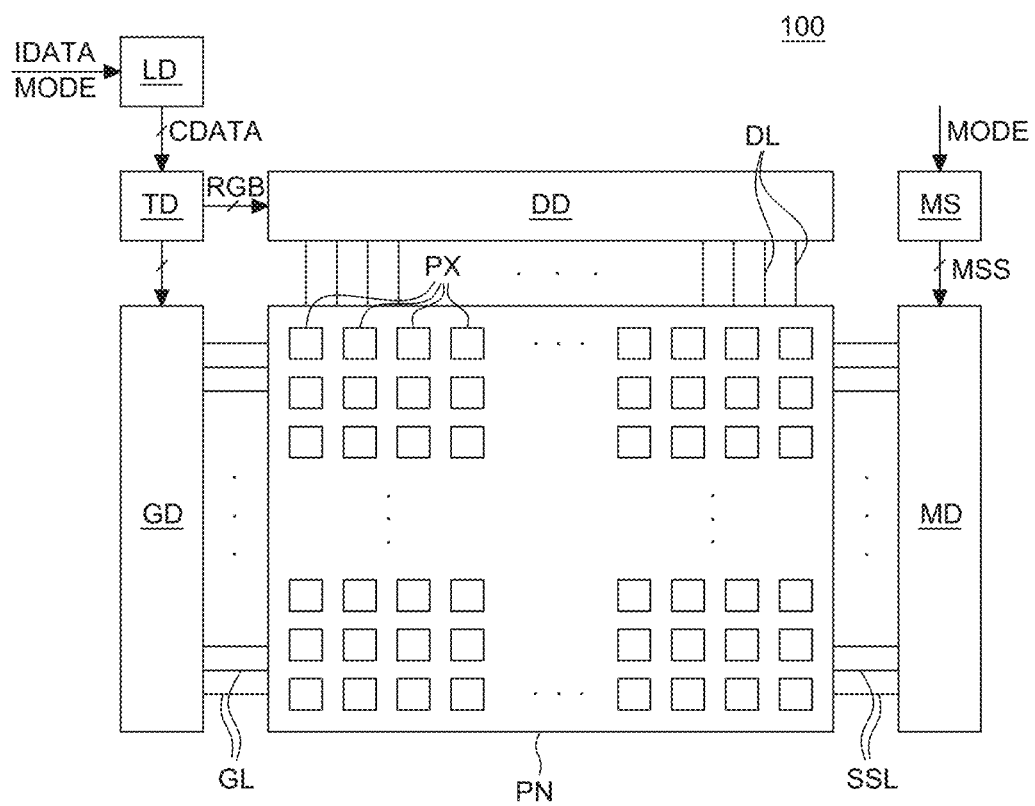
FIG. 2 is a functional block diagram of the display device according to the example embodiment of the present specification.

FIG. 2 is a functional block diagram of the display device according to the embodiment of the present specification.

An electroluminescent display device may be applied as the display device according to the embodiment of the present specification. An organic light-emitting diode display device, a quantum-dot light-emitting diode display device, or an inorganic light-emitting diode display device may be used as the electroluminescent display device. However, the present disclosure is not limited thereto, and various other types of display devices may also be used as the display device according to the embodiment of the present specification.

With reference to FIG. 2, the display device 100 may include a display panel PN, a data drive circuit DD, a gate drive circuit GD, a timing controller TD, and a brightness controller LD. The display device 100 may further include a mode controller MS and a mode selection part MD.

The display panel PN may create an image to be provided to the user. For example, the display panel PN may create and display images, which are to be provided to the user, through a plurality of pixels PX in which pixel circuits are disposed.

The plurality of pixels PX may include first and second pixels disposed for each area of the display panel PN. The first and second pixels and an arrangement relationship between the first and second pixels will be described in detail with reference to FIGS. 8A to 11.

The data drive circuit DD, the gate drive circuit GD, and the timing controller TD may provide signals for operating the pixels PX through signal lines. For example, the signal lines for providing the signals for operating the pixels PX may include a plurality of data lines DL and a plurality of gate lines GL.

The mode selection part MD may provide signals for controlling the drive modes of the pixels PX through the signal lines. For example, the signal lines for providing the signals for controlling the drive modes of the pixels PX may include a plurality of selection signal lines SSL.

The plurality of data lines DL may include a plurality of lines arranged in a column direction and connected to the pixels PX disposed in one column direction. The plurality of gate lines GL may include a plurality of lines arranged in a row direction and connected to the pixels PX disposed in one row direction.

In addition, the plurality of selection signal lines SSL may include a plurality of lines arranged in the row direction and connected to the pixels PX disposed in one row direction.

The plurality of selection signal lines SSL may include first to fourth selection signal lines. In this case, the first and second selection signal lines may be selection signal lines connected in common to a first pixel included in the plurality of pixels PX, and the third and fourth selection signal lines may be selection signal lines connected in common to a second pixel included in the plurality of pixels PX. A connection relationship between the first to fourth selection signal lines will be described below in detail with reference to FIGS. 8A and 9A.

In some instances, the display device 100 may further include a power source unit. In this case, a signal for operating the pixel PX may be provided through a power line that connects the power source unit and the display panel PN. According to the embodiment, the power source unit may provide power to the data drive circuit DD and the gate drive circuit GD. The data drive circuit DD and the gate drive circuit GD may operate on the basis of power provided from the power source unit.

For example, the data drive circuit DD may apply data signals to the pixels PX through the plurality of data lines DL, the gate drive circuit GD may apply gate signals to the pixels PX through the plurality of gate lines GL, and the power source unit may supply power voltages to the pixels PX through power voltage supply lines.

The brightness controller LD may receive input image data IDATA and a mode signal MODE that are digital types inputted from the outside. In this case, the mode signal MODE may be a signal inputted in response to the drive mode of the display device 100.

The brightness controller LD may create corrected image data CDATA for controlling the brightness of the display panel PN in accordance with the drive mode of the display device 100 on the basis of the mode signal MODE.

For example, in a first mode in which an entire area of the display panel PN of the display device 100 is controlled in a wide visual field mode (e.g., share mode), the brightness controller LD may create the corrected image data CDATA for controlling the brightness of the first area.

The brightness controller LD may create the corrected image data CDATA by scaling gradation values included in the input image data IDATA by using a scale factor. For example, the brightness controller LD may create the corrected image data CDATA by scaling gradation values corresponding to at least a partial area, e.g., the first area of the display panel PN. However, this configuration is provided for illustrative purposes only. The method of creating the corrected image data CDATA by the brightness controller LD is not limited thereto.

As another example, in a second mode of the display device 100 in which at least a partial area, e.g., the first area of the display panel PN is controlled in a wide visual field mode (e.g., share mode) and another partial area, e.g., a second area of the display panel PN is controlled in a narrow visual field mode (e.g., private mode), the brightness controller LD may create the corrected image data CDATA for controlling the brightness of the entire area of the display panel PN so that the brightness corresponds to the input image data IDATA.

In the second mode, the brightness of the entire area of the display panel PN needs to correspond to the input image data IDATA. Therefore, the corrected image data CDATA may be substantially identical to the input image data IDATA. For example, in the second mode, the brightness controller LD may output the input image data IDATA as the corrected image data CDATA in an intact manner without correcting the input image data IDATA.

The timing controller TD may control the data drive circuit DD and the gate drive circuit GD. For example, the timing controller TD may create image data RGB by realigning the corrected image data CDATA, which are provided from the brightness controller LD, in accordance with resolution of the display panel PN and supply the image data RGB to the data drive circuit DD.

In this case, as described above, in case that the display device 100 operates in the first mode, the brightness of the image displayed on at least a partial area, e.g., the first area of the display panel PN may be controlled on the basis of the corrected image data CDATA created by scaling the gradation values of the input image data IDATA by the brightness controller LD. The configuration in which the brightness of the display panel PN is controlled on the basis of the corrected image data CDATA will be described in detail with reference to FIGS. 12 to 18.

Meanwhile, for convenience of description, in FIG. 2, the configuration is described in which the brightness controller LD and the timing controller TD are separate components. However, the present disclosure is not limited thereto. For example, a part or the entirety of the brightness controller LD may be integrated with the timing controller TD.

The data drive circuit DD may convert the image data RGB, which are inputted from the timing controller TD, into an analog data signal (data voltage) on the basis of a data control signal and supply the data signal to the plurality of data lines DL.

The gate drive circuit GD may generate a scan signal and a light-emitting signal (or a light-emitting control signal) on the basis of the gate control signal. For example, the gate drive circuit GD may include a scan drive part and a light-emitting signal drive part. The scan drive part may generate scan signals in a row-sequential manner to operate at least one scan line connected to each pixel row and supply the scan signals to scan lines. The light-emitting signal drive part may generate light-emitting signals in a row-sequential manner to operate at least one light-emitting signal line connected to each pixel row and supply the light-emitting signals to light-emitting signal lines.

According to the embodiment, the gate drive circuit GD may be disposed on the display panel PN in a gate-driver-in-panel (GIP) manner. For example, the gate drive circuit GD may be divided into a plurality of gate drive circuits and respectively disposed on at least two sides of the display panel PN.

The mode controller MS may control the mode selection part MD. For example, the mode controller MS may generate a mode selection signal MSS for controlling the mode selection part MD on the basis of the mode signal MODE inputted in response to the drive mode of the display device 100 and provide the mode selection signal MSS to the mode selection part MD. The mode selection part MD may provide a selection signal to the plurality of selection signal lines SSL in response to the mode selection signal MSS.

The display panel PN may include a display area and a non-display area adjacent to (e.g., surrounding) the display area.

The display area of the display panel PN may include the plurality of pixels PX disposed in the row direction and the column direction. For example, the plurality of pixels PX may be disposed in an area in which the plurality of data lines DL and the plurality of gate lines GL intersect.

One pixel PX may include a plurality of subpixels that emit light beams with different colors. For example, one pixel PX may implement blue, red, and green by using three subpixels. However, the present specification is not limited thereto. In some instances, the pixel PX may further include a subpixel for further implementing a particular color, e.g., white.

In the pixel PX, an area for implementing blue may be referred to as a blue subpixel, an area for implementing red may be referred to as a red subpixel, and an area for implementing green may be referred to as a green subpixel.

The plurality of pixels PX may each include first and second type light-emitting elements that emit light with the same color.

The plurality of pixels PX may include at least one of first and second type lenses that refract light beams, which are emitted from the first and second type light-emitting elements, in a particular or selected direction. Meanwhile, the term 'lens' used in the present specification is used for convenience of description. The term 'optical member' or "optical element" may be defined instead of the lens.

For example, the first type lens may be disposed in a lens area configured to define a first viewing angle by providing light within a first range, and the second type lens may be disposed in a lens area configured to define a second viewing angle by providing light within a second range. The first range may correspond to a range larger than the second range. Therefore, the first and second type lenses may restrict the viewing angle of each of the plurality of pixels PX.

The first and second type lenses will be described below in detail with reference to FIGS. 6 and 7.

The non-display area may be disposed along a periphery of the display area. Various constituent elements for operating the pixel circuit disposed in the pixel PX may be disposed in the non-display area. For example, at least a part of the gate drive circuit GD may be disposed in the non-display area. The non-display area may be referred to as a bezel area.

The display panel PN may be divided into a plurality of areas. In other words, the display panel PN may include a plurality of areas. For example, the display panel PN may include the first area in which a plurality of first pixels is disposed among the plurality of pixels PX, and the second area in which a plurality of second pixels is disposed among the plurality of pixels PX. The plurality of first pixels disposed in the first area and the plurality of second pixels disposed in the second area may include the same pixel circuit.

For example, the plurality of first pixels disposed in the first area of the display panel PN and the plurality of second pixels disposed in the second area may each include a drive circuit, a selection circuit, and first and second type light-emitting elements configured to emit light beams with the same color.

In this case, the drive circuit may be a circuit configured to provide drive currents to the first and second type light-emitting elements on the basis of the signals provided from the data drive circuit DD and the gate drive circuit GD.

In addition, the selection circuit may be a circuit configured to include at least any one of a first drive current passing through the first type light-emitting element and a second drive current passing through the second type light-emitting element on the basis of the selection signal provided from the mode selection part MD. In other words, under the control of the selection circuit, a current path for the first drive current may be formed to allow the first type light-emitting element to emit light, or a current path for the second drive current may be formed to allow the second type light-emitting element to emit light. However, the present disclosure is not limited thereto. The selection circuit may be defined as being included in the drive circuit.

Meanwhile, hereinafter, for convenience of description, the case in which the current path for the first drive current is formed and the first type light-emitting element emits light is defined as a case in which the pixel PX operates in a first state. The case in which the current path for the second drive current is formed and the second type light-emitting element emits light is defined as a case in which the pixel PX operates in a second state.

The selection circuit may perform control to form both the first drive current passing through the first type light-emitting element and the second drive current passing through the second type light-emitting element on the basis of the selection signal provided from the mode selection part MD. In other words, under the control of the selection circuit, the current path for the first drive current and the current path for the second drive current may be formed, such that both the first and second type light-emitting elements may emit light.

Meanwhile, hereinafter, for convenience of description, the case in which the current path for the first drive current and the current path for the second drive current are formed and both the first and second type light-emitting elements emit light is defined as a case in which the pixel PX operates in a third state.

The plurality of first pixels disposed in the first area of the display panel PN may each include two first type lenses, e.g., first and second lenses configured to refract light beams, which are emitted from the first and second type light-emitting elements, in a particular direction. For example, the light, which is generated from the first type light-emitting element included in each of the plurality of first pixels disposed in the first area of the display panel PN, may be refracted in a particular direction by the first lens implemented as the first type lens. The light, which is generated from the second type light-emitting element, may be refracted in a particular direction by the second lens implemented as the first type lens.

The plurality of second pixels, which is disposed in the second area of the display panel PN, may each include the first type lens, e.g., a third lens configured to refract the light, which is emitted from the first type light-emitting element, in a particular direction, and the second type lens, e.g., a fourth lens configured to refract the light, which is emitted from the second type light-emitting element, in a particular direction. For example, the light, which is generated from the first type light-emitting element included in each of the plurality of second pixels disposed in the second area of the display panel PN, may be refracted in a particular direction by the third lens implemented as the first type lens. The light, which is generated from the second type light-emitting element included in each of the plurality of second pixels disposed in the second area of the display panel PN, may be refracted in a particular direction by the fourth lens implemented as the second type lens.

The plurality of areas, e.g., the first and second areas, which are included in the display panel PN, and the first and second pixels disposed in the first and second areas will be described below in detail with reference to FIGS. 8A to 11.

According to the embodiment, the respective areas of the display panel PN may be disposed to traverse the driver seat and the passenger seat disposed as the front seats in the vehicle described with reference to FIG. 1 and provide various information to the driver and the fellow passenger in the vehicle. For example, the first area of the display panel PN may be an area provided at a side of the driver seat disposed in the front seat of the vehicle and provide information such as a traveling speed, RPM, an engine temperature, the amount of fuel, and the like. The second area of the display panel PN may be an area provided at a side of the passenger seat disposed in the front seat of the vehicle and provide an entertainment function, seat information, and the like for the fellow passenger seated in the passenger seat. Meanwhile, the first area of the display panel PN may further include a center fascia area disposed between the driver seat and the passenger seat. However, the division of the areas is provided for convenience of description, but the present disclosure is not limited thereto. The first and second areas of the display panel PN may be variously defined in accordance with design.

Meanwhile, when the display panel PN is used for the vehicle described with reference to FIG. 1, a visual field of at least some of the plurality of areas included in the display panel PN is required to be restricted in response to the user's needs. For example, the image, which is displayed in the second area that provides the entertainment function, seat information, and the like for the fellow passenger seated in the passenger seat, may hinder the driver who drives the vehicle. Therefore, the visual field of the image displayed in the second area may sometimes be required to be restricted in response to the user's needs.

More specifically, with reference to FIG. 2, the display device 100 may control the visual field of at least some of the plurality of areas included in the display panel PN by using the mode controller MS and the mode selection part MD.

The mode controller MS may generate the mode selection signal MSS for controlling the display panel PN in the first or second mode in accordance with the drive mode of the display device 100 on the basis of the mode signal MODE and provide the mode selection signal MSS to the mode selection part MD. In this case, the first mode may correspond to a mode in which all the plurality of areas, e.g., both the first and second areas of the display panel PN are controlled in the wide visual field mode (share mode). The second mode may correspond to a mode in which at least some of the plurality of areas, e.g., at least one of the first and second areas of the display panel PN, e.g., the second area operates in the narrow visual field mode (private mode).

For example, when the display device 100 operates in the first and second modes, the first area of the display panel PN may operate in the third state under the control of the mode controller MS. In this case, both the first and second type light-emitting elements included in each of the plurality of first pixels disposed in the first area of the display panel PN may emit light. Therefore, the light, which is generated from the first type light-emitting element included in each of the plurality of first pixels, may be emitted at the first viewing angle through the first lens, and the light, which is generated from the second type light-emitting element included in each of the plurality of first pixels, may be emitted at the first viewing angle through the second lens. Therefore, when the display device 100 operates in the first and second modes, the content may be provided in the wide visual field mode from the plurality of first pixels disposed in the first area of the display panel PN.

In addition, when the display device 100 operates in the first mode, the second area of the display panel PN may operate in the first state under the control of the mode controller MS. In this case, the first type light-emitting element, which is included in each of the plurality of second pixels disposed in the second area of the display panel PN, may emit light, and the second type light-emitting element may not emit light. Therefore, the light, which is generated from the first type light-emitting element included in each of the plurality of second pixels, may be emitted at the first viewing angle through the third lens. Therefore, when the display device 100 operates in the first mode, the content may be provided in the wide visual field mode from the plurality of second pixels disposed in the second area of the display panel PN.

In addition, when the display device 100 operates in the second mode, the second area of the display panel PN may operate in the second state under the control of the mode controller MS. In this case, the second type light-emitting element, which is included in each of the plurality of second pixels disposed in the second area of the display panel PN, may emit light, and the first type light-emitting element may not emit light. Therefore, the light, which is emitted from the second type light-emitting element included in each of the plurality of second pixels, may be emitted at the second viewing angle through the fourth lens. Therefore, when the display device 100 operates in the second mode, the content may be provided in the narrow visual field mode from the plurality of second pixels disposed in the second area of the display panel PN.

The configuration in which the mode controller MS controls the display panel PN in the first or second mode in accordance with the drive mode of the display device 100 will be described below in detail with reference to FIGS. 12 and 13.

Figure 3:
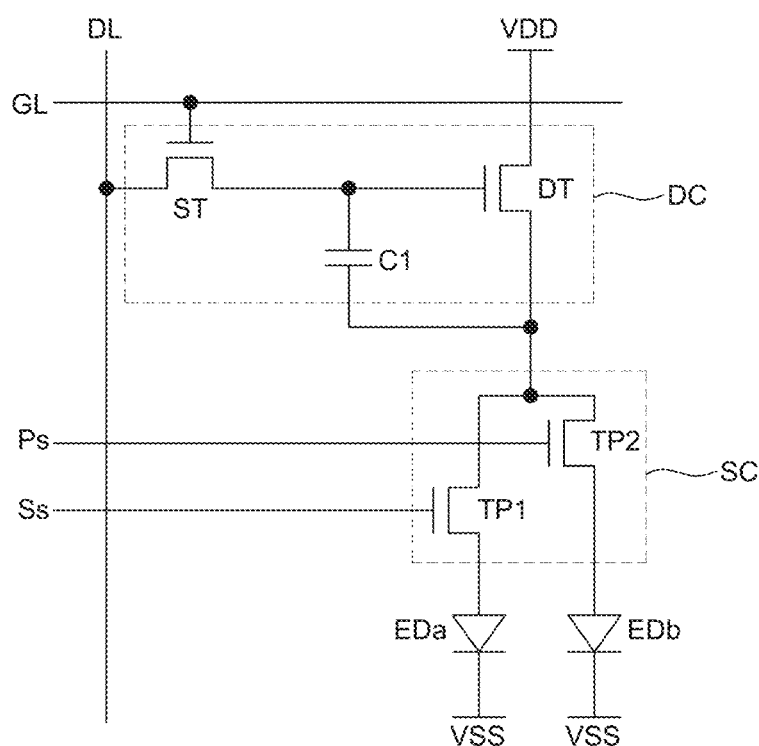
FIG. 3 is a circuit diagram illustrating an example of a pixel circuit of the display device according to the example embodiment of the present specification.

FIG. 3 is a circuit diagram illustrating an example of the pixel circuit of the display device according to the embodiment of the present specification.

Meanwhile, FIG. 3 illustrates an example of a pixel circuit SPC corresponding to each of the plurality of pixels PX of the display device 100.

With reference to FIG. 3, the pixel circuit SPC may include a drive circuit DC, a selection circuit SC, and a plurality of type light-emitting elements EDa and EDb.

The drive circuit DC may include a driving transistor DT, a switching transistor ST, and a first capacitor C1.

The driving transistor DT and the first capacitor C1 may be connected to the switching transistor ST. A first electrode of the driving transistor DT may be connected to a first power line configured to provide a first power voltage VDD, e.g., a high-potential power voltage.

The switching transistor ST may be connected to the gate line GL and supplied with the gate signal. The switching transistor ST may be turned on or off by the gate signal. The first electrode of the switching transistor ST may be connected to the data line DL. In this case, the data signal may be supplied to a gate electrode of the driving transistor DT through the switching transistor ST on the basis that the switching transistor ST is turned on.

The first capacitor C1 may be disposed between the gate electrode and a second electrode of the driving transistor DT. The first capacitor C1 may maintain a signal applied to the gate electrode of the driving transistor DT, for example, maintain the data signal for one frame.

The selection circuit SC may include a first selection transistor TP1 configured to create a current path for the first drive current passing through a first type light-emitting element EDa, and a second selection transistor TP2 configured to create a current path for the second drive current passing through a second type light-emitting element EDb.

The first selection transistor TP1 may be disposed between the drive circuit DC and the first type light-emitting element EDa, and a gate electrode of the first selection transistor TP1 may be connected to a first type selection signal line configured to provide a first selection signal Ss. In case that the first selection signal Ss is supplied to the gate electrode of the first selection transistor TP1 when the pixel circuit SPC operates in the first or third state, the first selection transistor TP1 may be turned on, such that the current path for the first drive current passing through the first type light-emitting element EDa may be formed. In this case, the first type light-emitting element EDa may emit light.

The second selection transistor TP2 may be disposed between the drive circuit DC and the second type light-emitting element EDb, and a gate electrode of the second selection transistor TP2 may be connected to a second type selection signal line configured to provide a second selection signal Ps. In case that the second selection signal Ps is supplied to the gate electrode of the second selection transistor TP2 when the pixel circuit SPC operates in the second or third state, the second selection transistor TP2 may be turned on, such that the current path for the second drive current passing through the second type light-emitting element EDb may be formed. In this case, the second type light-emitting element EDb may emit light.

The first type light-emitting element EDa may be connected between the first selection transistor TP1, which is turned on or off by the first selection signal Ss, and a second power line configured to provide a second power voltage VSS, e.g., a low-potential power voltage. The second type light-emitting element EDb may be connected between the second selection transistor TP2, which is turned on or off by the second selection signal Ps, and the second power line configured to provide the second power voltage VSS, e.g., the low-potential power voltage.

In this case, the first type light-emitting element EDa or the second type light-emitting element EDb may be connected to other components of the pixel circuit SPC, e.g., the driving transistor DT of the drive circuit DC in accordance with the drive mode MODE. In this case, the drive mode may be determined in case that a condition, which is designated by a user's input or designated in advance, is satisfied.

For example, the drive mode may include the first mode in which all the plurality of areas of the display panel PN described with reference to FIG. 2 are controlled in the wide visual field mode (share mode), and the second mode in which at least some of the plurality of areas, e.g., the second area of the display panel PN operates in the narrow visual field mode (private mode).

The first type light-emitting element EDa and the second type light-emitting element EDb included in one pixel circuit SPC may emit light with the same color.

The plurality of transistors DT, ST, TP1, and TP2 in FIG. 3 may include at least one of oxide semiconductors such as IGZO, amorphous silicon, and polycrystalline silicon. The first or second electrode of the transistor may be a source electrode or a drain electrode. For example, the first electrode may be the source electrode, and the second electrode may be the drain electrode. As another example, the first electrode may be the drain electrode, and the second electrode may be the source electrode.

Figure 4:
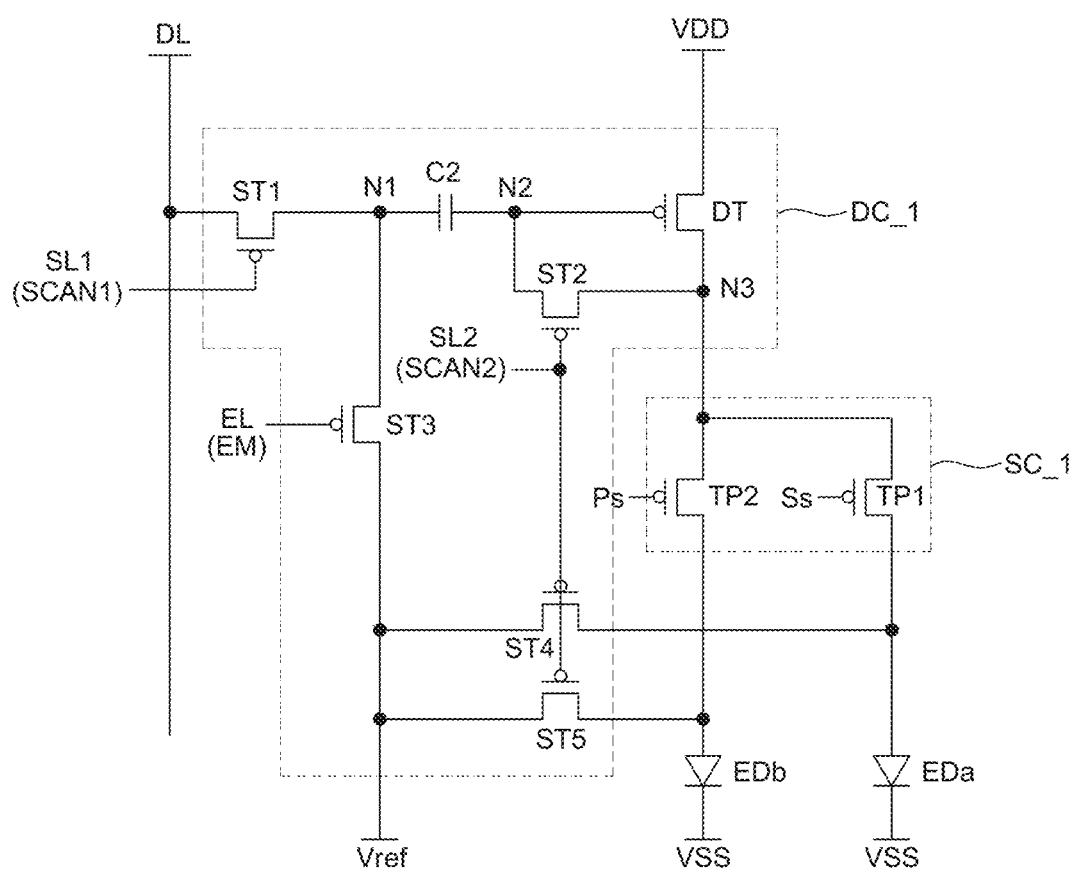
FIG. 4 is a circuit diagram illustrating an example of the pixel circuit of the display device according to the example embodiment of the present specification.

FIG. 4 is a circuit diagram illustrating an example of the pixel circuit of the display device according to the embodiment of the present specification.

Meanwhile, FIG. 4 may illustrate an example pixel circuit SPC_1 applicable as the pixel circuit SPC illustrated in FIG. 3.

With reference to FIG. 4, at least some of the plurality of transistors included in the pixel circuit SPC_1 may each be an n-type transistor or a p-type transistor. In the case of the p-type transistor, a low-level voltage of each of the driving signals may mean a voltage that turns on a thin-film transistor and a high-level voltage of each of the driving signals may mean a voltage that turns off the thin-film transistor.

In this case, the low-level voltage may correspond to a predesignated voltage lower than the high-level voltage. For example, the low-level voltage may include a voltage corresponding to a range of −8 V to −12 V. The high-level voltage may correspond to a predesignated voltage higher than the low-level voltage. For example, the high-level voltage may include a voltage corresponding to a range of 12 V to 16 V. According to the embodiment, the low-level voltage may be referred to as a first voltage, and the high-level voltage may be referred to as a second voltage. In this case, the first voltage may have a lower value than the second voltage.

The first or second electrode of the transistor, which will be described below, may mean the source or drain electrode. However, the terms 'first electrode' and 'second electrode' are just terms for distinguishing the electrodes. What corresponds to the electrode is not limited. In addition, for each transistor, the first electrode may not refer to the same electrode.

The pixel circuit SPC_1 may include a drive circuit DC_1, a selection circuit SC_1, and the plurality of light-emitting elements EDa and EDb.

The drive circuit DC_1 may include the driving transistor DT, a plurality of switching transistors ST1 to ST5, and a second capacitor C2.

The driving transistor DT may control a drive current to be applied to the plurality of light-emitting elements EDa and EDb in accordance with a source-gate voltage. The driving transistor DT may include the source electrode connected to the first power line configured to provide the first power voltage VDD, e.g., the high-potential power voltage, the gate electrode connected to a second node N2, and the drain electrode connected to a third node N3.

A first switching transistor ST1 may apply the data signal from the data line DL to a first node N1. The first switching transistor ST1 may include a source electrode connected to the data line DL, a drain electrode connected to the first node N1, and a gate electrode connected to a first scan signal line SL1 configured to apply a first scan signal SCAN1. The first switching transistor ST1 may be turned on or off by the first scan signal SCAN1. Therefore, the first switching transistor ST1 may apply the data signal from the data line DL to the first node N1 in response to the first scan signal SCAN1 at a low level, for example, a turn-on level.

The second switching transistor ST2 may diode-connect the gate electrode and the drain electrode of the driving transistor DT. The second switching transistor ST2 may include a drain electrode connected to the second node N2, a source electrode connected to the third node N3, and a gate electrode connected to a second scan signal line SL2 configured to apply a second scan signal SCAN2. The second switching transistor ST2 may be turned on or off by the second scan signal SCAN2. Therefore, the second switching transistor ST2 may diode-connect the gate electrode and the drain electrode of the driving transistor DT in response to the second scan signal SCAN2 at a low level, for example, a turn-on level.

A third switching transistor ST3 may apply a reference voltage Vref to the first node N1. The third switching transistor ST3 may include a source electrode connected to a reference voltage line configured to provide the reference voltage Vref, a drain electrode connected to the first node N1, and a gate electrode connected to a light-emitting signal line EL configured to apply a light-emitting signal EM. The third switching transistor ST3 may be turned on or off by the light-emitting signal EM. Therefore, the third switching transistor ST3 may transmit the reference voltage Vref to the first node N1 in response to the light-emitting signal EM at a low level, for example, a turn-on level.

A fourth switching transistor ST4 may apply the reference voltage Vref to an anode electrode of the first type light-emitting element EDa. The fourth switching transistor ST4 may include a source electrode connected to the reference voltage line configured to provide the reference voltage Vref, a drain electrode connected to the anode electrode of the first type light-emitting element EDa, and a gate electrode connected to the second scan signal line SL2 configured to apply the second scan signal SCAN2. The fourth switching transistor ST4 may be turned on or off by the second scan signal SCAN2. Therefore, the fourth switching transistor ST4 may apply the reference voltage Vref to the anode electrode of the first type light-emitting element EDa in response to the second scan signal SCAN2 at a low level, for example, a turn-on level.

A fifth switching transistor ST5 may apply the reference voltage Vref to an anode electrode of the second type light-emitting element EDb. The fifth switching transistor ST5 may include a source electrode connected to the reference voltage line configured to provide the reference voltage Vref, a drain electrode connected to the anode electrode of the second type light-emitting element EDb, and a gate electrode connected to the second scan signal line SL2 configured to apply the second scan signal SCAN2. The fifth switching transistor ST5 may be turned on or off by the second scan signal SCAN2. Therefore, the fifth switching transistor ST5 may apply the reference voltage Vref to the anode electrode of the second type light-emitting element EDb in response to the second scan signal SCAN2 at a low level, for example, a turn-on level.

The second capacitor C2 may include a first electrode connected to the first node N1, and a second electrode connected to the second node N2. For example, one electrode of the second capacitor C2 may be connected to the gate electrode of the driving transistor DT, and another electrode of the second capacitor C2 may be connected to the first switching transistor ST1. The second capacitor C2 may store a predetermined voltage and maintain a predetermined voltage of the gate electrode of the driving transistor DT while at least any one of the plurality of light-emitting elements EDa and EDb emits light.

The selection circuit SC_1 may include the first selection transistor TP1 configured to create the current path for the first drive current passing through the first type light-emitting element EDa, and the second selection transistor TP2 configured to create the current path for the second drive current passing through the second type light-emitting element EDb.

The first selection transistor TP1 may be disposed between the drive circuit DC_1 and the first type light-emitting element EDa, and the gate electrode of the first selection transistor TP1 may be connected to the first type selection signal line configured to provide the first selection signal Ss. In case that the first selection signal Ss is supplied to the gate electrode of the first selection transistor TP1 when the pixel circuit SPC_1 operates in the first or third state, the first selection transistor TP1 may be turned on, such that the current path for the first drive current passing through the first type light-emitting element EDa may be formed. In this case, the first type light-emitting element EDa may emit light.

The second selection transistor TP2 may be disposed between the drive circuit DC_1 and the second type light-emitting element EDb, and the gate electrode of the second selection transistor TP2 may be connected to the second type selection signal line configured to provide the second selection signal Ps. In case that the second selection signal Ps is supplied to the gate electrode of the second selection transistor TP2 when the pixel circuit SPC_1 operates in the second or third state, the second selection transistor TP2 may be turned on, such that the current path for the second drive current passing through the second type light-emitting element EDb may be formed. In this case, the second type light-emitting element EDb may emit light.

The first type light-emitting element EDa may be connected between the first selection transistor TP1, which is turned on or off by the first selection signal Ss, and the second power line configured to provide the second power voltage VSS, e.g., the low-potential power voltage. The second type light-emitting element EDb may be connected between the second selection transistor TP2, which is turned on or off by the second selection signal Ps, and the second power line configured to provide the second power voltage VSS, e.g., the low-potential power voltage.

In this case, the first type light-emitting element EDa or the second type light-emitting element EDb may be connected to other components of the pixel circuit SPC_1, e.g., the driving transistor DT of the drive circuit DC_1 in accordance with the drive mode MODE. In this case, the drive mode may be determined in case that a condition, which is designated by the user's input or designated in advance, is satisfied.

The first type light-emitting element EDa and the second type light-emitting element EDb included in one pixel circuit SPC_1 may emit light with the same color.

Figure 5A:
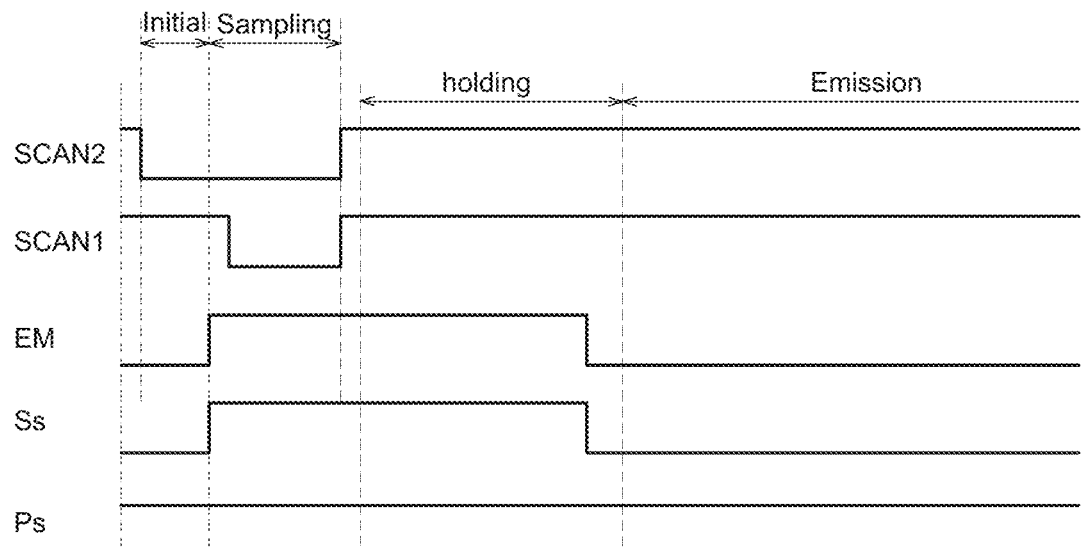
FIGS. 5A and 5B are examples of waveform diagrams for explaining the pixel circuit in FIG. 4.
Figure 5B:
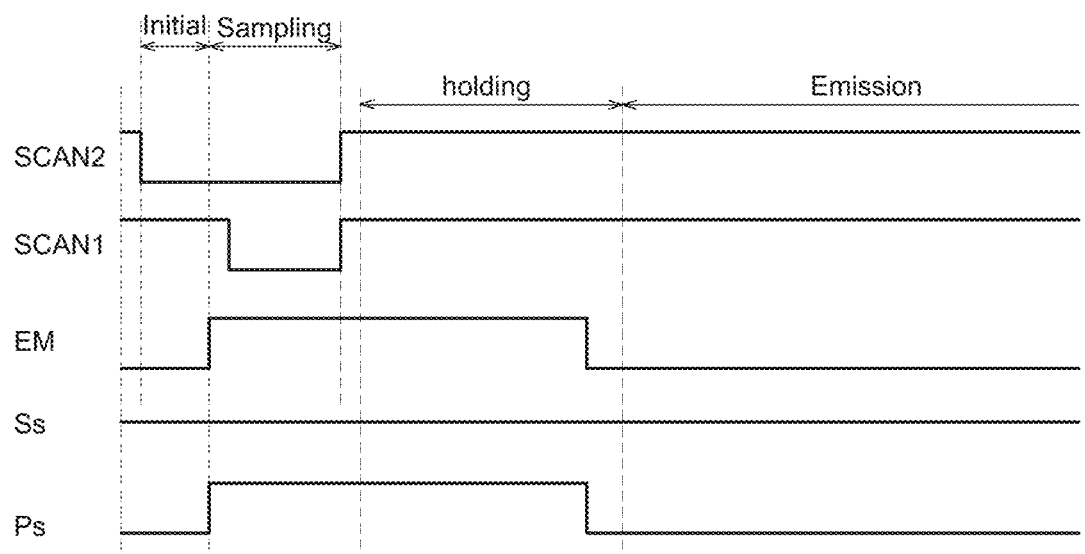

FIGS. 5A and 5B are waveform diagrams for explaining the pixel circuit in FIG. 4.

Meanwhile, FIG. 5A is a waveform diagram for explaining an example in which the pixel circuit SPC_1 operates in the first state, and FIG. 5B is a waveform diagram for explaining an example in which the pixel circuit SPC_1 operates in the second state.

With reference to FIGS. 4 to 5B, only the first type light-emitting element EDa emits light in case that the pixel circuit SPC_1 operates in the first state, and only the second type light-emitting element EDb may emit light in case that the pixel circuit SPC_1 operates in the second state. In this case, as illustrated in FIG. 5A, in the first state, the second selection signal Ps, which is used to control the light emission from the second type light-emitting element EDb, for example, the second selection signal Ps, which is used to form the current path for the second drive current, may be outputted only at a high level, for example, a turn-off level so that only the first type light-emitting element EDa emits light. In addition, as illustrated in FIG. 5B, in the second state, the first selection signal Ss, which is used to control the light emission from the first type light-emitting element EDa, for example, the first selection signal Ss, which is used to form the current path for the first drive current, may be outputted only at a high level, for example, a turn-off level so that only the second type light-emitting element EDb emits light.

Specifically, first, the case in which the pixel circuit SPC_1 operates in the first state will be described with reference to FIGS. 4 and 5A. During an initialization period, the second scan signal SCAN2 at a low level, the first selection signal Ss at a low level, and the light-emitting signal EM at a low level may be outputted. The second switching transistor ST2, the fourth switching transistor ST4, and the fifth switching transistor ST5 may be turned on by the second scan signal SCAN2 at a low level, the first selection transistor TP1 may be turned on by the first selection signal Ss at a low level, and the third switching transistor ST3 may be turned on by the light-emitting signal EM at a low level.

The first node N1 may be initialized to the reference voltage Vref through the turned-on third switching transistor ST3. The voltage of the anode electrode of the first type light-emitting element EDa may be initialized to the reference voltage Vref through the turned-on fourth switching transistor ST4, and the voltage of the anode electrode of the second type light-emitting element EDb may be initialized to the reference voltage Vref through the turned-on fifth switching transistor ST5. Further, the driving transistor DT is diode-connected through the turned-on second switching transistor ST2, and the gate electrode and the drain electrode of the driving transistor DT are short-circuited, such that the driving transistor DT may operate as a diode. Further, the reference voltage Vref, which is transmitted to the anode electrode of the first type light-emitting element EDa through the turned-on fourth switching transistor ST4, may be transmitted to the third node N3 and the second node N2 through the turned-on first selection transistor TP1, such that the third node N3 and the second node N2 may be initialized to the reference voltage Vref.

Next, during a sampling period, the first scan signal SCAN1 at a low level and the second scan signal SCAN2 at a low level may be outputted, and the first selection signal Ss at a high level may be outputted. When the light-emitting signal EM at a high level is outputted, the first switching transistor ST1 is turned on by the first scan signal SCAN1 at a low level at the same time when the third switching transistor ST3 is turned off, such that the data signal may be transmitted to the first node N1. Further, the driving transistor DT is diode-connected by the turned-on second switching transistor ST2, and a voltage difference between the first power voltage VDD and a threshold voltage may be sampled and supplied to the second node N2.

Further, during a holding period, the first scan signal SCAN1 and the second scan signal SCAN2 may be outputted at a high level, and all the first switching transistor ST1, the second switching transistor ST2, the fourth switching transistor ST4, and the fifth switching transistor ST5 may be turned off. However, even though the first switching transistor ST1 is turned off, the data signal (data voltage), which is inputted during the previous period (e.g., the sampling period), may be maintained by the second capacitor C2.

Lastly, during a light-emitting period, the first selection signal Ss and the light-emitting signal EM at a low level may be outputted, and the second selection signal Ps at a high level may be outputted. The reference voltage Vref may be applied to the first node N1 through the third switching transistor ST3 turned on by the light-emitting signal EM at a low level. A voltage of the first node N1 may be a voltage difference between the reference voltage Vref and the data signal (data voltage), and this change in voltage may also be applied to the second node N2. A gate-source voltage of the driving transistor DT may be set to a value (Vdata−Vref+Vth) made by subtracting the reference voltage Vref from the data signal (data voltage) and adding the threshold voltage Vth, thereby controlling the first drive current.

Further, the first drive current is supplied from the driving transistor DT to the first type light-emitting element EDa through the turned-on first selection transistor TP1, such that the first type light-emitting element EDa may emit light. However, the second selection signal Ps is outputted at a high level, and the second selection transistor TP2 is turned off, such that the second drive current is not transmitted from the driving transistor DT to the second type light-emitting element EDb. Therefore, when the pixel circuit SPC_1 operates in the first state, the first drive current may be applied only to the first type light-emitting element EDa, and only the first type light-emitting element EDa may emit light.

Next, the case in which the pixel circuit SPC_1 operates in the second state will be described with reference to FIGS. 4 and 5B. The pixel circuit SPC_1 may operate in the second state in substantially the same way as a case in which the pixel circuit SPC_1 operates in the first state, except that the first selection signal Ss and the second selection signal Ps are outputted in the opposite way to the first state. For example, the first selection signal Ss may be outputted only at a high level, for example, a turn-off level, and the second selection signal Ps may be outputted at a low level, for example, a turn-on level during the light-emitting period for which the second type light-emitting element EDb emits light.

Specifically, during the initialization period, the first scan signal SCAN1 may be outputted at a high level, and the second scan signal SCAN2 may be outputted at a low level. Further, the first selection signal Ss may be outputted at a high level, and the second selection signal Ps and the light-emitting signal EM may be outputted at a low level. Therefore, the second switching transistor ST2, the fourth switching transistor ST4, and the fifth switching transistor ST5 may be turned on by the second scan signal SCAN2, the second selection transistor TP2 may be turned on by the second selection signal Ps, and the third switching transistor ST3 may be turned on by the light-emitting signal EM.

The first node N1 may be initialized to the reference voltage Vref through the third switching transistor ST3 turned on by the light-emitting signal EM, and the anode electrodes of the first and second type light-emitting element EDa and EDb may be initialized to the reference voltage Vref by the fourth switching transistor ST4 and the fifth switching transistor ST5 turned on by the second scan signal SCAN2. Further, the driving transistor DT may be diode-connected through the turned-on second switching transistor ST2 and operate as a diode. Lastly, the reference voltage Vref, which is transmitted to the anode electrode of the second type light-emitting element EDb through the turned-on fifth switching transistor ST5, may be transmitted to the third node N3 and the second node N2 through the turned-on second selection transistor TP2, such that the third node N3 and the second node N2 may be initialized to the reference voltage Vref.

Next, during the sampling period, the first scan signal SCAN1 at a low level and the second scan signal SCAN2 at a low level may be outputted, and the second selection signal Ps and the light-emitting signal EM may be outputted from a low level to a high level. When the light-emitting signal EM at a high level is outputted, the third switching transistor ST3 may be turned off, and the first switching transistor ST1 is turned on by the first scan signal SCAN1 at a low level, such that the data signal may be transmitted to the first node N1. Further, the driving transistor DT is diode-connected by the turned-on second switching transistor ST2, and the voltage difference between the first power voltage VDD and the threshold voltage may be sampled and supplied to the second node N2.

Lastly, during the light-emitting period, the second selection signal Ps and the light-emitting signal EM at a low level may be outputted, and the first selection signal Ss at a high level may be outputted. The reference voltage Vref may be applied to the first node N1 through the third switching transistor ST3 turned on by the light-emitting signal EM at a low level. The voltage of the first node N1 may be a voltage difference between the reference voltage Vref and the data signal (data voltage), and this change in voltage may also be applied to the second node N2. The gate-source voltage of the driving transistor DT may be set to a value (Vdata−Vref+Vth) made by subtracting the reference voltage Vref from the data signal (data voltage) and adding the threshold voltage Vth, thereby controlling the second drive current.

Further, the second drive current is supplied to from the driving transistor DT to the second type light-emitting element EDb through the turned-on second selection transistor TP2, such that the second type light-emitting element EDb may emit light. However, the first selection signal Ss is outputted at a high level, and the first selection transistor TP1 is turned off, such that the first drive current is not transmitted from the driving transistor DT to the first type light-emitting element EDa. Therefore, when the pixel circuit SPC_1 operates in the second state, the second drive current may be applied only to the second type light-emitting element EDb, and only the second type light-emitting element EDb may emit light.

Meanwhile, although not illustrated in FIGS. 5A and 5B, both the first type light-emitting element EDa and the second type light-emitting element EDb emit light in case that the pixel circuit SPC_1 operates in the third state. Therefore, the waveform of the first selection signal Ss and the operation of the pixel circuit SPC_1, which generates the first drive current in accordance with the waveform of the first selection signal Ss in the third state are substantially identical or similar to the waveform of the first selection signal Ss and the operation of the pixel circuit SPC_1, which generates the first drive current in accordance with the waveform of the first selection signal Ss in the first state described with reference to FIG. 5A. Further, the waveform of the second selection signal Ps and the operation of the pixel circuit SPC_1, which generates the second drive current in accordance with the waveform of the second selection signal Ps in the third state are substantially identical or similar to the waveform of the second selection signal Ps and the operation of the pixel circuit SPC_1, which generates the second drive current in accordance with the waveform of the second selection signal Ps in the second state described with reference to FIG. 5B. Therefore, a repeated description will be omitted.

Figure 6:
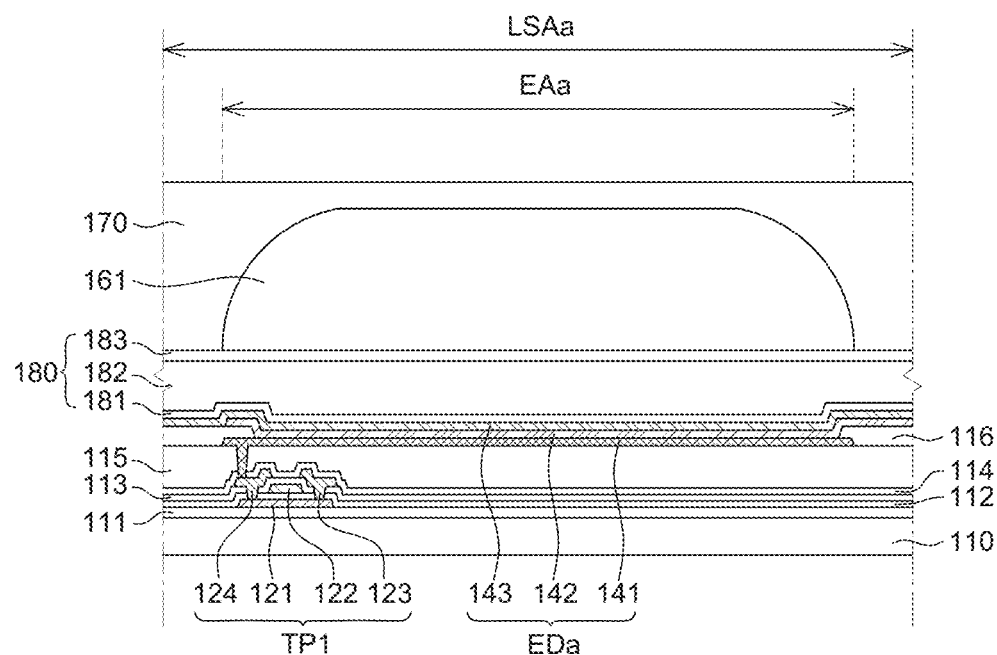
FIGS. 6 and 7 are cross-sectional views of the display device according to the example embodiment of the present specification.
Figure 7:
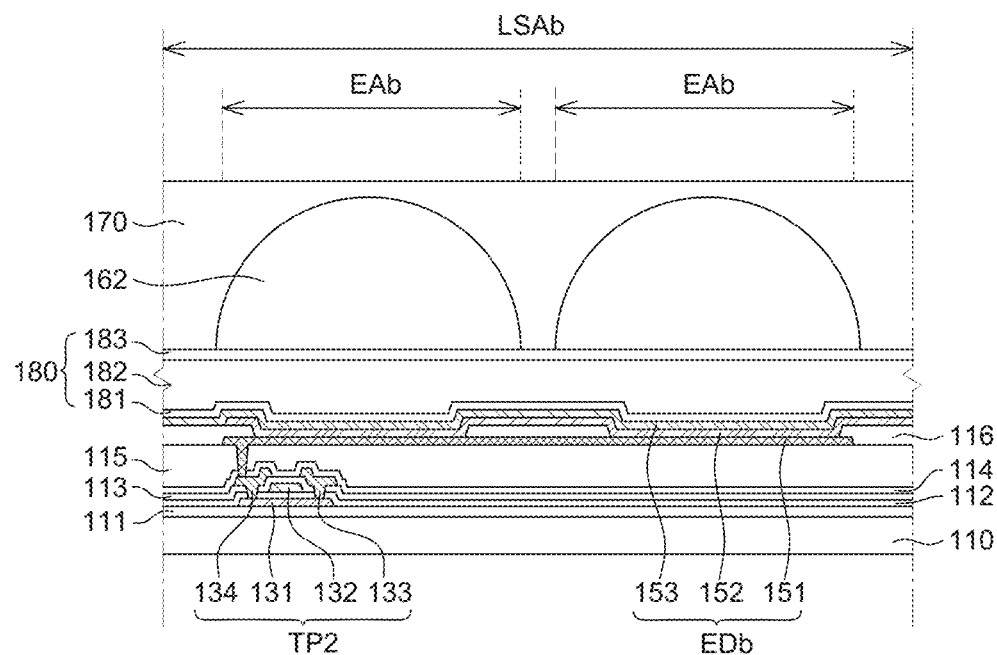

FIGS. 6 and 7 are cross-sectional views of the display device according to the embodiment of the present specification.

FIG. 6 illustrates a pixel in which a first type lens 161 is disposed, and FIG. 7 illustrates a pixel in which a second type lens 162 is disposed.

With reference to FIGS. 6 and 7, the display device 100 according to the embodiment of the present specification may include a substrate 110, a buffer film 111, a gate insulation film 112, an interlayer insulation film 113, a lower protective film 114, an overcoating layer 115, a bank insulation film 116, the first selection transistor TP1, the second selection transistor TP2, the first type light-emitting element EDa, the second type light-emitting element EDb, the first type lens 161, the second type lens 162, a lens protective film 170, and an encapsulation member 180.

The substrate 110 may include an insulating material. The substrate 110 may include a transparent material. For example, the substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example and is not necessarily limited thereto.

The buffer film 111 may be disposed on the substrate 110. The buffer film 111 may include an insulating material. For example, the buffer film 111 may include an inorganic insulating material such as silicon oxide ($SiO_x$) and silicon nitride ($SiN_x$). The buffer film 111 may have a multilayer structure. For example, the buffer film 111 may have a stacked structure including a film made of silicon nitride ($SiN_x$) and a film made of silicon oxide ($SiO_x$), but the present disclosure is not limited thereto.

The buffer film 111 may be positioned between the substrate 110 and a drive part, e.g., the drive circuit DC of each of the pixels PX. The buffer film 111 may suppress or reduce contamination caused by the substrate 110 during a process of forming the drive part. For example, a top surface of the substrate 110, which is directed toward the drive part of each of the pixels PX, may be covered by the buffer film 111. The drive part of each of the pixels PX may be positioned on the buffer film 111.

The gate insulation film 112 may be disposed on the buffer film 111. The gate insulation film 112 may include an insulating material. For example, the gate insulation film 112 may include an inorganic insulating material such as silicon oxide ($SiO_x$) and silicon nitride ($SiN_x$). The gate insulation film 112 may include a material having high permittivity. For example, the gate insulation film 112 may include a high-K material such as hafnium oxide (HfO). The gate insulation film 112 may have a multilayer structure.

The gate insulation film 112 may extend between semiconductor layers 121 and 131 and gate electrodes 122 and 132 of the selection transistors TP1 and TP2. For example, the gate electrodes of the switching transistor ST and the driving transistor DT may be insulated from the semiconductor layers of the switching transistor ST and the driving transistor DT by the gate insulation film 112. The gate insulation film 112 may cover a semiconductor layer of each of the pixels PX. The gate electrodes of the switching transistor ST and the driving transistor DT may be positioned on the gate insulation film 112.

The interlayer insulation film 113 may be disposed on the gate insulation film 112. The interlayer insulation film 113 may include an insulating material. For example, the interlayer insulation film 113 may include an inorganic insulating material such as silicon oxide ($SiO_x$) and silicon nitride ($SiN_x$). The interlayer insulation film 113 may extend between the gate electrodes and the source electrodes and between the gate electrodes and the drain electrodes of the driving transistor DT and the switching transistor ST. For example, the source electrodes and the drain electrodes of the driving transistor DT and the switching transistor ST may be insulated from the gate electrodes by the interlayer insulation film 113. The interlayer insulation film 113 may cover the gate electrodes of the switching transistor ST and the driving transistor DT. The source electrode and the drain electrode in each of the pixels PX may be positioned on the interlayer insulation film 113. The gate insulation film 112 and the interlayer insulation film 113 may expose source and drain areas of each semiconductor pattern positioned in each of the pixels PX.

The lower protective film 114 may be disposed on the interlayer insulation film 113. The lower protective film 114 may include an insulating material. For example, the lower protective film 114 may include an inorganic insulating material such as silicon oxide ($SiO_x$) and silicon nitride ($SiN_x$). The lower protective film 114 may suppress or reduce damage to the drive part caused by external moisture and impact. The lower protective film 114 may extend along a surface of the driving transistor DT and a surface of the switching transistor ST that are opposite to the substrate 110. The lower protective film 114 may be in contact with the interlayer insulation film 113 outside the drive part positioned in each of the pixels PX.

The overcoating layer 115 may be disposed on the lower protective film 114. The overcoating layer 115 may include an insulating material. The overcoating layer 115 may include a material different from the material of the lower protective film 114. For example, the overcoating layer 115 may include an organic insulating material. For example, the overcoating layer 115 may include one or more materials of acrylic resin, epoxy resin, phenolic resin, polyamides resin, unsaturated polyesters resin, polyphenylene resin, polyphenylene sulfides resin, and benzocyclobutene, but embodiments are not limited thereto. The overcoating layer 115 may remove a level difference caused by the drive part in each of the pixels PX. For example, a top surface of the overcoating layer 115, which is opposite to the substrate 110, may be a flat surface.

The first selection transistor TP1 and the second selection transistor TP2 may be disposed on the substrate 110. The first selection transistor TP1 may be electrically connected between the drain electrode of the driving transistor DT and a first lower electrode 141 of the first type light-emitting element EDa. The second selection transistor TP2 may be electrically connected between the drain electrode of the driving transistor DT and a second lower electrode 151 of the second type light-emitting element EDb.

The first selection transistor TP1 may include a first semiconductor layer 121, a first gate electrode 122, a first source electrode 123, and a first drain electrode 124. The first selection transistor TP1 may have the same or similar structure as the switching transistor ST and the driving transistor DT. For example, the first semiconductor layer 121 may be positioned between the buffer film 111 and the gate insulation film 112, and the first gate electrode 122 may be positioned between the gate insulation film 112 and the interlayer insulation film 113. The first source electrode 123 and the first drain electrode 124 may be positioned between the interlayer insulation film 113 and the lower protective film 114. The first gate electrode 122 may overlap a channel area of the first semiconductor layer 121. The first source electrode 123 may be electrically connected to a source area of the first semiconductor layer 121. The first drain electrode 124 may be electrically connected to a drain area of the first semiconductor layer 121.

The second selection transistor TP2 may include a second semiconductor layer 131, a second gate electrode 132, a second source electrode 133, and a second drain electrode 134. For example, the second semiconductor layer 131 may be positioned on the same layer as the first semiconductor layer 121, the second gate electrode 132 may be positioned on the same layer as the first gate electrode 122, and the second source electrode 133 and the second drain electrode 134 may be positioned on the same layer as the first source electrode 123 and the first drain electrode 124.

The first type light-emitting element EDa and the second type light-emitting element EDb in each of the pixels PX may be disposed on the overcoating layer 115 in the corresponding the pixel PX.

The first type light-emitting element EDa may emit light with a particular color. For example, the first type light-emitting element EDa may include the first lower electrode 141, a first light-emitting layer 142, and a first upper electrode 143 sequentially stacked on the substrate 110.

The first lower electrode 141 may include an electrically conductive material. The first lower electrode 141 may include a material having high reflectance. For example, the first lower electrode 141 may include metal such as aluminum (Al) and silver (Ag). The first lower electrode 141 may have a multilayer structure. For example, the first lower electrode 141 may have a structure in which a reflective electrode, which is made of metal, is positioned between transparent electrodes made of a transparent conductive material such as ITO and IZO. The first lower electrode 141 may be electrically connected to the first drain electrode 124 of the first selection transistor TP1 through contact holes formed through the lower protective film 114 and the overcoating layer 115.

The first light-emitting layer 142 may create light with brightness corresponding to a voltage difference between the first lower electrode 141 and the first upper electrode 143. For example, the first light-emitting layer 142 may include an emission material layer (EML) including a light-emitting material. The light-emitting material may include an organic material, an inorganic material, or a hybrid material.

The first light-emitting layer 142 may have a multilayer structure. For example, the first light-emitting layer 142 may further include at least one of a hole injection layer (HIL), a hole transport layer (HTL), an electron transport layer (ETL), and an electron injection layer (EIL).

The first upper electrode 143 may include an electrically conductive material. The first upper electrode 143 may include a material different from the material of the first lower electrode 141. A transmittance rate of the first upper electrode 143 may be higher than a transmittance rate of the first lower electrode 141. For example, the first upper electrode 143 may be configured as a transparent electrode made of a transparent conductive material such as ITO and IZO. Therefore, in the display device 100 according to the embodiment of the present specification, the light created by the first light-emitting layer 142 may be discharged through the first upper electrode 143.

The second type light-emitting element EDb may implement the same color as the first type light-emitting element EDa. The second type light-emitting element EDb may have the same or similar structure as the first type light-emitting element EDa. For example, the second type light-emitting element EDb may include the second lower electrode 151, a second light-emitting layer 152, and a second upper electrode 153 sequentially stacked on the substrate 110.

The second lower electrode 151 may correspond to the first lower electrode 141, the second light-emitting layer 152 may correspond to the first light-emitting layer 142, and the second upper electrode 153 may correspond to the first upper electrode 143. For example, the second lower electrode 151 may be formed for the second type light-emitting element EDb while having the same or similar structure as the first lower electrode 141. The same may apply to the second light-emitting layer 152 and the second upper electrode 153. For example, the first type light-emitting element EDa and the second type light-emitting element EDb may be formed to have the same or similar structure. However, the present specification is not limited thereto. In some instances, the first type light-emitting element EDa and the second type light-emitting element EDb may be formed to be different from each other in at least some configurations.

The second light-emitting layer 152 may be spaced apart from the first light-emitting layer 142. Therefore, in the display device according to the embodiment of the present specification, it is possible to suppress or reduce light emission caused by a leakage current.

The second lower electrode 151 in each of the pixels PX may be spaced apart from the first lower electrode 141 in the corresponding pixel PX. For example, the bank insulation film 116 may be disposed between the first lower electrode 141 and the second lower electrode 151 in each of the pixels PX. The bank insulation film 116 may include an insulating material. For example, the bank insulation film 116 may include an organic insulating material such as acryl resin, epoxy resin, phenolic resin, polyamide resin, and/or polyimide resin, etc. Alternatively, the bank insulation film 116 may include an inorganic insulating material such as silicon nitride, aluminum nitride, zirconium nitride, titanium nitride, hafnium nitride, tantalum nitride, silicon oxide, aluminum oxide, or titanium oxide, etc. The bank insulation film 116 may include a material different from the material of the overcoating layer 115. In addition, the bank insulation film 116 serves to define a pixle or sub-pixel. Thus, the bank insulation film 116 may be made of an insulating material containing a black material. The bank insulation film 116 may be made of, for example, a transparent carbon-based mixture. Specifically, the bank insulation film 116K may contain carbon black, but is not limited thereto. The bank insulation film 116 may also be made of a transparent insulating material.

The second lower electrode 151 in each of the pixels PX may be insulated from the first lower electrode 141 in the corresponding pixel PX by the bank insulation film 116. For example, the bank insulation film 116 may cover an edge of the first lower electrode 141 and an edge of the second lower electrode 151 positioned in each of the pixels PX. Therefore, the display device 100 may provide the user with images formed by a first type lens area LSAa in each of the pixels PX in which the first type light-emitting element EDa is positioned, or images formed by a second type lens area LSAb in each of the pixels PX in which the second type light-emitting element EDb is positioned.

The first light-emitting layer 142 and the first upper electrode 143 of the first type light-emitting element EDa positioned in each of the pixels PX may be stacked in a partial area of the corresponding first lower electrode 141 exposed by the bank insulation film 116. The second light-emitting layer 152 and the second upper electrode 153 of the second type light-emitting element EDb positioned in each of the pixels PX may be stacked in a partial area of the corresponding second lower electrode 151 exposed by the bank insulation film 116. For example, in each of the pixels PX, the bank insulation film 116 may be divided into a first type light-emitting area EAa in which light is emitted by the first type light-emitting element EDa, and a second type light-emitting area EAb in which light is emitted by the second type light-emitting element EDb. In each of the pixels PX, a size of the defined second type light-emitting area EAb may be smaller than a size of the defined first type light-emitting area EAa.

In each of the pixels PX, the second upper electrode 153 may be electrically connected to the first upper electrode 143 in the corresponding pixel PX. For example, a voltage, which is applied to the second upper electrode 153 of the second type light-emitting element EDb positioned in each of the pixels PX, may be equal to a voltage applied to the first upper electrode 143 of the first type light-emitting element EDa positioned in the corresponding pixel PX. The second upper electrode 153 in each of the pixels PX may include the same material as the first upper electrode 143 in the corresponding pixel PX. For example, the second upper electrode 153 in each of the pixels PX may be formed simultaneously with the first upper electrode 143 in the corresponding pixel PX. The second upper electrode 153 in each of the pixels PX may extend on the bank insulation film 116 and be in direct contact with the first upper electrode 143 in the corresponding pixel PX. The brightness of the first type lens area LSAa positioned in each of the pixels PX and the brightness of the second type lens area LSAb positioned in each of the pixels PX may be controlled by the drive current generated in the corresponding pixel PX.

The encapsulation member 180 may be positioned on the first type light-emitting element EDa and the second type light-emitting element EDb in each of the pixels PX. The encapsulation member 180 may suppress or reduce damage to the light-emitting elements EDa and EDb caused by moisture and impact from the outside. The encapsulation member 180 may have a multilayer structure. For example, the encapsulation member 180 may include a first encapsulation layer 181, a second encapsulation layer 182, and a third encapsulation layer 183 sequentially stacked. However, the present specification is not limited thereto. The first encapsulation layer 181, the second encapsulation layer 182, and the third encapsulation layer 183 may include an insulating material. The second encapsulation layer 182 may include a material different from the material of the first encapsulation layer 181 and the third encapsulation layer 183. For example, the first encapsulation layer 181 and the third encapsulation layer 183 are inorganic encapsulation layers including an inorganic insulating material, and the second encapsulation layer 182 may include an organic encapsulation layer including an organic insulating material. Therefore, damage to the light-emitting elements EDa and EDb of the display device 100 caused by moisture and impact from the outside may be more effectively suppressed or reduced.

The first type lens 161 and the second type lens 162 may be disposed on the encapsulation member 180.

The first type lens 161 may be disposed on the first type light-emitting element EDa. The light, which is created by the first type light-emitting element EDa in each of the pixels PX, may be discharged through the first type lens 161 in the corresponding pixel PX. The first type lens 161 may have a shape in which at least light in one direction may not be restricted. For example, a planar shape of the first type lens 161 positioned in each of the pixels PX may be a bar shape extending in one direction.

In this case, a propagation direction of light emitted from the first type lens area LSAa in each of the pixels PX may not be limited to one direction. For example, the content (or images) provided through the first type lens area LSAa in each of the pixels PX may be shared with surrounding people adjacent to the user in one direction. Therefore, the content, which is provided by the light emitted through the first type lens 161, may be provided in a first viewing angle range having a larger viewing angle than the content provided by the light emitted through the second type lens 162.

For example, the content, which is provided by the light emitted through the first type lens 161, may be provided in a wide visual field mode (share mode).

The second type lens 162 may be disposed on the second type light-emitting element EDb. The light, which is created by the second type light-emitting element EDb in each of the pixels PX, may be discharged through the second type lens 162 in the corresponding pixel PX. The second type lens 162 may restrict the propagation direction, in which the light passes through the second type lens 162, to one direction and/or another direction. For example, a planar shape of the second type lens 162 positioned in each of the pixels PX may be a circular shape.

In this case, the propagation direction of the light emitted from the second type lens area LSAb in each of the pixels PX may be limited to one direction and/or another direction. For example, the content (or images) provided by the second type lens area LSAb in each of the pixels PX may not be shared with surrounding people adjacent to the user. Therefore, the content, which is provided by the light emitted through the second type lens 162, may be provided in a second viewing angle range having a smaller viewing angle than the content provided by the light emitted through the first type lens 161. For example, the content, which is provided by the light emitted through the second type lens 162, may be provided in a narrow visual field mode (private mode).

The first type light-emitting area EAa provided in each of the pixels PX may have a shape corresponding to the first type lens 161 in each of the pixels PX. For example, a planar shape of the first type light-emitting area EAa in each of the pixels PX may be a bar shape extending in one direction. The first type lens 161 may have a larger size than the first type light-emitting area EAa in the corresponding pixel PX. Therefore, it is possible to improve the efficiency of the light emitted from the first type light-emitting area EAa in the pixel PX.

The second type light-emitting area EAb in each of the pixels PX may have a shape corresponding to the second type lens 162 in each of the pixels PX. For example, a planar shape of the second type light-emitting area EAb in each of the pixels PX may be a circular shape. The second type lens 162 may have a larger size than the second type light-emitting area EAb in the corresponding pixel PX. Therefore, it is possible to improve the efficiency of the light emitted from the second type light-emitting area EAb in the pixel PX.

With reference to FIG. 6, in case that the pixel PX includes the first type lens 161, the first type lens area LSAa, in which the first type lens 161 is disposed, may include one light-emitting area, e.g., one first type light-emitting area EAa. In addition, with reference to FIG. 7, in case that the pixel PX includes the second type lens 162, the second type lens area LSAb, in which the second type lens 162 is disposed, may include a plurality of light-emitting areas, e.g., a plurality of second type light-emitting areas EAb.

With reference to FIG. 6, in case that the pixel PX includes the first type lens 161, one first type lens 161 may be disposed in the first type lens area LSAa. Therefore, the number of first type light-emitting areas EAa of the first type light-emitting element EDa defined by the bank insulation film 116 may be one corresponding to one first type lens 161.

In addition, with reference to FIG. 7, in case that the pixel PX includes the second type lens 162, the two second type lenses 162 may be disposed in the second type lens area LSAb. Therefore, the number of second type light-emitting areas EAb of the second type light-emitting element EDb defined by the bank insulation film 116 may be two corresponding to the two second type lenses 162. However, the present disclosure is not limited thereto, the number of second type light-emitting areas EAb of the second type light-emitting element EDb defined by the bank insulation film 116 may be three or more, and the planar shape of the second type light-emitting area EAb in each of the pixels PX may be various other shapes other than the circular shape, such as an ellipse or oval shape.

The lens protective film 170 may be positioned on the first type lens 161 and the second type lens 162 in the pixel PX. The lens protective film 170 may include an insulating material. For example, the lens protective film 170 may include an organic insulating material. A refractive index of the lens protective film 170 may be smaller than a refractive index of the first type lens 161 and a refractive index of the second type lens 162 positioned in each of the pixels PX. Therefore, in the display device 100 according to the embodiment of the present specification, the light, which has passed through the first type lens 161 and the second type lens 162 in each of the pixels PX, may not be reflected toward the substrate 110 because of a difference from the refractive index of the lens protective film 170.

With reference to FIGS. 6 and 7, as described above, the pixel PX may include the first type lens 161 disposed above the first type light-emitting element EDa, and the second type lens 162 disposed above the second type light-emitting element EDb. However, the present disclosure is not limited thereto.

For example, the pixel PX may include the plurality of first type lenses 161 disposed above the first type light-emitting element EDa and the second type light-emitting element EDb. This configuration will be described below in detail with reference to FIGS. 8A and 8B.

Figure 8A:
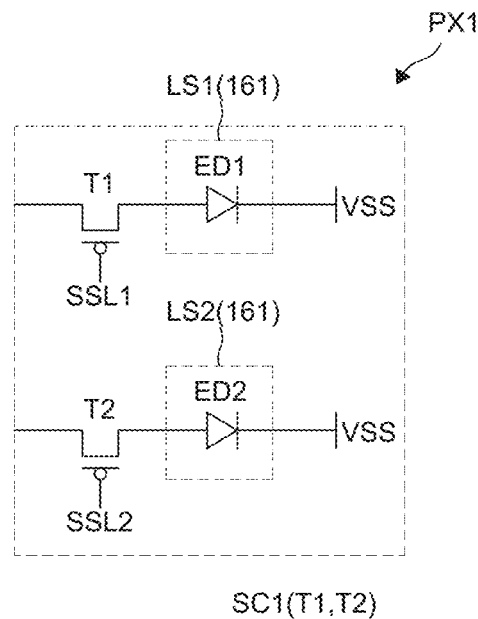
FIG. 8A is a circuit diagram illustrating an example of a first pixel of the display device according to the example embodiment of the present specification.
Figure 8B:
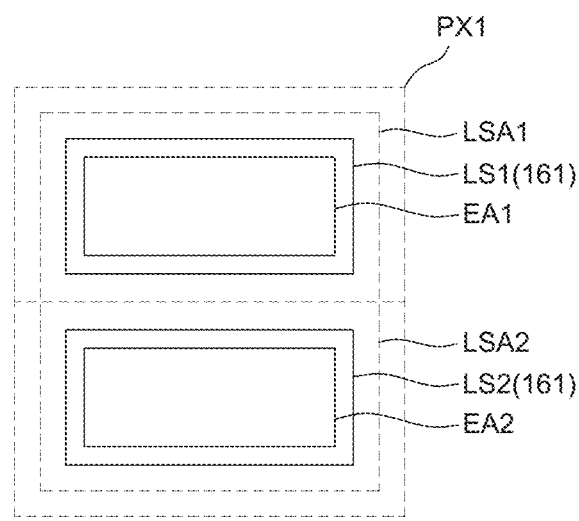
FIG. 8B is a top plan view schematically illustrating an example of the first pixel of the display device according to the example embodiment of the present specification.

FIG. 8A is a circuit diagram illustrating an example of the first pixel of the display device according to the embodiment of the present specification. FIG. 8B is a top plan view schematically illustrating an example of the first pixel of the display device according to the embodiment of the present specification.

Meanwhile, FIGS. 8A and 8B illustrate an example of a first pixel PX1 among the plurality of pixels PX disposed on the display panel PN of the display device 100 according to the embodiment of the present specification described with reference to FIG. 2.

Meanwhile, the first pixel PX1 illustrated in FIG. 8A may include the pixel circuit SPC described with reference to FIG. 3 or the pixel circuit SPC_1 described with reference to FIG. 4. Therefore, a repeated description of the contents identical to the contents described with reference to FIGS. 3 and 4 will be omitted.

In addition, for convenience of description, FIGS. 8A and 8B illustrate only the selection circuit, the plurality of light-emitting elements, and the plurality of lenses among the components included in the first pixel PX1. For convenience of description, FIG. 8A schematically illustrates only a corresponding relationship between the plurality of lenses indicated by the dotted line.

First, with reference to FIGS. 3, 4, and 8A, the first pixel PX1 may include a first selection circuit SC1 and a plurality of light-emitting elements ED1 and ED2.

The first selection circuit SC1 may include a first transistor T1 and a second transistor T2. The first transistor T1 and the second transistor T2 in FIG. 8A may be transistors respectively corresponding to the first selection transistor TP1 and the second selection transistor TP2 described with reference to FIGS. 3 and 4.

A gate electrode of the first transistor T1 may be turned on or off in response to a selection signal provided from a first selection signal line SSL1, and a gate electrode of the second transistor T2 may be turned on or off in response to a selection signal provided from a second selection signal line SSL2. In this case, the selection signal, which is provided from the first selection signal line SSL1, and the selection signal, which is provided from the second selection signal line SSL2, may respectively be the first selection signal Ss and the second selection signal Ps described with reference to FIGS. 3 and 4. However, the present disclosure is not limited thereto.

The plurality of light-emitting elements ED1 and ED2 included in the first pixel PX1 may include a first light-emitting element ED1 and a second light-emitting element ED2. Substantially identically or similarly to the configuration described with reference to FIGS. 3 and 4, the first light-emitting element ED1 of the first pixel PX1 may be connected between the first transistor T1 and the second power line configured to provide the second power voltage VSS, e.g., the low-potential power voltage, and the second light-emitting element ED2 of the first pixel PX1 may be connected between the second transistor T2 and the second power line configured to provide the second power voltage VSS. For example, the first light-emitting element ED1 and the second light-emitting element ED2 in FIG. 8A may be light-emitting elements respectively corresponding to the first type light-emitting element EDa and the second type light-emitting element EDb described with reference to FIGS. 3 and 4.

Therefore, when the first transistor T1 is turned on in response to the selection signal at a turn-on level provided from the first selection signal line SSL1, a first drive current passing through the first light-emitting element ED1 may be formed, such that the first light-emitting element ED1 of the first pixel PX1 may emit light.

In addition, when the second transistor T2 is turned on in response to the selection signal at a turn-on level provided from the second selection signal line SSL2, a second drive current passing through the second light-emitting element ED2 may be formed, such that the second light-emitting element ED2 of the first pixel PX1 may emit light.

The first pixel PX1 may operate in the third state in which both the first light-emitting element ED1 and the second light-emitting element ED2 emit light.

The first pixel PX1 may include a first lens LS1 disposed above the first light-emitting element ED1, and a second lens LS2 disposed above the second light-emitting element ED2.

With reference further to FIG. 8B to more specifically describe the first lens LS1 and the second lens LS2, the first pixel PX1 may include a first lens area LSA1 and a second lens area LSA2 in which the first light-emitting element ED1 and the second light-emitting element ED2 are positioned, respectively.

The first lens area LSA1 and the second lens area LSA2 may provide images at substantially the same viewing angle. The brightness of the first lens area LSA1 may be controlled by the first drive current created by the first light-emitting element ED1, and the brightness of the second lens area LSA2 may be controlled by the second drive current created by the second light-emitting element ED2.

The first lens LS1 may be positioned above the first light-emitting element ED1, and the second lens LS2 may be positioned above the second light-emitting element ED2.

The first lens LS1 and the second lens LS2 may each have a first shape. The first lens LS1 and the second lens LS2 may each have a shape in which at least light in one direction may not be restricted. For example, a planar shape of each of the first lens LS1 and the second lens LS2 positioned in the first pixel PX1 may be a bar shape extending in one direction. For example, the first lens LS1 and the second lens LS2 may each be implemented as the first type lens 161 described with reference to FIG. 6.

In this case, in case that the light created by the first light-emitting element ED1 of the first pixel PX1 is emitted through the first lens LS1 or the light created by the second light-emitting element ED2 is emitted through the second lens LS2, the propagation direction of the corresponding light may not be limited to one direction.

A first light-emitting area EA1 defined by the first light-emitting element ED1 of the first pixel PX1 may have a shape corresponding to the first lens LS1, and a second light-emitting area EA2 defined by the second light-emitting element ED2 of the first pixel PX1 may have a shape corresponding to the second lens LS2.

For example, as illustrated in FIG. 8B, a planar shape of the first light-emitting area EA1 and a planar shape of the second light-emitting area EA2 may each be a bar shape extending in one direction so as to correspond to the shape of the first lens LS1 and the shape of the second lens LS2. In addition, in this case, the first lens LS1 positioned in the first lens area LSA1 may have a larger size than the first light-emitting area EA1 included in the first lens area LSA1, and the second lens LS2 positioned in the second lens area LSA2 may have a larger size than the second light-emitting area EA2 included in the second lens area LSA2. Therefore, it is possible to improve the efficiency of the light emitted from the first light-emitting area EA1 and the second light-emitting area EA2 of the first pixel PX1.

Because the first lens LS1 and the second lens LS2 are implemented as the first type lens 161, the first lens area LSA1 and the second lens area LSA2 may each include one light-emitting area, e.g., one first light-emitting area EA1 and one second light-emitting area EA2 and include one lens, e.g., one first lens LS1 and one second lens LS2, as described with reference to FIG. 6.

Therefore, in case that the first drive current is formed in the first pixel PX1 and the first light-emitting element ED1 emits light, the light, which is created by the first light-emitting element ED1 of the first pixel PX1, is emitted through the first lens LS1 implemented as the first type lens 161. Therefore, the content provided by the light created by the first light-emitting element ED1 of the first pixel PX1 may be provided at the first viewing angle. For example, the provided content (or images) may be shared with surrounding people adjacent to the user in one direction. Therefore, the content provided by the light emitted through the first lens LS1 may be provided in the wide visual field mode (share mode).

In addition, in case that the second drive current is formed in the first pixel PX1 and the second light-emitting element ED2 emits light, the light, which is created by the second light-emitting element ED2 of the first pixel PX1, is emitted through the second lens LS2 implemented as the first type lens 161. Therefore, the content provided by the light created by the second light-emitting element ED2 of the first pixel PX1 may be provided at the first viewing angle. For example, the provided content (or images) may be shared with surrounding people adjacent to the user in one direction. Therefore, the content provided by the light emitted through the second lens LS2 may be provided in the wide visual field mode (share mode).

For example, in the case of the first pixel PX1, both the content, which is provided by the light created by the first light-emitting element ED1, and the content, which is provided by the light created by the second light-emitting element ED2, may be provided at the first viewing angle.

In this case, as described above, the first pixel PX1 may operate in the third state in which both the first light-emitting element ED1 and the second light-emitting element ED2 emit light. Therefore, in case that the first pixel PX1 operates in the third state, the content may be provided at the first viewing angle by the light created by the first light-emitting element ED1 and the light created by the second light-emitting element ED2.

As described above, the first area, in which the first pixel PX1, which operates in the third state, is disposed among the plurality of areas of the display panel PN, may provide the content in the wide visual field mode regardless of the drive mode.

Figure 9A:
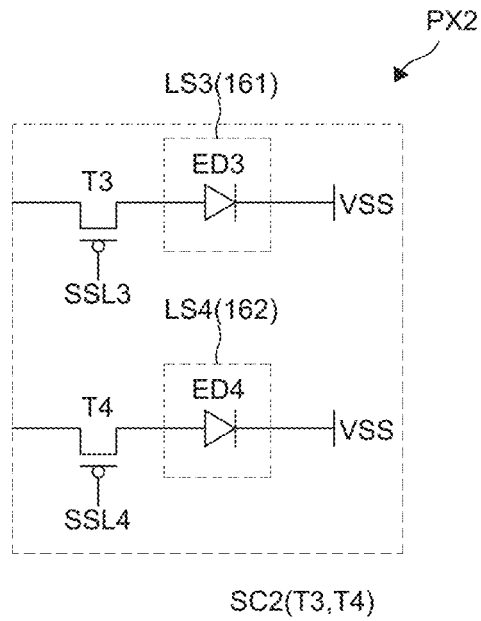
FIG. 9A is a circuit diagram illustrating an example of a second pixel of the display device according to the example embodiment of the present specification.
Figure 9B:
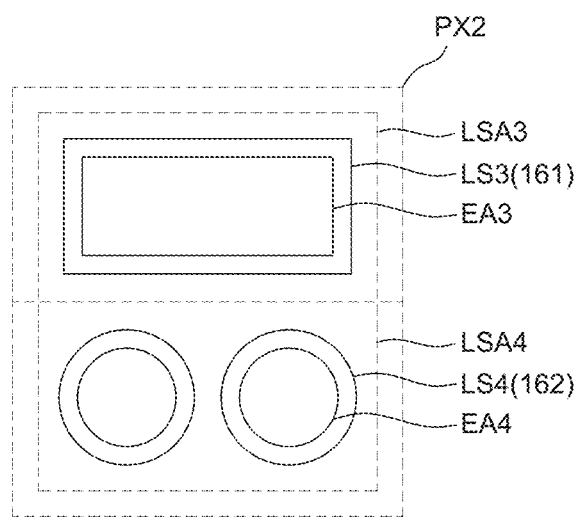
FIG. 9B is a top plan view schematically illustrating an example of the second pixel of the display device according to the example embodiment of the present specification.

FIG. 9A is a circuit diagram illustrating an example of the second pixel of the display device according to the embodiment of the present specification. FIG. 9B is a top plan view schematically illustrating an example of the second pixel of the display device according to the embodiment of the present specification.

Meanwhile, FIGS. 9A and 9B illustrate an example of a second pixel PX2 among the plurality of pixels PX disposed on the display panel PN of the display device 100 according to the embodiment of the present specification described with reference to FIG. 2.

Meanwhile, the second pixel PX2 illustrated in FIG. 9A may include the pixel circuit SPC described with reference to FIG. 3 or the pixel circuit SPC_1 described with reference to FIG. 4. Therefore, a repeated description of the contents identical to the contents described with reference to FIGS. 3 and 4 will be omitted.

In addition, for convenience of description, FIGS. 9A and 9B illustrate only the selection circuit, the plurality of light-emitting elements, and the plurality of lenses among the components included in the second pixel PX2. For convenience of description, FIG. 9A schematically illustrates only a corresponding relationship between the plurality of lenses indicated by the dotted line.

First, with reference to FIGS. 3, 4, and 9A, the second pixel PX2 may include a second selection circuit SC2 and a plurality of light-emitting elements ED3 and ED4.

The second selection circuit SC2 may include a third transistor T3 and a fourth transistor T4. The third transistor T3 and the fourth transistor T4 in FIG. 9A may be transistors respectively corresponding to the first selection transistor TP1 and the second selection transistor TP2 described with reference to FIGS. 3 and 4.

A gate electrode of the third transistor T3 may be turned on or off in response to a selection signal provided from a third selection signal line SSL3, and a gate electrode of the fourth transistor T4 may be turned on or off in response to a selection signal provided from a fourth selection signal line SSL4. In this case, the selection signal, which is provided from the third selection signal line SSL3, and the selection signal, which is provided from the fourth selection signal line SSL4, may respectively be the first selection signal Ss and the second selection signal Ps described with reference to FIGS. 3 and 4. However, the present disclosure is not limited thereto.

The plurality of light-emitting elements ED3 and ED4 included in the second pixel PX2 may include a third light-emitting element ED3 and a fourth light-emitting element ED4. Substantially identically or similarly to the configuration described with reference to FIGS. 3 and 4, the third light-emitting element ED3 of the second pixel PX2 may be connected between the third transistor T3 and the second power line configured to provide the second power voltage VSS, and the fourth light-emitting element ED4 of the second pixel PX2 may be connected between the fourth transistor T4 and the second power line configured to provide the second power voltage VSS. For example, the third light-emitting element ED3 and the fourth light-emitting element ED4 in FIG. 9A may be light-emitting elements respectively corresponding to the first type light-emitting element EDa and the second type light-emitting element EDb described with reference to FIGS. 3 and 4.

Therefore, when the third transistor T3 is turned on in response to the selection signal at a turn-on level provided from the third selection signal line SSL3, the first drive current passing through the third light-emitting element ED3 may be formed, such that the third light-emitting element ED3 of the second pixel PX2 may emit light.

In addition, when the fourth transistor T4 is turned on in response to the selection signal at a turn-on level provided from the fourth selection signal line SSL4, the second drive current passing through the fourth light-emitting element ED4 may be formed, such that the fourth light-emitting element ED4 of the second pixel PX2 may emit light.

The second pixel PX2 may operate in the first state in which the third light-emitting element ED3 emits light. Alternatively, the second pixel PX2 may operate in the second state in which the fourth light-emitting element ED4 emits light.

The second pixel PX2 may include a third lens LS3 disposed above the third light-emitting element ED3, and a fourth lens LS4 disposed above the fourth light-emitting element ED4.

With reference further to FIG. 9B to more specifically describe the third lens LS3 and the fourth lens LS4, the second pixel PX2 may include a third lens area LSA3 and a fourth lens area LSA4 in which the third light-emitting element ED3 and the fourth light-emitting element ED4 are positioned, respectively.

The third lens area LSA3 and the fourth lens area LSA4 may provide images at different viewing angles. The brightness of the third lens area LSA3 may be controlled by the first drive current created by the third light-emitting element ED3, and the brightness of the fourth lens area LSA4 may be controlled by the second drive current created by the fourth light-emitting element ED4.

The third lens LS3 may be positioned above the third light-emitting element ED3, and the fourth lens LS4 may be positioned above the fourth light-emitting element ED4.

The third lens LS3 may have a first shape. The third lens LS3 may have a shape in which at least light in one direction may not be restricted. For example, a planar shape of the third lens LS3 positioned in the second pixel PX2 may be a bar shape extending in one direction. For example, the third lens LS3 may be implemented as the first type lens 161 described with reference to FIG. 6.

In this case, in case that the light created by the third light-emitting element ED3 of the second pixel PX2 is emitted through the third lens LS3, the propagation direction of the corresponding light may not be limited to one direction.

The fourth lens LS4 may have a second shape. The fourth lens LS4 may restrict the propagation direction, in which the light passes through the second type lens 162, to one direction and/or another direction. For example, a planar shape of the fourth lens LS4 positioned in the second pixel PX2 may be a circular shape, but the present disclosure is not limited thereto. For example, the fourth lens LS4 may be implemented as the second type lens 162 described with reference to FIG. 7.

In this case, in case that the light created by the fourth light-emitting element ED4 of the second pixel PX2 is emitted through the fourth lens LS4, the propagation direction of the corresponding light may be limited to one direction and/or another direction.

A third light-emitting area EA3 defined by the third light-emitting element ED3 of the second pixel PX2 may have a shape corresponding to the third lens LS3, and a fourth light-emitting area EA4 defined by the fourth light-emitting element ED4 of the second pixel PX2 may have a shape corresponding to the fourth lens LS4.

For example, as illustrated in FIG. 9B, a planar shape of the third light-emitting area EA3 may be a bar shape extending in one direction so as to correspond to the shape of the third lens LS3. In addition, in this case, the third lens LS3 positioned in the third lens area LSA3 may have a larger size than the third light-emitting area EA3 included in the third lens area LSA3. Therefore, it is possible to improve the efficiency of the light emitted from the third light-emitting area EA3 of the second pixel PX2.

In addition, as illustrated in FIG. 9B, a planar shape of the fourth light-emitting area EA4 may be a circular shape corresponding to the shape of the fourth lens LS4. In addition, in this case, the fourth lens LS4 positioned in the fourth lens area LSA4 may have a larger size than the fourth light-emitting area EA4 included in the fourth lens area LSA4. For example, a planar shape of the fourth light-emitting area EA4 positioned in the fourth lens area LSA4 may have a circular shape concentric to the planar shape of the fourth lens LS4 positioned in the fourth lens area LSA4. In this case, it is possible to improve the efficiency of the light emitted from the fourth light-emitting area EA4 of the second pixel PX2.

Because the third lens LS3 is implemented as the first type lens 161, the third lens area LSA3 may include one third light-emitting area EA3 and include one third lens LS3, as described with reference to FIG. 6. In addition, because the fourth lens LS4 is implemented as the second type lens 162, the fourth lens area LSA4 may include the two fourth light-emitting areas EA4 and include the two fourth lenses LS4, as described with reference to FIG. 7.

Therefore, in case that the first drive current is formed in the second pixel PX2 and the third light-emitting element ED3 emits light, the light, which is created by the third light-emitting element ED3 of a third pixel PX3, is emitted through the third lens LS3 implemented as the first type lens 161. Therefore, the content provided by the light created by the third light-emitting element ED3 of the second pixel PX2 may be provided at the first viewing angle. For example, the provided content (or images) may be shared with surrounding people adjacent to the user in one direction. Therefore, the content provided by the light emitted through the third lens LS3 may be provided in the wide visual field mode (share mode).

In addition, in case that the second drive current is formed in the second pixel PX2 and the fourth light-emitting element ED4 emits light, the light, which is created by the fourth light-emitting element ED4 of the second pixel PX2, is emitted through the fourth lens LS4 implemented as the second type lens 162. Therefore, the content provided by the light created by the fourth light-emitting element ED4 of the second pixel PX2 may be provided at the second viewing angle. For example, the provided content (or images) may not be shared with surrounding people adjacent to the user.

Therefore, the content provided by the light emitted through the fourth lens LS4 may be provided in the narrow visual field mode (private mode).

In this case, as described above, the second pixel PX2 may operate in the first state in which the third light-emitting element ED3 emits light. Alternatively, the second pixel PX2 may operate in the second state in which the fourth light-emitting element ED4 emits light. Therefore, in case that the second pixel PX2 operates in the first state, the content may be provided at the first viewing angle by the light created by the third light-emitting element ED3. In addition, in case that the second pixel PX2 operates in the second state, the content may be provided at the second viewing angle by the light created by the fourth light-emitting element ED4.

As described above, the second area, in which the second pixel PX2, which operates in the first or second state, is disposed among the plurality of areas of the display panel PN, may provide the content in the wide visual field mode or the content in the narrow visual field mode in accordance with the drive mode.

Figure 10:
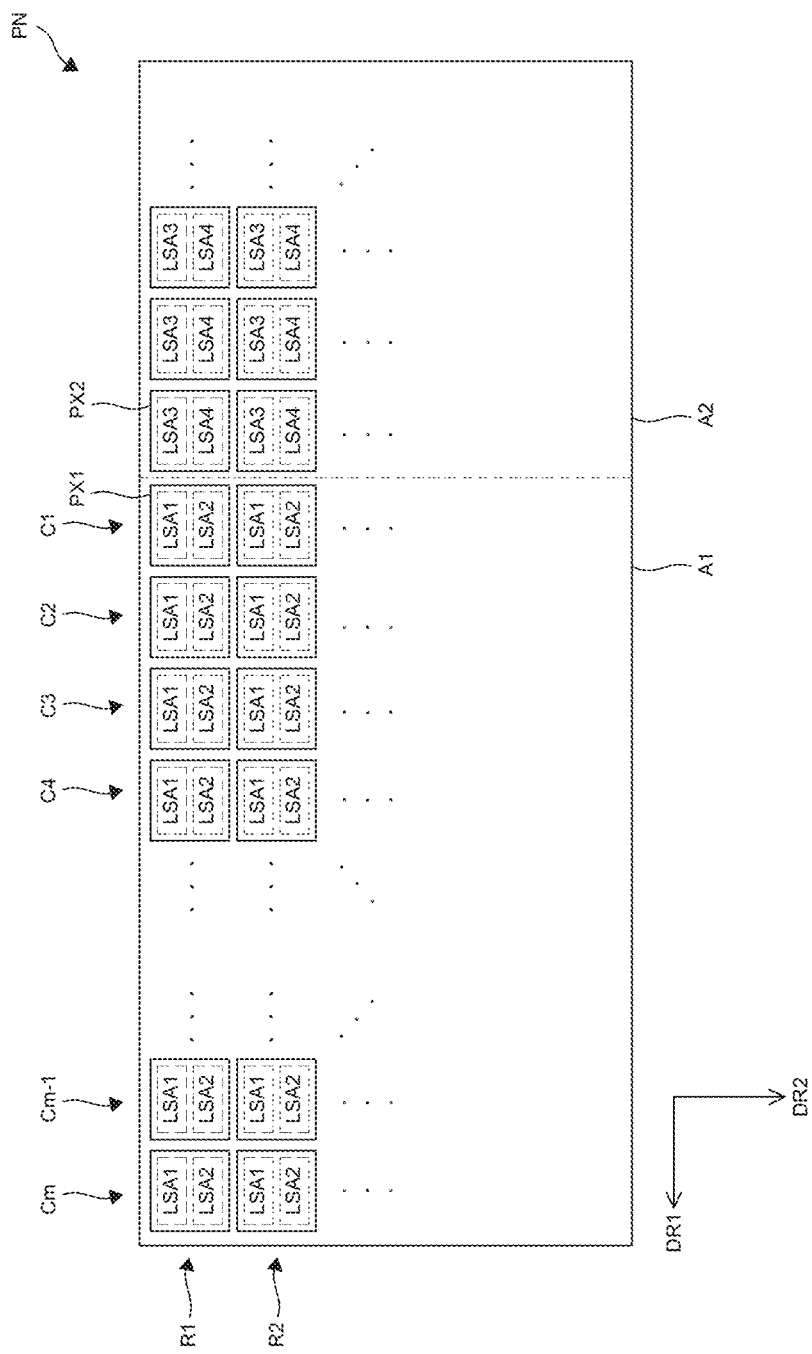
FIG. 10 is a view illustrating an example of a display panel of the display device according to the example embodiment of the present specification.
Figure 11:
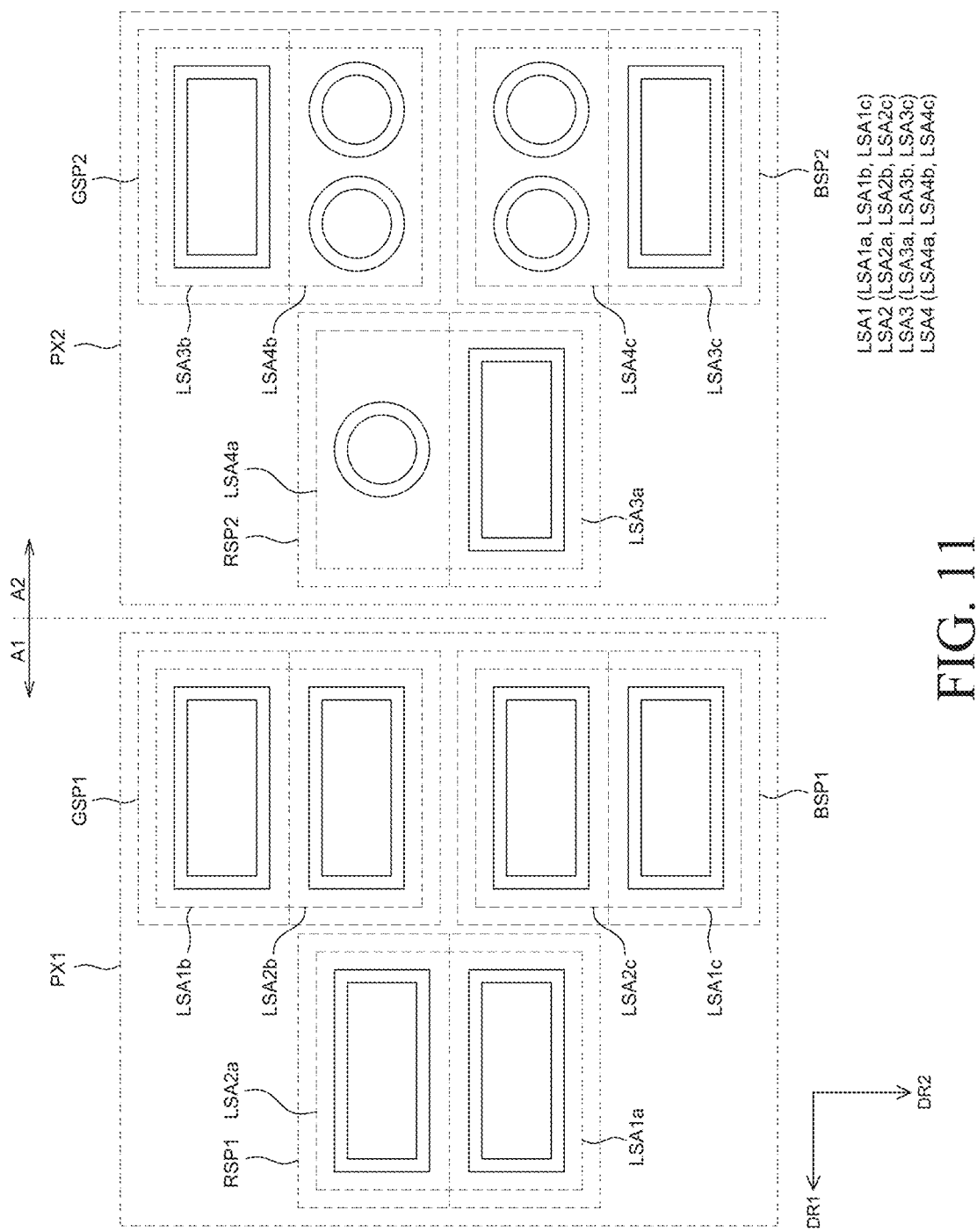
FIG. 11 is an example of a top plan view schematically illustrating an arrangement of lenses of the first and second pixels included in the display panel in FIG. 10.

FIG. 10 is a view illustrating an example of the display panel of the display device according to the embodiment of the present specification. FIG. 11 is a top plan view schematically illustrating an arrangement of the lenses of the first and second pixels included in the display panel in FIG. 10.

Meanwhile, FIG. 10 illustrates an example of the display panel PN including first and second areas A1 and A2 and included in the display device 100 according to the embodiment of the present specification described with reference to FIG. 2. FIG. 11 illustrates an example of the first pixel PX1 disposed in the first area A1 and an example of the second pixel PX2 disposed in the second area A2 of the display panel PN in FIG. 10.

Meanwhile, FIG. 11 illustrates an embodiment in which the first pixel PX1 and the second pixel PX2 each include three subpixels.

Meanwhile, for convenience of description, FIGS. 10 and 11 illustrate a first direction DR1 as a horizontal direction in a plan view, and a second direction DR2 as a vertical direction in a plan view.

Meanwhile, for convenience of description, FIG. 10 illustrates a plurality of rows R1 and R2, which is defined in a direction parallel to the first direction DR1, and a plurality of columns C1 to Cm, which is defined in a direction parallel to the second direction DR2, as a plurality of pixel rows and a plurality of pixel columns in which the plurality of first pixels PX1 is disposed in the first area A1.

With reference to FIGS. 2 and 6 to 10, the display panel PN may be divided into the plurality of areas A1 and A2. For example, as illustrated in FIG. 10, the display panel PN may be divided into two areas A1 and A2. For example, the display panel PN may include the first area A1 and the second area A2 adjacent to the first area A1 in a direction opposite to the first direction DR1.

The areas A1 and A2 included in the display panel PN may include a plurality of pixels in which pixel circuits are disposed. For example, the plurality of first pixels PX1 may be disposed in the first area A1 and spaced apart from one another in the first direction DR1 and the second direction DR2, and the plurality of second pixels PX2 may be disposed in the second area A2 and spaced apart from one another in the first direction DR1 and the second direction DR2.

Meanwhile, as described above, the first area A1 of the display panel PN may be an area provided at the side of the driver seat disposed in the front seat of the vehicle described with reference to FIG. 1, for example, an area that provides the content in the wide visual field mode. The second area A2 of the display panel PN may be an area provided at the side of the passenger seat disposed in the front seat of the vehicle described with reference to FIG. 1, for example, an area that provides the content in the wide visual field mode or the content in the narrow visual field mode in accordance with the drive mode of the display device 100.

For example, the plurality of first pixels PX1 disposed in the first area A1 may display images through the first lens area LSA1 and the second lens area LSA2. For example, the plurality of first pixels PX1 disposed in the first area A1 may each operate in the third state in which both the first lens area LSA1 and the second lens area LSA2 display images, for example, in each of the first and second modes regardless of the drive mode.

In addition, as described with reference to FIGS. 8A and 8B, both the first lens LS1 positioned in the first lens area LSA1 and the second lens LS2 positioned in the second lens area LSA2 of each of the plurality of first pixels PX1 disposed in the first area A1 may emit (provide) light at the first viewing angle. Therefore, in each of the first and second modes, the images displayed by the plurality of first pixels PX1 disposed in the first area A1 may be provided to the user at the first viewing angle.

The plurality of second pixels PX2 disposed in the second area A2 may display images through the third lens area LSA3 and the fourth lens area LSA4. For example, the plurality of second pixels PX2 disposed in the second area A2 may each operate in the first state in which only the third lens area LSA3 displays images in the first mode. Alternatively, the plurality of second pixels PX2 disposed in the second area A2 may each operate in the second state in which only the fourth lens area LSA4 displays images in the second mode.

In addition, as described with reference to FIGS. 9A and 9B, the third lens LS3, which is positioned in the third lens area LSA3 of each of the plurality of second pixels PX2 disposed in the second area A2, may provide the light at the first viewing angle. Therefore, in the first mode, the images displayed by the plurality of second pixels PX2 disposed in the second area A2 may be provided to the user at the first viewing angle. In addition, the fourth lens LS4, which is positioned in the fourth lens area LSA4 of each of the plurality of second pixels PX2 disposed in the second area A2, may provide the light at the second viewing angle. Therefore, in the second mode, the images displayed by the plurality of second pixels PX2 disposed in the second area A2 may be provided to the user at the second viewing angle.

Meanwhile, as described above, the first pixel PX1 disposed in the first area A1 and the second pixel PX2 disposed in the second area A2 have different lens arrangement structures, which may cause a problem in that a boundary between the first area A1 and the second area A2 is visually recognized.

With reference further to FIG. 11 to more specifically describe the problem, the first pixel PX1 may include a first red subpixel RSP1 configured to implement red, a first green subpixel GSP1 configured to implement green, and a first blue subpixel BSP1 configured to implement blue, and the second pixel PX2 may include a second red subpixel RSP2 configured to implement red, a second green subpixel GSP2 configured to implement green, and a second blue subpixel BSP2 configured to implement blue.

Meanwhile, the first pixel PX1 and the second pixel PX2 illustrated in FIG. 11 are provided just for illustrative purposes only, and the embodiment of the present specification is not limited thereto. For example, the first pixel PX1 and/or the second pixel PX2 may each further include a subpixel for further implementing a particular color, e.g., white in addition to red, green, and blue.

The first pixel PX1 and the second pixel PX2 may have substantially the same subpixel arrangement structure. For example, the first pixel PX1 may have a subpixel arrangement structure in which the first green subpixel GSP1 and the first blue subpixel BSP1 are disposed side by side in the second direction DR2 at one side of the first red subpixel RSP1 based on the first direction DR1. Similarly, the second pixel PX2 may have a subpixel arrangement structure in which the second green subpixel GSP2 and the second blue subpixel BSP2 are disposed side by side in the second direction DR2 at one side of the second red subpixel RSP2 based on the first direction DR1. However, this is just provided for illustrative purposes only, and the subpixel arrangement structures of the first pixel PX1 and/or the second pixel PX2 are not limited thereto. The first pixel PX1 and the second pixel PX2 may each have an arrangement structure different from the subpixel arrangement structure illustrated in FIG. 11, and/or the first pixel PX1 and the second pixel PX2 may have different subpixel arrangement structures.

The first pixel PX1 may include the plurality of first lens areas LSA1 in which the first lenses LS1 are disposed for each subpixel, and the plurality of second lens areas LSA2 in which the second lenses LS2 are disposed for each subpixel.

For example, the first red subpixel RSP1 of the first pixel PX1 may include a first sub-lens area LSA1a in which the first lens LS1 is disposed, and a second sub-lens area LSA2a in which the second lens LS2 is disposed, the first green subpixel GSP1 of the first pixel PX1 may include a third sub-lens area LSA1b in which the first lens LS1 is disposed, and a fourth sub-lens area LSA2b in which the second lens LS2 is disposed, and the first blue subpixel BSP1 of the first pixel PX1 may include a fifth sub-lens area LSA1c in which the first lens LS1 is disposed, and a sixth sub-lens area LSA2c in which the second lens LS2 is disposed.

In this case, the first sub-lens area LSA1a, the third sub-lens area LSA1b, and the fifth sub-lens area LSA1c, in which the first lenses LS1 of the first pixel PX1 are disposed, may be areas disposed in the first lens area LSA1. For example, the first lenses LS1 each having the first shape are disposed in the first sub-lens area LSA1a, the third sub-lens area LSA1b, and the fifth sub-lens area LSA1c of the first pixel PX1, such that images displayed from the first sub-lens area LSA1a, the third sub-lens area LSA1b, and the fifth sub-lens area LSA1c of the first pixel PX1 may be provided to the user at the first viewing angle.

In addition, the second sub-lens area LSA2a, the fourth sub-lens area LSA2b, and the sixth sub-lens area LSA2c, in which the second lenses LS2 of the first pixel PX1 are disposed, may be areas included in the second lens area LSA2. For example, the second lenses LS2 each having the first shape are disposed in the second sub-lens area LSA2a, the fourth sub-lens area LSA2b, and the sixth sub-lens area LSA2c of the first pixel PX1, such that images displayed from the second sub-lens area LSA2a, the fourth sub-lens area LSA2b, and the sixth sub-lens area LSA2c of the first pixel PX1 may be provided to the user at the first viewing angle.

For example, the first to sixth sub-lens areas LSA1a, LSA2a, LSA1b, LSA2b, LSA1c, and LSA2c of the first pixel PX1 may provide images at the same viewing angle.

The second pixel PX2 may include the plurality of third lens areas LSA3 in which the third lenses LS3 are disposed for each subpixel, and the plurality of fourth lens areas LSA4 in which the fourth lenses LS4 disposed for each subpixel.

For example, the second red subpixel RSP2 of the second pixel PX2 may include a seventh sub-lens area LSA3a in which the third lens LS3 is disposed, and an eighth sub-lens area LSA4a in which the fourth lens LS4 is disposed, the second green subpixel GSP2 of the second pixel PX2 may include a ninth sub-lens area LSA3b in which the third lens LS3 is disposed, and a tenth sub-lens area LSA4b in which the fourth lens LS4 is disposed, and the second blue subpixel BSP2 of the second pixel PX2 may include an eleventh sub-lens area LSA3c in which the third lens LS3 is disposed, and a twelfth sub-lens area LSA4c in which the fourth lens LS4 is disposed.

In this case, the seventh sub-lens area LSA3a, the ninth sub-lens area LSA3b, and the eleventh sub-lens area LSA3c, in which the third lenses LS3 of the second pixel PX2 are disposed, may be areas included in the third lens area LSA3. For example, the third lenses LS3 each having the first shape are disposed in the seventh sub-lens area LSA3a, the ninth sub-lens area LSA3b, and the eleventh sub-lens area LSA3c of the second pixel PX2, such that images displayed from the seventh sub-lens area LSA3a, the ninth sub-lens area LSA3b, and the eleventh sub-lens area LSA3c of the second pixel PX2 may be provided to the user at the first viewing angle.

In addition, the eighth sub-lens area LSA4a, the tenth sub-lens area LSA4b, and the twelfth sub-lens area LSA4c, in which the fourth lenses LS4 of the second pixel PX2 are disposed, may be areas included in the fourth lens area LSA4. For example, the fourth lenses LS4 each having the second shape are disposed in the eighth sub-lens area LSA4a, the tenth sub-lens area LSA4b, and the twelfth sub-lens area LSA4c of the second pixel PX2, such that images displayed from the eighth sub-lens area LSA4a, the tenth sub-lens area LSA4b, and the twelfth sub-lens area LSA4c of the second pixel PX2 may be provided to the user at the second viewing angle.

For example, the seventh sub-lens area LSA3a, the ninth sub-lens area LSA3b, and the eleventh sub-lens area LSA3c, in which the third lenses LS3 of the second pixel PX2 are disposed, and the eighth sub-lens area LSA4a, the tenth sub-lens area LSA4b, and the twelfth sub-lens area LSA4c, in which the fourth lenses LS4 are disposed, may provide images at different viewing angles.

The arrangement structures of the first lens area LSA1 and the second lens area LSA2 of the first pixel PX1 may be substantially identical to the arrangement structures of the third lens area LSA3 and the fourth lens area LSA4 of the second pixel PX2.

For example, the first lens areas LSA1 of the first pixel PX1, e.g., the first sub-lens area LSA1a, the third sub-lens area LSA1b, and the fifth sub-lens area LSA1c may be disposed at positions respectively corresponding to the third lens areas LSA3, e.g., the seventh sub-lens area LSA3a, the ninth sub-lens area LSA3b, and the eleventh sub-lens area LSA3c in which the third lenses LS3 of the first type lenses 161 are disposed in the second pixel PX2.

In addition, the second lens areas LSA2 of the first pixel PX1, e.g., the second sub-lens area LSA2a, the fourth sub-lens area LSA2b, and the sixth sub-lens area LSA2c may be disposed at positions respectively corresponding to the fourth lens areas LSA4, e.g., the eighth sub-lens area LSA4a, the tenth sub-lens area LSA4b, and the twelfth sub-lens area LSA4c in which the fourth lenses LS4 of the second type lenses 162 are disposed in the second pixel PX2.

The number of fourth lenses LS4 disposed in the fourth lens area LSA4 and the number of light-emitting areas corresponding to the fourth lenses LS4 may vary depending on each of the subpixels RSP2, GSP2, and BSP2 of the second pixel PX2. For example, the number of fourth lenses LS4 positioned in the tenth sub-lens area LSA4b of the second green subpixel GSP2 and the number of fourth lenses LS4 positioned in the twelfth sub-lens area LSA4c of the second blue subpixel BSP2 may be larger than the number of fourth lenses LS4 positioned in the eighth sub-lens area LSA4a of the second red subpixel RSP2. In this case, an efficiency deviation of the fourth light-emitting element ED4 positioned in the fourth lens area LSA4 of the second pixel PX2 may be compensated by the number of fourth lenses LS4 disposed in the fourth lens area LSA4 of the second pixel PX2 and the number of light-emitting areas corresponding to the fourth lenses LS4. However, the number of fourth lenses LS4 disposed in the fourth lens area LSA4 and the number of light-emitting areas corresponding to the fourth lenses LS4 for each of the subpixels RSP2, GSP2, and BSP2 of the second pixel PX2 are not limited thereto. According to the embodiment, the number of fourth lenses LS4 disposed in the fourth lens area LSA4 and the number of light-emitting areas corresponding to the fourth lenses LS4 for each of the subpixels RSP2, GSP2, and BSP2 of the second pixel PX2 may be equal to each other.

As described above, the first pixel PX1 disposed in the first area A1 and the second pixel PX2 disposed in the second area A2 may have different lens arrangement structures. For example, in the case of the first pixel PX1, the lenses having the first shape, e.g., the first lens LS1 and the second lens LS2 may be disposed in all the lens areas LSA1 and LSA2. In contrast, in the case of the second pixel PX2, the third lens LS3 having the first shape may be disposed in the third lens area LSA3, and the fourth lens LS4 having the second shape may be disposed in the fourth lens area LSA4.

Therefore, in case that the plurality of first pixels PX1 disposed in the first area A1 and the plurality of second pixels PX2 disposed in the second area A2 display images with the same brightness, there may occur a problem in that the boundary between the first area A1 and the second area A2 is visually recognized because of a difference in lens arrangement structures between the first pixel PX1 and the second pixel PX2.

In particular, as described above, in case that the display device 100 operates in the first mode, the plurality of first pixels PX1 in the first area A1 may operate in the third state and display images through the first lens area LSA1 and the second lens area LSA2, whereas the plurality of second pixels PX2 in the second area A2 may operate in the first state and display images only through the third lens area LSA3. In this case, in the first mode, both the first area A1 and the second area A2 provide images to the user at the first viewing angle, such that the user may be provided with images in a shape in which the images displayed in the first area A1 and the images displayed in the second area A2 are continuously disposed. In this case, in case that the plurality of first pixels PX1 disposed in the first area A1 and the plurality of second pixels PX2 disposed in the second area A2 display images with the same brightness, the plurality of first pixels PX1 in the first area A1 operates in the third state and displays images through the first lens area LSA1 and the second lens area LSA2, thereby implementing high brightness of the first area A1 in comparison with the second area A2 that operates in the first state and displays images only through the third lens area LSA3. There may occur a problem in that the boundary between the first area A1 and the second area A2 is visually recognized because of the above-mentioned brightness difference.

In order to solve or alleviate the above-mentioned problem, the display device 100 according to the embodiment of the present specification may control the brightness of the display panel PN in accordance with the drive mode of the display device 100 on the basis of the mode signal MODE. For example, as described with reference to FIG. 2, the brightness controller LD may create the corrected image data CDATA for controlling the brightness of the display panel PN in accordance with the drive mode of the display device 100 on the basis of the mode signal MODE, and the timing controller TD may create the image data RGB to be provided to the data drive circuit DD on the basis of the corrected image data CDATA, thereby controlling the brightness of images to be displayed on the display panel PN.

The display device 100, e.g., the brightness controller LD may control the brightness of the display panel PN, e.g., the first area A1 so that the brightness of the first area A1 increases as the distance from the boundary between the first area A1 and the second area A2 increases. In addition, the brightness controller LD may perform control so that the brightness of the area of the first area A1, which is adjacent to the boundary between the first area A1 and the second area A2, has a value substantially equal or similar to that of the brightness of the second area A2. In the first mode in which images are provided at the first viewing angle in both the first area A1 and the second area A2, a brightness difference between the first area A1 and the second area A2 may be minimized or reduced at the boundary between the first area A1 and the second area A2 by the operation of the brightness controller LD, which may solve or alleviate the problem in which the boundary between the first area A1 and the second area A2 is visually recognized.

Hereinafter, a configuration in which the display device 100, e.g., the brightness controller LD controls the brightness of the first area A1 will be more specifically described with reference to FIGS. 12 to 18. Meanwhile, as described above, the brightness controller LD may control the brightness of the first area A1 by creating the corrected image data CDATA on the basis of the input image data IDATA. However, the configuration in which the brightness controller LD controls the brightness of the first area A1 is not limited thereto.

Figure 12:
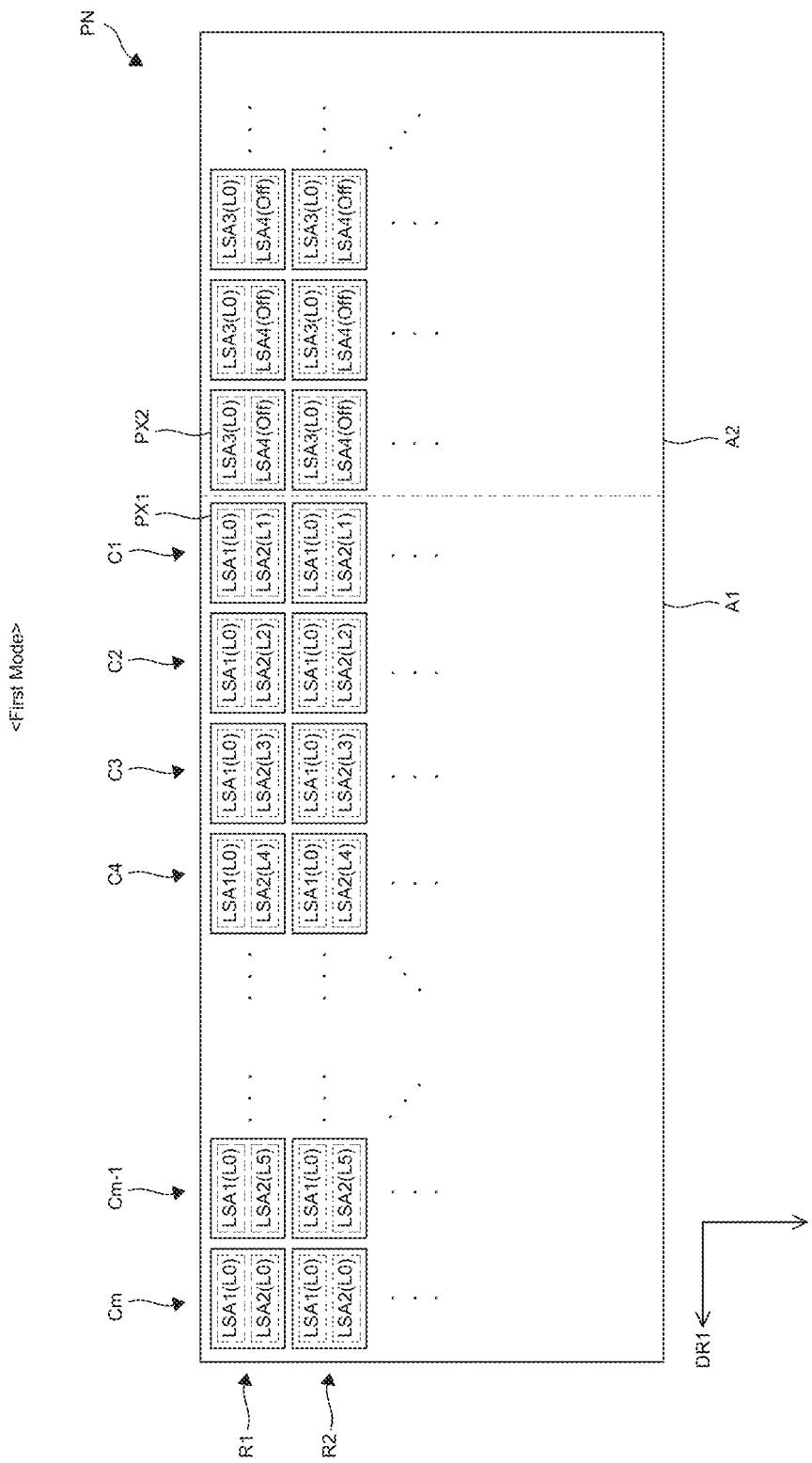
FIG. 12 is a view for explaining an example in which the display device according to the example embodiment of the present specification operates in a first mode.

FIG. 12 is a view for explaining an example in which the display device according to the embodiment of the present specification operates in the first mode. FIG. 13 is a view for explaining an example in which the display device according to the embodiment of the present specification operates in the second mode.

Figure 13:
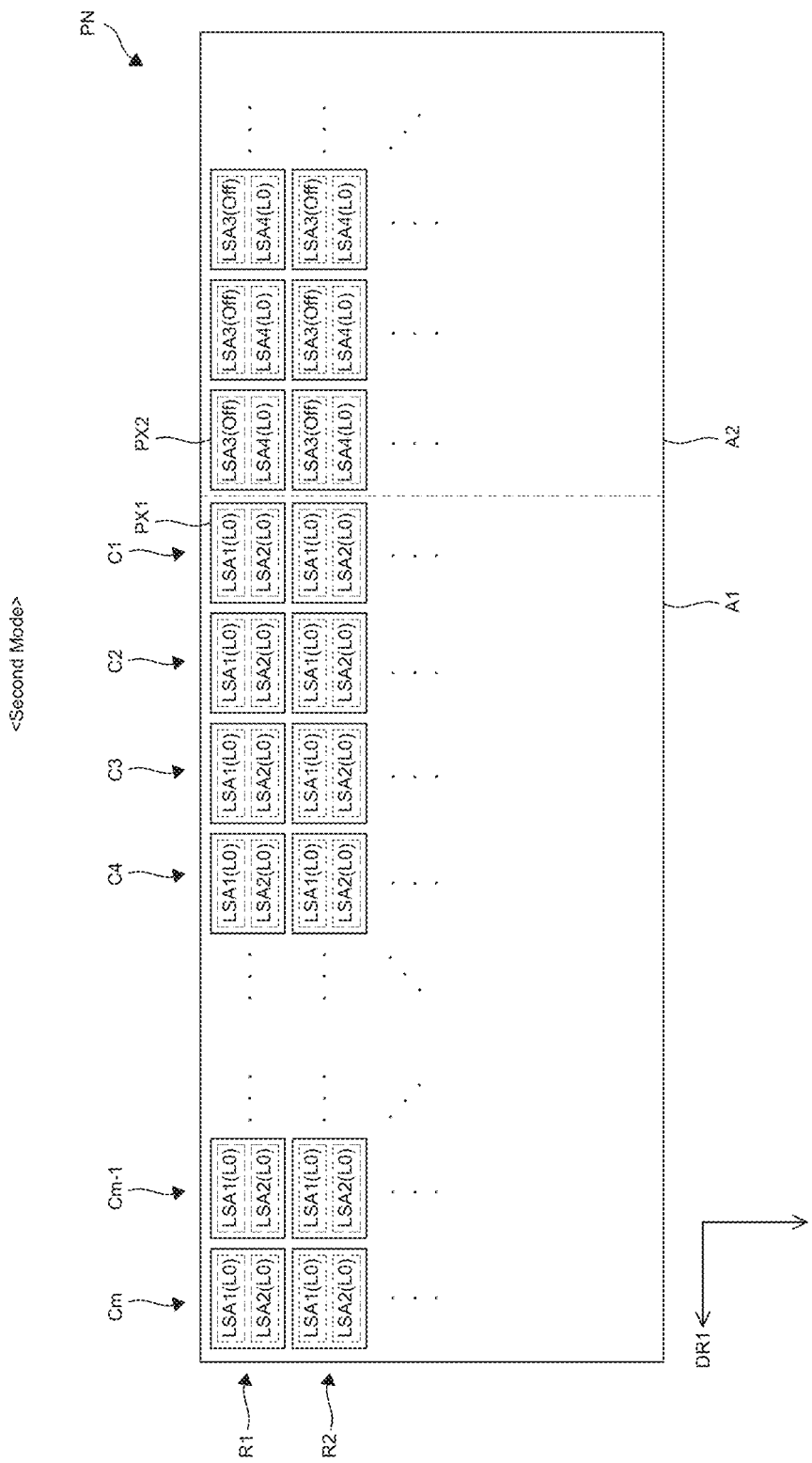
FIG. 13 is a view for explaining an example in which the display device according to the example embodiment of the present specification operates in a second mode.

Meanwhile, FIGS. 12 and 13 illustrate an example of the display panel PN in case that the display device 100 according to the embodiment of the present specification operates in the first and second modes.

Meanwhile, for convenience of description, FIGS. 12 and 13 show "Off" that indicates that the light-emitting element disposed in the lens area on the display panel PN does not emit light.

With reference to FIGS. 2 to 11, the mode controller MS included in the display device 100 may create the mode selection signal MSS on the basis of the mode signal MODE inputted from the outside. For example, the mode controller MS may receive the mode signal MODE from the outside in response to the drive mode of the display device 100, create the mode selection signal MSS on the basis of the mode signal MODE, and provide the mode selection signal MSS to the mode selection part MD. In addition, in response to the mode selection signal MSS provided from the mode controller MS, the mode selection part MD may provide the selection signals, which corresponds to the drive mode, to the plurality of pixels PX, e.g., the plurality of first pixels PX1 disposed in the first area A1 and the plurality of second pixels PX2 disposed in the second area A2.

In case that the display device 100 operates in the first mode, the second area A2 of the display panel PN may provide the content to the user at the first viewing angle in response to the selection signal provided from the mode selection part MD.

Specifically, with reference further to FIG. 12, each of the plurality of second pixels PX2 disposed in the second area A2 may operate in the first state in the first mode.

For example, in the first mode, when the third transistor T3 included in the second pixel PX2 is turned on in response to the selection signal provided through the third selection signal line SSL3, the first drive current is formed in the second pixel PX2, and the light, which is emitted by the first drive current from the third light-emitting element ED3 disposed in the third lens area LSA3 of the second pixel PX2, is emitted through the third lens LS3, which is disposed in the third lens area LSA3 and configured as the first type lens 161, such that the content may be provided at the first viewing angle.

Meanwhile, in the first mode, the selection signal, which is maintained at a turn-off level, is provided to the fourth selection signal line SSL4, and the fourth transistor T4 included in the second pixel PX2 is kept in a turned-off state, such that the fourth light-emitting element ED4 disposed in the fourth lens area LSA4 of the second pixel PX2 may be kept in a non-light-emitting state. For example, in the second mode, the current path for the second drive current may not be formed in the second pixel PX2.

In addition, in case that the display device 100 operates in the second mode, the second area A2 of the display panel PN may provide the content to the user at the second viewing angle in response to the selection signal provided from the mode selection part MD.

Specifically, with reference further to FIG. 13, each of the plurality of second pixels PX2 disposed in the second area A2 may operate in the second state in the second mode.

For example, in the second mode, when the fourth transistor T4 included in the second pixel PX2 is turned on in response to the selection signal provided through the fourth selection signal line SSL4, the second drive current is formed in the second pixel PX2, and the light, which is emitted by the second drive current from the fourth light-emitting element ED4 disposed in the fourth lens area LSA4 of the second pixel PX2, is emitted through the fourth lens LS4 disposed in the fourth lens area LSA4 and configured as the second type lens 162, such that the content may be provided at the second viewing angle.

Meanwhile, in the second mode, the selection signal, which is maintained at a turn-off level, is provided to the third selection signal line SSL3, and the third transistor T3 included in the second pixel PX2 is kept in a turned-off state, such that the third light-emitting element ED3 of the second pixel PX2 may be kept in a non-light-emitting state. For example, in the second mode, the current path of the first drive current may not be formed in the second pixel PX2.

Therefore, when the display device 100 operates in the first mode, the second area A2 of the display panel PN provides the user with the content at the first viewing angle.

When the display device 100 operates in the second mode, the second area A2 of the display panel PN may provide the user with the content at the second viewing angle.

The display device 100 may perform control so that the brightness of the second area A2 corresponds to the input image data IDATA regardless of the drive mode. For example, the brightness controller LD may create the corrected image data CDATA so that values of the corrected image data CDATA corresponding to the second area A2 are equal to values of the input image data IDATA.

Therefore, in each of the first mode in which the content at the first viewing angle is provided to the user and the second mode in which the content at the second viewing angle is provided to the user, the second pixel PX2 disposed in the second area A2 may display images with the brightness (hereinafter, referred to as "reference brightness L0") corresponding to the input image data IDATA. For example, as illustrated in FIG. 12, in the first mode, the third lens area LSA3 of each of the plurality of second pixels PX2 may emit light with the reference brightness L0. As illustrated in FIG. 13, in the second mode, the fourth lens area LSA4 of each of the plurality of second pixels PX2 may emit light with the reference brightness L0.

In addition, as described above, in both the first mode in which the content is provided in the wide visual field mode and the second mode in which the content is provided in the narrow visual field mode, the display device may operate so that the first area A1 of the display panel PN provides the content at the first viewing angle.

For example, in case that the display device 100 operates in the first or second mode, the first area A1 of the display panel PN may provide the user with the content at the first viewing angle in response to the selection signal provided from the mode selection part MD.

Specifically, with reference to FIGS. 12 and 13, in each of the first and second modes, each of the plurality of first pixels PX1 disposed in the first area A1 may operate in the third state.

For example, in each of the first and second modes, the first drive current may be formed in the first pixel PX1 when the first transistor T1 included in the first pixel PX1 is turned on in response to the selection signal provided through the first selection signal line SSL1, and the second drive current may be formed in the first pixel PX1 when the second transistor T2 included in the first pixel PX1 is turned on in response to the selection signal provided through the second selection signal line SSL2. In addition, the light, which is emitted by the first drive current from the first light-emitting element ED1 disposed in the first lens area LSA1 of the first pixel PX1, is emitted through the first lens LS1 disposed in the first lens area LSA1 and configured as the first type lens 161, and the light, which is emitted by the second drive current from the second light-emitting element ED2 disposed in the second lens area LSA2 of the first pixel PX1, is emitted through the second lens LS2 disposed in the second lens area LSA2 and configured as the first type lens 161, such that the content may be provided at the first viewing angle.

In the first mode, the display device 100 may control the brightness of the display panel PN, e.g., the first area A1 so that the brightness of the first area A1 increases as the distance from the boundary between the first area A1 and the second area A2 increases. For example, in the first mode, the display device 100 may perform control so that the brightness of the second lens area LSA2 of each of the plurality of first pixels PX1 disposed in the first area A1 increases as the distance from the boundary between the first area A1 and the second area A2 increases.

In addition, the display device 100 may perform control so that the brightness of the area of the first area A1, which is adjacent to the boundary between the first area A1 and the second area A2, has a value substantially equal or similar to that of the brightness of the second area A2.

With reference to FIG. 12 to more specifically describe the present disclosure, in the first mode, the display device 100 may perform control so that the brightness of the first lens area LSA1 of the first pixel PX1 disposed in the first area A1 corresponds to the input image data IDATA. For example, the brightness controller LD may create the corrected image data CDATA so that values of the corrected image data CDATA corresponding to the first lens area LSA1 of each of the plurality of first pixels PX1 disposed in the first area A1 are equal to values of the input image data IDATA. Therefore, in the first mode, the first lens area LSA1 of the first pixel PX1 disposed in the first area A1 may emit light with the reference brightness L0.

In addition, in the first mode, the brightness of the second lens area LSA2 of the first pixel PX1 disposed in the first area A1 may increase as the distance from the boundary between the first area A1 and the second area A2 increases.

For example, the second lens area LSA2 of each of the plurality of first pixels PX1, which is provided in the first area A1 and disposed in a first column C1 closest to the boundary between the first area A1 and the second area A2, may emit light with first brightness L1 lower than the reference brightness L0.

In addition, the second lens area LSA2 of each of the plurality of first pixels PX1, which is provided in the first area A1 and disposed in a second column C2 adjacent to the first column C1 in the first direction DR1, may emit light with second brightness L2 higher than the first brightness L1. In this case, the second brightness L2 may be lower than the reference brightness L0.

Similarly, the second lens area LSA2 of each of the plurality of first pixels PX1, which is provided in the first area A1 and disposed in a third column C3 adjacent to the second column C2 in the first direction DR1, may emit light with third brightness L3 higher than the second brightness L2. In this case, the third brightness L3 may be lower than the reference brightness L0.

Similarly, the second lens area LSA2 of each of the plurality of first pixels PX1, which is provided in the first area A1 and disposed in a fourth column C4 adjacent to the third column C3 in the first direction DR1, may emit light with fourth brightness L4 higher than the third brightness L3. In this case, the fourth brightness L4 may be lower than the reference brightness L0.

Similarly, the second lens area LSA2 of each of the plurality of first pixels PX1, which is provided in the first area A1 and disposed in a (m−1)th column Cm-1 adjacent to an m-th (here, m is an integer larger than 0) column Cm, which is farthest from the boundary between the first area A1 and the second area A2, in a direction opposite to the first direction DR1, may emit light with fifth brightness L5 higher than the fourth brightness L4. In this case, the fifth brightness L5 may be lower than the reference brightness L0.

In addition, the second lens area LSA2 of each of the plurality of first pixels PX1, which is provided in the first area A1 and disposed in the m-th column Cm farthest from the boundary between the first area A1 and the second area A2, may emit light with the reference brightness L0. For example, the display device 100 may perform control so that the brightness of the second lens area LSA2 of each of the plurality of first pixels PX1, which is disposed in the pixel column, e.g., the m-th column Cm farthest from the boundary between the first area A1 and the second area A2 among the plurality of first pixels PX1 disposed in the first area A1, corresponds to the input image data IDATA.

As described above, in the first mode, the display device 100 may perform control so that the brightness of the second lens area LSA2 of each of the plurality of first pixels PX1 disposed in the first area A1 increases in the first direction DR1, e.g., increases as the distance from the boundary between the first area A1 and the second area A2 increases. For example, the display device 100 may perform control so that the brightness of the second lens area LSA2 of each of the plurality of first pixels PX1 disposed in the first area A1 increases from the first column C1 to the m-th column Cm. Therefore, it is possible to minimize or alleviate the problem in which the boundary between the first area A1 and the second area A2 is visually recognized when images are displayed in the first mode.

The first brightness L1 of the second lens area LSA2 of each of the plurality of first pixels PX1, which is provided in the first area A1 and disposed in the first column C1 closest to the boundary between the first area A1 and the second area A2, may be brightness substantially corresponding to a black image. For example, the first brightness L1 may have a value of 0. In this case, the brightness of each of the plurality of first pixels PX1, which is provided in the first area A1 and disposed in the first column C1 closest to the boundary between the first area A1 and the second area A2, may correspond to a value made by adding up the reference brightness L0 of the first lens area LSA1 and the first brightness L1 of the second lens area LSA2, such that the brightness of each of the plurality of first pixels PX1 disposed in the first column C1 may have a value substantially equal or similar to that of the reference brightness L0.

Therefore, the brightness of each of the plurality of first pixels PX1, which is provided in the first area A1 and disposed in the first column C1 closest to the boundary between the first area A1 and the second area A2, may have a value substantially equal or similar to that of the brightness, e.g., the reference brightness L0 of each of the plurality of second pixels PX2 disposed in the second area A2. Therefore, it is possible to more effectively solve or alleviate the problem in which the boundary between the first area A1 and the second area A2 is visually recognized when images are displayed in the first mode.

However, the embodiment of the present specification is not limited thereto. The second lens area LSA2 of each of the plurality of first pixels PX1, which is provided in the first area A1 and disposed in the first column C1 closest to the boundary between the first area A1 and the second area A2, may not emit light.

In addition, as described with reference to FIG. 11, the second lens area LSA2 of each of the plurality of first pixels PX1 disposed in the first area A1 may be disposed at a position corresponding in lens arrangement structure to the fourth lens area LSA4 in which the fourth lenses LS4 of the second type lenses 162 are disposed in the plurality of second pixels PX2 disposed in the second area A2. Therefore, in the first mode, when the display device 100 performs control so that the brightness of the plurality of first pixels PX1 disposed in the first area A1 increases in the first direction DR1, e.g., increases as the distance from the boundary between the first area A1 and the second area A2 increases, the display device 100 controls the brightness of the second lens area LSA2 of the first pixel PX1 corresponding in lens arrangement structure to the fourth lens area LSA4 of the second area A2, which does not emit light in the first mode, which may more effectively solve or alleviate the problem in which the boundary between the first area A1 and the second area A2 is visually recognized.

In the first mode, the display device 100 may perform control so that the brightness of the second lens area LSA2 of each of the plurality of first pixels PX1 disposed in the first area A1 linearly increases in the first direction DR1, e.g., increases as the distance from the boundary between the first area A1 and the second area A2 increases. Therefore, it is possible to minimize or alleviate a problem in which the change in brightness of the first area A1, e.g., the change in brightness in the first direction DR1 is visually recognized by the user.

Meanwhile, as described above, in the second mode, the display device 100 may perform control so that the brightness of the first area A1 corresponds to the input image data IDATA.

For example, with reference to FIG. 13, in the second mode, the display device 100 may perform control so that the brightness of the first lens area LSA1 of the first pixel PX1 disposed in the first area A1 and the brightness of the second lens area LSA2 correspond to the input image data IDATA. For example, the brightness controller LD may create the corrected image data CDATA so that values of the corrected image data CDATA corresponding to the first lens area LSA1 and the second lens area LSA2 of each of the plurality of first pixels PX1 disposed in the first area A1 are equal to values of the input image data IDATA. Therefore, in the second mode, the first lens area LSA1 of the first pixel PX1 disposed in the first area A1 may emit light with the reference brightness L0, and the second lens area LSA2 of the first pixel PX1 disposed in the first area A1 may emit light with the reference brightness L0.

Meanwhile, as described above, in the second mode, both the first lens area LSA1 and the second lens area LSA2 of the first pixel PX1 disposed in the first area A1 emit light with the reference brightness L0, which may cause a brightness difference between the image displayed in the first area A1 and the image displayed in the second area A2. However, despite the brightness difference, in the second mode, the image is displayed at the first viewing angle in the first area A1, and the image is displayed at the second viewing angle in the second area A2, such that the problem, in which boundary is substantially and visually recognized to the user, does not occur.

As described above, in accordance with the drive mode, the display device 100 according to the embodiment of the present specification may display the content at the first viewing angle on the display panel PN in the first mode and display the content at the second viewing angle in at least a partial area (second area) of the display panel PN in the second mode. In this case, the display device 100 according to the embodiment of the present specification may control the brightness of the first area A1 of the display panel PN in accordance with the drive mode so that the brightness of the first area A1 increases as the distance from the boundary between the first area A1 and the second area A2, which provide the content at the first viewing angle in the first mode, increases. In addition, the display device 100 may perform control so that the brightness of the area of the first area A1, which is adjacent to the boundary between the first area A1 and the second area A2, has a value substantially equal or similar to that of the brightness of the second area A2.

Therefore, it is possible to solve or alleviate the problem in which the boundary between the first area A1 and the second area A2 is visually recognized.

Meanwhile, the configuration has been described above in which in the first mode, the display device 100 controls the brightness of the second lens area LSA2 of each of the plurality of first pixels PX1 disposed in the first area A1 and controls the brightness of the plurality of first pixels PX1 disposed in the entire first area A1. However, the embodiment of the present specification is not limited thereto.

Therefore, hereinafter, various embodiments of the present specification will be more specifically described in which the display device 100 controls the brightness of the first area A1 in the first mode.

Figure 14:
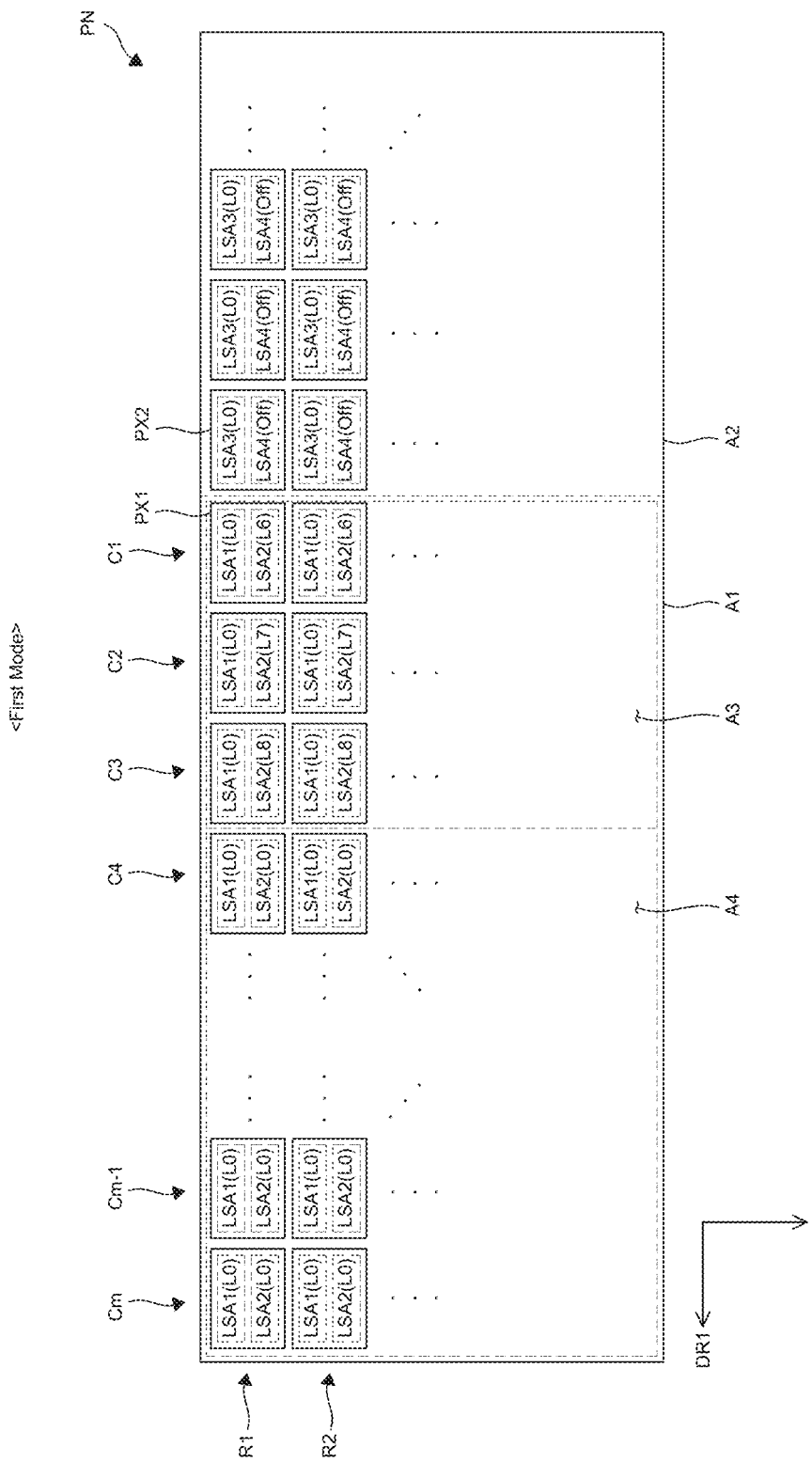
FIG. 14 is a view for explaining another example in which the display device according to the example embodiment of the present specification operates in the first mode.

FIG. 14 is a view for explaining another example in which the display device according to the embodiment of the present specification operates in the first mode.

FIG. 14 illustrates an embodiment in which the display device 100 controls brightness of a partial area, e.g., a third area A3 of the first area A1 in the first mode.

Meanwhile, FIG. 14 illustrates an example of the display panel PN in case that the display device 100 according to the embodiment of the present specification operates in the first mode.

With reference to FIG. 14, in the first mode, the display device 100 may control the brightness of the display panel PN, e.g., the first area A1 so that the brightness of a partial area, e.g., the third area A3 of the first area A1 increases as the distance from the boundary between the first area A1 and the second area A2 increases. For example, in the first mode, the display device 100 may perform control so that the brightness of the second lens area LSA2 of each of the plurality of first pixels PX1 disposed in the third area A3 increases as the distance from the boundary between the first area A1 and the second area A2 increases in the third area A3 of the first area A1 adjacent to the second area A2.

In addition, the display device 100 may perform control so that the brightness of the area of the third area A3, which is adjacent to the boundary between the first area A1 and the second area A2, has a value substantially equal or similar to that of the brightness of the second area A2.

Therefore, in the first mode, the brightness of the first pixel PX1, which is disposed in the third area A3 of the first area A1 adjacent to the second area A2, may have a value substantially equal to that of the brightness of the second area A2 at a portion closest to the second area A2 and increase as the distance from the boundary between the first area A1 and the second area A2 increases.

For example, the second lens area LSA2 of each of the plurality of first pixels PX1, which is provided in the third area A3 and disposed in the first column C1 closest to the boundary between the first area A1 and the second area A2, may emit light with sixth brightness L6 lower than the reference brightness L0.

In addition, the second lens area LSA2 of each of the plurality of first pixels PX1, which is provided in the third area A3 and disposed in the second column C2 adjacent to the first column C1 in the first direction DR1, may emit light with seventh brightness L7 higher than the sixth brightness L6. In this case, the seventh brightness L7 may be lower than the reference brightness L0.

Similarly, the second lens area LSA2 of each of the plurality of first pixels PX1, which is provided in the third area A3 and disposed in the third column C3 adjacent to the second column C2 in the first direction DR1, may emit light with eighth brightness L8 higher than the seventh brightness L7. In this case, the eighth brightness L8 may be lower than the reference brightness L0.

In addition, the second lens area LSA2 of each of the plurality of first pixels PX1, which is disposed in the remaining area of the first area A1, which excludes the third area A3, e.g., a fourth area A4, may emit light with the reference brightness L0. For example, the display device 100 may perform control so that the brightness of the second lens area LSA2 of each of the plurality of first pixels PX1, which is disposed in the remaining area, which excludes the third area A3, e.g., the fourth area A4 among the plurality of first pixels PX1 disposed in the first area A1, corresponds to the input image data IDATA.

As described above, in the first mode, the display device 100 may perform control so that the brightness of the second lens area LSA2 of each of the plurality of first pixels PX1, which is disposed in the third area A3 of the first area A1 adjacent to the second area A2, increases in the first direction DR1, e.g., increases as the distance from the boundary between the first area A1 and the second area A2 increases. For example, the display device 100 may perform control so that the brightness of the second lens area LSA2 of each of the plurality of first pixels PX1 disposed in the third area A3 increases from the first column C1 to the third column C3. Therefore, it is possible to minimize or alleviate the problem in which the boundary between the first area A1 and the second area A2 is visually recognized when images are displayed in the first mode.

Substantially identically or similarly to the configuration described with reference to FIG. 12, the sixth brightness L6 of the second lens area LSA2 of each of the plurality of first pixels PX1, which is provided in the third area A3 and disposed in the first column C1 closest to the boundary between the first area A1 and the second area A2 may be the brightness substantially corresponding to a black image. For example, the sixth brightness L6 may have a value of 0. Therefore, it is possible to more effectively solve or alleviate the problem in which the boundary between the first area A1 and the second area A2 is visually recognized when images are displayed in the first mode. However, the embodiment of the present specification is not limited thereto. The second lens area LSA2 of each of the plurality of first pixels PX1, which is provided in the third area A3 and disposed in the first column C1 closest to the boundary between the first area A1 and the second area A2, may not emit light.

In addition, substantially identically or similarly to the configuration described with reference to FIG. 12, in the first mode, the display device 100 may perform control so that the brightness of the second lens area LSA2 of each of the plurality of first pixels PX1 disposed in the third area A3 linearly increases in the first direction DR1, e.g., increases as the distance from the boundary between the first area A1 and the second area A2 increases. Therefore, it is possible to minimize or alleviate a problem in which the change in brightness of the third area A3, e.g., the change in brightness in the first direction DR1 is visually recognized by the user.

Meanwhile, the configuration in FIG. 14 has been described in which the third area A3 of the first area A1 adjacent to the second area A2 includes the first to third columns C1, C2, and C3, for example, the three pixel columns. However, this configuration is provided for illustrative purposes only, and the embodiment of the present specification is not limited thereto. For example, the third area A3 may be designed to include two or fewer pixel columns or designed to include four or more pixel columns.

Figure 15:
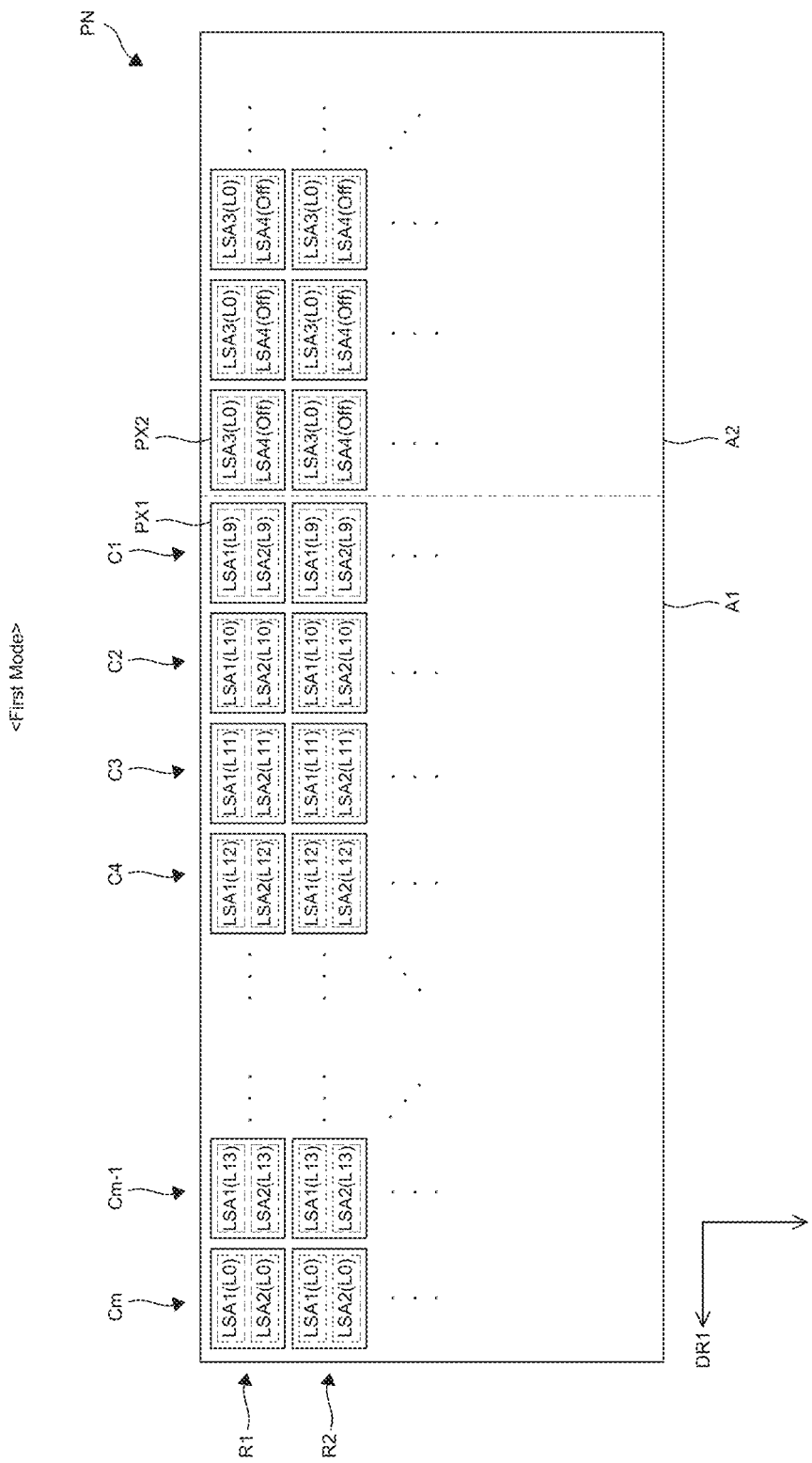
FIG. 15 is a view for explaining another example in which the display device according to the example embodiment of the present specification operates in the first mode.

FIG. 15 is a view for explaining another example in which the display device according to the embodiment of the present specification operates in the first mode.

FIG. 15 illustrates an embodiment in which the display device 100 controls the brightness of the first lens area LSA1 and the second lens area LSA2 of the first pixel PX1 disposed in the first area A1 in the first mode.

Meanwhile, FIG. 15 illustrates an example of the display panel PN in case that the display device 100 according to the embodiment of the present specification operates in the first mode.

With reference to FIG. 15, in the first mode, the display device 100 may control the brightness of the display panel PN, e.g., the first area A1 so that the brightness of the first area A1 increases as the distance from the boundary between the first area A1 and the second area A2 increases. For example, in the first mode, the display device 100 may perform control so that the brightness of the first lens area LSA1 and the second lens area LSA2 of each of the plurality of first pixels PX1 disposed in the first area A1 increases as the distance from the boundary between the first area A1 and the second area A2 increases.

In addition, the display device 100 may perform control so that the brightness of the area of the first area A1, which is adjacent to the boundary between the first area A1 and the second area A2, has a value substantially equal or similar to that of the brightness of the second area A2.

Therefore, in the first mode, the brightness of the first pixel PX1 disposed in the first area A1 may have a value substantially equal to that of the brightness of the second area A2 at a portion closest to the second area A2 and increase as the distance from the boundary between the first area A1 and the second area A2 increases.

For example, the first lens area LSA1 and the second lens area LSA2 of each of the plurality of first pixels PX1, which is provided in the first area A1 and disposed in the first column C1 closest to the boundary between the first area A1 and the second area A2, may emit light with ninth brightness L9 lower than the reference brightness L0.

In addition, the first lens area LSA1 and the second lens area LSA2 of each of the plurality of first pixels PX1, which is provided in the first area A1 and disposed in the second column C2 adjacent to the first column C1 in the first direction DR1, may emit light with tenth brightness L10 higher than the ninth brightness L9. In this case, the tenth brightness L10 may be lower than the reference brightness L0.

Similarly, the first lens area LSA1 and the second lens area LSA2 of each of the plurality of first pixels PX1, which is provided in the first area A1 and disposed in the third column C3 adjacent to the second column C2 in the first direction DR1, may emit light with eleventh brightness L11 higher than the tenth brightness L10. In this case, the eleventh brightness L11 may be lower than the reference brightness L0.

Similarly, the first lens area LSA1 and the second lens area LSA2 of each of the plurality of first pixels PX1, which is provided in the first area A1 and disposed in the fourth column C4 adjacent to the third column C3 in the first direction DR1, may emit light with twelfth brightness L12 higher than the eleventh brightness L11. In this case, the twelfth brightness L12 may be lower than the reference brightness L0.

Similarly, the first lens area LSA1 and the second lens area LSA2 of each of the plurality of first pixels PX1, which is provided in the first area A1 and disposed in the (m−1)th column Cm-1 adjacent to the m-th column Cm, which is farthest from the boundary between the first area A1 and the second area A2, in the direction opposite to the first direction DR1, may emit light with thirteenth brightness L13 higher than the twelfth brightness L12. In this case, the thirteenth brightness L13 may be lower than the reference brightness L0.

In addition, the first lens area LSA1 and the second lens area LSA2 of each of the plurality of first pixels PX1, which is provided in the first area A1 and disposed in the m-th column Cm farthest from the boundary between the first area A1 and the second area A2, may emit light with the reference brightness L0. For example, the display device 100 may perform control so that the brightness of the first lens area LSA1 and the second lens area LSA2 of each of the plurality of first pixels PX1, which is disposed in the pixel column (e.g., the m-th column Cm) farthest from the boundary between the first area A1 and the second area A2 among the plurality of first pixels PX1 disposed in the first area A1, corresponds to the input image data IDATA.

As described above, in the first mode, the display device 100 may perform control so that the brightness of the first lens area LSA1 and the second lens area LSA2 of each of the plurality of first pixels PX1 disposed in the first area A1 increases in the first direction DR1, e.g., increases as the distance from the boundary between the first area A1 and the second area A2 increases. For example, the display device 100 may perform control so that the brightness of the first lens area LSA1 and the second lens area LSA2 of each of the plurality of first pixels PX1 disposed in the first area A1 increases from the first column C1 to the m-th column Cm. Therefore, it is possible to minimize or alleviate the problem in which the boundary between the first area A1 and the second area A2 is visually recognized when images are displayed in the first mode.

The brightness of the first lens area LSA1 and the second lens area LSA2 of each of the plurality of first pixels PX1, which is provided in the first area A1 and disposed in the first column C1 closest to the boundary between the first area A1 and the second area A2, may be the brightness corresponding to half the reference brightness L0. In this case, the brightness of each of the plurality of first pixels PX1, which is provided in the first area A1 and disposed in the first column C1 closest to the boundary between the first area A1 and the second area A2, may correspond to a value made by adding up a value corresponding to half the reference brightness L0, e.g., the ninth brightness L9 of the first lens area LSA1 and a value corresponding to half the reference brightness L0, e.g., the ninth brightness L9 of the second lens area LSA2, such that the brightness of each of the plurality of first pixels PX1 disposed in the first column C1 may have a value substantially equal or similar to that of the reference brightness L0.

Therefore, the brightness of each of the plurality of first pixels PX1, which is provided in the first area A1 and disposed in the first column C1 closest to the boundary between the first area A1 and the second area A2, may have a value substantially equal or similar to that of the brightness, e.g., the reference brightness L0 of each of the plurality of second pixels PX2 disposed in the second area A2. Therefore, it is possible to more effectively solve or alleviate the problem in which the boundary between the first area A1 and the second area A2 is visually recognized when images are displayed in the first mode.

In addition, substantially identically or similarly to the configuration described with reference to FIG. 12, in the first mode, the display device 100 may perform control so that the brightness of the first lens area LSA1 and the second lens area LSA2 of each of the plurality of first pixels PX1 disposed in the first area A1 linearly increases in the first direction DR1, e.g., increases as the distance from the boundary between the first area A1 and the second area A2 increases. Therefore, it is possible to minimize or alleviate a problem in which the change in brightness of the first area A1, e.g., the change in brightness in the first direction DR1 is visually recognized by the user.

Figure 16:
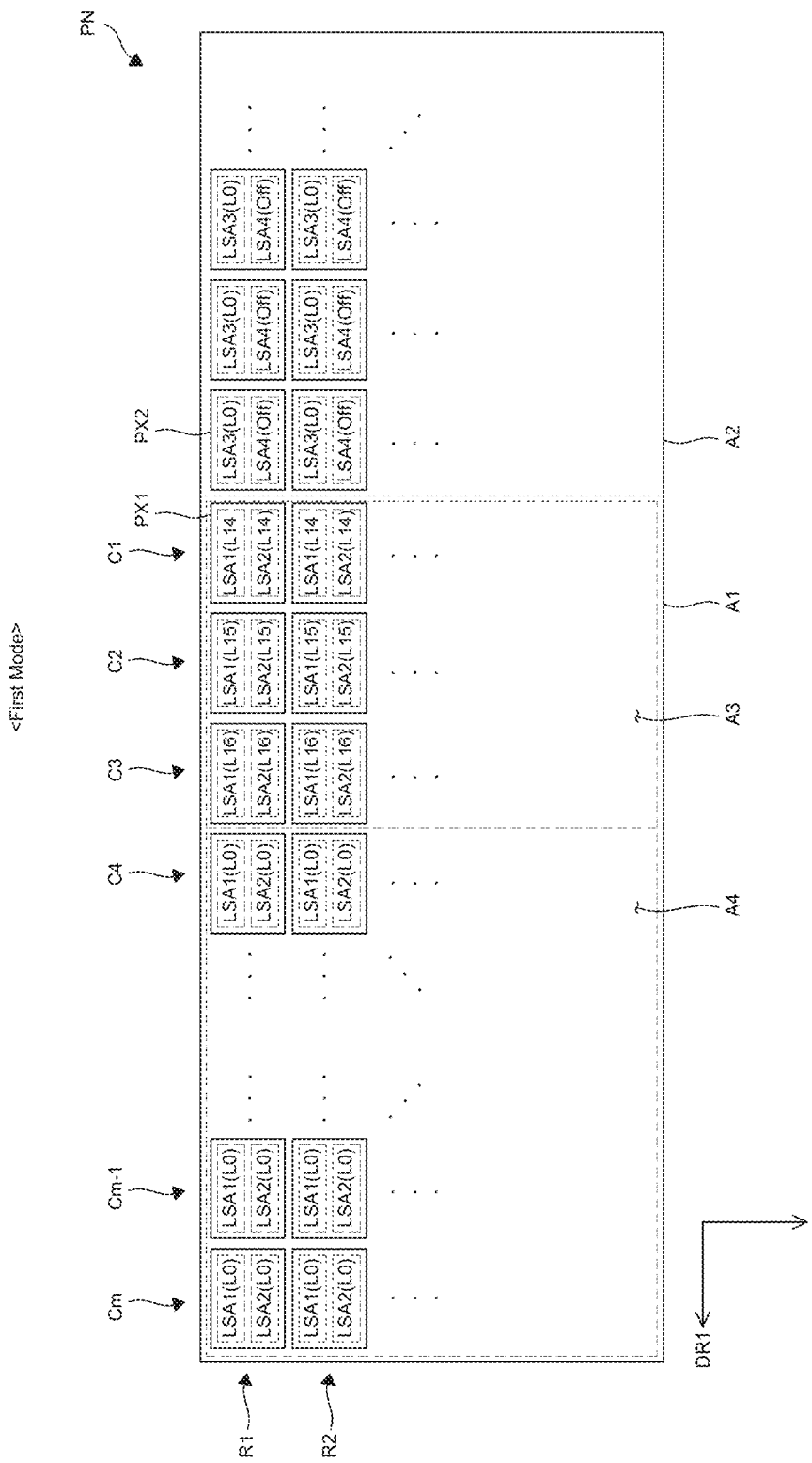
FIG. 16 is a view for explaining another example in which the display device according to the example embodiment of the present specification operates in the first mode.

FIG. 16 is a view for explaining another example in which the display device according to the embodiment of the present specification operates in the first mode.

FIG. 16 illustrates an embodiment in which the display device 100 controls the brightness of the first lens area LSA1 and the second lens area LSA2 of the first pixel PX1 disposed in a partial area of the first area A1, e.g., the third area A3 in the first mode.

Meanwhile, FIG. 16 illustrates an example of the display panel PN in case that the display device 100 according to the embodiment of the present specification operates in the first mode.

With reference to FIG. 16, in the first mode, the display device 100 may control the brightness of the display panel PN, e.g., the first area A1 so that the brightness of a partial area, e.g., the third area A3 of the first area A1 increases as the distance from the boundary between the first area A1 and the second area A2 increases. For example, in the first mode, the display device 100 may perform control so that the brightness of the first lens area LSA1 and the second lens area LSA2 of each of the plurality of first pixels PX1 disposed in the third area A3 increases as the distance from the boundary between the first area A1 and the second area A2 increases in the third area A3 of the first area A1 adjacent to the second area A2.

In addition, the display device 100 may perform control so that the brightness of the area of the third area A3, which is adjacent to the boundary between the first area A1 and the second area A2, has a value substantially equal or similar to that of the brightness of the second area A2.

Therefore, in the first mode, the brightness of the first pixel PX1, which is disposed in the third area A3 of the first area A1 adjacent to the second area A2, may have a value substantially equal to that of the brightness of the second area A2 at a portion closest to the second area A2 and increase as the distance from the boundary between the first area A1 and the second area A2 increases.

For example, the first lens area LSA1 and the second lens area LSA2 of each of the plurality of first pixels PX1, which is provided in the third area A3 and disposed in the first column C1 closest to the boundary between the first area A1 and the second area A2, may emit light with fourteenth brightness L14 lower than the reference brightness L0.

In addition, the first lens area LSA1 and the second lens area LSA2 of each of the plurality of first pixels PX1, which is provided in the third area A3 and disposed in the second column C2 adjacent to the first column C1 in the first direction DR1, may emit light with fifteenth brightness L15 higher than the fourteenth brightness L14. In this case, the fifteenth brightness L15 may be lower than the reference brightness L0.

Similarly, the first lens area LSA1 and the second lens area LSA2 of each of the plurality of first pixels PX1, which is provided in the third area A3 and disposed in the third column C3 adjacent to the second column C2 in the first direction DR1, may emit light with sixteenth brightness L16 higher than the fifteenth brightness L15. In this case, the sixteenth brightness L16 may be lower than the reference brightness L0.

In addition, the second lens area LSA2 of each of the plurality of first pixels PX1, which is disposed in the remaining area of the first area A1, which excludes the third area A3 may emit light with the reference brightness L0. For example, the display device 100 may perform control so that the brightness of the first lens area LSA1 and the second lens area LSA2 of each of the plurality of first pixels PX1, which is disposed in the remaining area, which excludes the third area A3, e.g., the fourth area A4 among the plurality of first pixels PX1 disposed in the first area A1, corresponds to the input image data IDATA.

As described above, in the first mode, the display device 100 may perform control so that the brightness of the first lens area LSA1 and the second lens area LSA2 of each of the plurality of first pixels PX1, which is disposed in the third area A3 of the first area A1 adjacent to the second area A2, increases in the first direction DR1, e.g., increases as the distance from the boundary between the first area A1 and the second area A2 increases. For example, the display device 100 may perform control so that the brightness of the first lens area LSA1 and the second lens area LSA2 of each of the plurality of first pixels PX1 disposed in the third area A3 increases from the first column C1 to the third column C3. Therefore, it is possible to minimize or alleviate the problem in which the boundary between the first area A1 and the second area A2 is visually recognized when images are displayed in the first mode.

Substantially identically or similarly to the configuration described with reference to FIG. 15, the fourteenth brightness L14 of the first lens area LSA1 and the second lens area LSA2 of each of the plurality of first pixels PX1, which is provided in the third area A3 and disposed in the first column C1 closest to the boundary between the first area A1 and the second area A2, may be the brightness substantially corresponding to half the reference brightness L0. Therefore, it is possible to more effectively solve or alleviate the problem in which the boundary between the first area A1 and the second area A2 is visually recognized when images are displayed in the first mode.

In addition, substantially identically or similarly to the configuration described with reference to FIG. 12, in the first mode, the display device 100 may perform control so that the brightness of the first lens area LSA1 and the second lens area LSA2 of each of the plurality of first pixels PX1 disposed in the third area A3 linearly increases in the first direction DR1, e.g., increases as the distance from the boundary between the first area A1 and the second area A2 increases. Therefore, it is possible to minimize or alleviate a problem in which the change in brightness of the third area A3, e.g., the change in brightness in the first direction DR1 is visually recognized by the user.

Meanwhile, the configuration in FIG. 16 has been described in which the third area A3 of the first area A1 adjacent to the second area A2 includes the first to third columns C1, C2, and C3, for example, the three pixel columns. However, this configuration is provided for illustrative purposes only, and the embodiment of the present specification is not limited thereto. For example, the third area A3 may be designed to include two or fewer pixel columns or designed to include four or more pixel columns.

Figure 17:
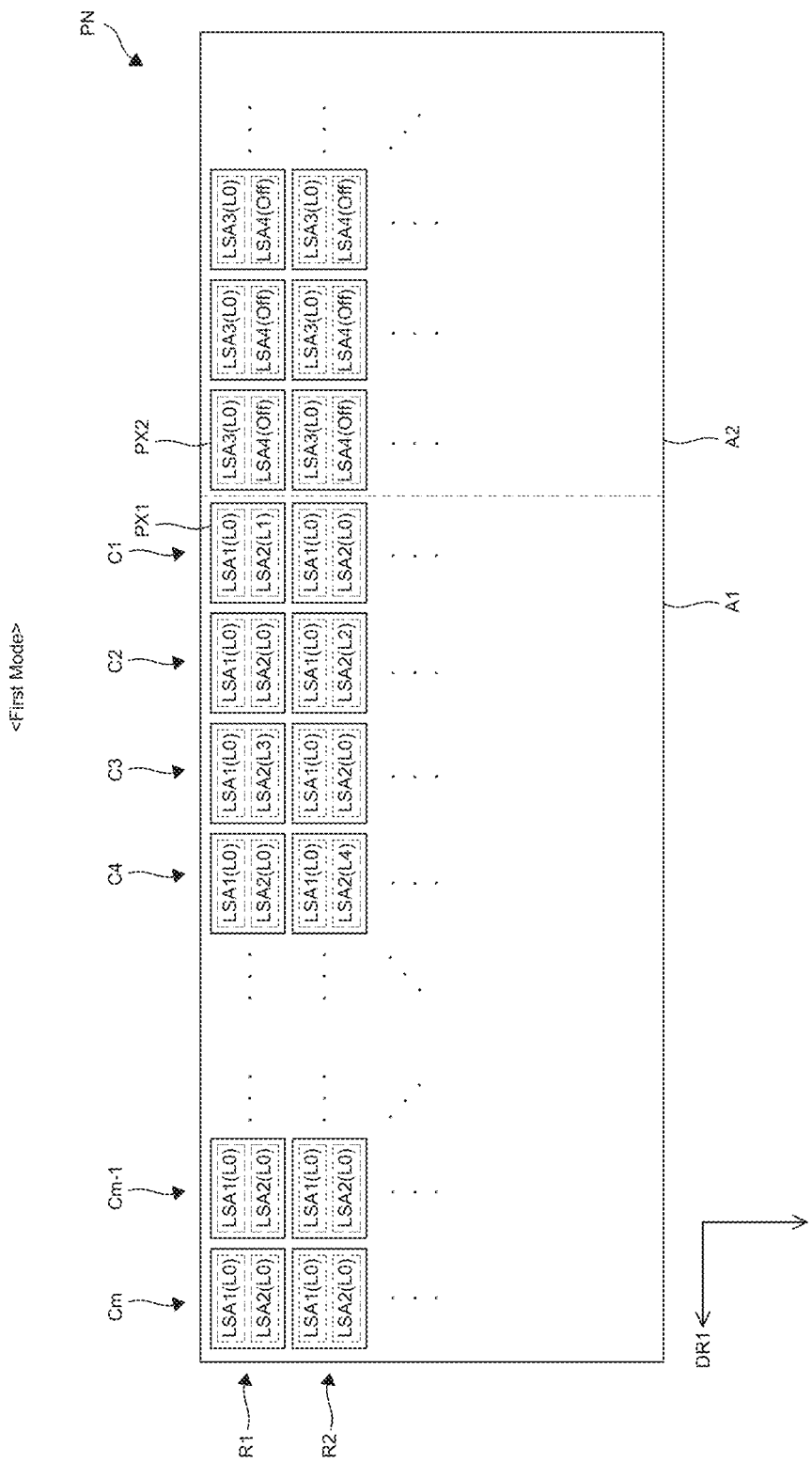
FIG. 17 is a view for explaining another example in which the display device according to the example embodiment of the present specification operates in the first mode.

FIG. 17 is a view for explaining another example in which the display device according to the embodiment of the present specification operates in the first mode.

FIG. 17 illustrates an embodiment in which the display device 100 alternately controls, on a row-by-row basis of the pixels, the brightness of the second lens area LSA2 of the first pixel PX1 disposed in the first area A1 in the first mode.

Meanwhile, FIG. 17 illustrates an example of the display panel PN in case that the display device 100 according to the embodiment of the present specification operates in the first mode.

With reference to FIG. 17, in the first mode, the display device 100 may control the brightness of the display panel PN so that the brightness of the first area A1 increases as the distance from the boundary between the first area A1 and the second area A2 increases.

In the first mode, the display device 100 may perform control so that the brightness of the second lens area LSA2 of each of the plurality of first pixels PX1 increases, on a row-by-row basis of the pixels, as the distance from the boundary between the first area A1 and the second area A2 increases.

For example, in the first mode, the display device 100 may perform control so that the brightness of the second lens area LSA2 of the plurality of first pixels PX1, which is disposed in the odd-numbered row, e.g., a first row R1 among the plurality of first pixels PX1 disposed in the odd-numbered columns, e.g., the first column C1 and the third column C3, increases as the distance from the boundary between the first area A1 and the second area A2 increases.

In addition, in the first mode, the display device 100 may perform control so that the brightness of the second lens area LSA2 of the plurality of first pixels PX1, which is disposed in the even-numbered row, e.g., a second row R2 among the plurality of first pixels PX1 disposed in the even-numbered columns, e.g., the second column C2 and the fourth column C4, increases as the distance from the boundary between the first area A1 and the second area A2 increases.

More specifically, as illustrated in FIG. 17, the second lens area LSA2 of the first pixel PX1, which is provided in the first area A1 and disposed in the odd-numbered row, e.g., the first row R1 among the plurality of first pixels PX1 disposed in the first column C1 closest to the boundary between the first area A1 and the second area A2, may emit light with the first brightness L1 lower than the reference brightness L0.

Meanwhile, the second lens area LSA2 of the first pixel PX1, which is disposed in the even-numbered row, e.g., the second row R2 among the plurality of first pixels PX1 disposed in the first column C1, may emit light with the reference brightness L0.

In addition, the second lens area LSA2 of the first pixel PX1, which is provided in the first area A1 and disposed in the even-numbered row, e.g., the second row R2 among the plurality of first pixels PX1 disposed in the second column C2 adjacent to the first column C1 in the first direction DR1, may emit light with the second brightness L2 higher than the first brightness L1. In this case, the second brightness L2 may be lower than the reference brightness L0.

Meanwhile, the second lens area LSA2 of the first pixel PX1, which is disposed in the odd-numbered row, e.g., the first row R1 among the plurality of first pixels PX1 disposed in the second column C2, may emit light with the reference brightness L0.

Similarly, the second lens area LSA2 of the first pixel PX1, which is provided in the first area A1 and disposed in the odd-numbered row, e.g., the first row R1 among the plurality of first pixels PX1 disposed in the third column C3 adjacent to the second column C2 in the first direction DR1, may emit light with the third brightness L3 higher than the second brightness L2. In this case, the third brightness L3 may be lower than the reference brightness L0.

Meanwhile, the second lens area LSA2 of the first pixel PX1, which is disposed in the even-numbered row, e.g., the second row R2 among the plurality of first pixels PX1 disposed in the third column C3, may emit light with the reference brightness L0.

Similarly, the second lens area LSA2 of the first pixel PX1, which is provided in the first area A1 and disposed in the even-numbered row, e.g., the second row R2 among the plurality of first pixels PX1 disposed in the fourth column C4 adjacent to the third column C3 in the first direction DR1, may emit light with the fourth brightness L4 higher than the third brightness L3. In this case, the fourth brightness L4 may be lower than the reference brightness L0.

Meanwhile, the second lens area LSA2 of the first pixel PX1, which is disposed in the odd-numbered row, e.g., the first row R1 among the plurality of first pixels PX1 disposed in the fourth column C4, may emit light with the reference brightness L0.

Similarly, the second lens area LSA2 of the first pixel PX1, which is provided in the first area A1 and disposed in the even-numbered row, e.g., the second row R2 among the plurality of first pixels PX1 disposed in the (m−1)th column Cm-1 adjacent to the m-th column Cm, which is farthest from the boundary between the first area A1 and the second area A2, in the direction opposite to the first direction DR1, may emit light with the fifth brightness L5 higher than the fourth brightness L4. In this case, the fifth brightness L5 may be lower than the reference brightness L0.

Meanwhile, the second lens area LSA2 of the first pixel PX1, which is disposed in the odd-numbered row, e.g., the first row R1 among the plurality of first pixels PX1 disposed in the (m−1)th column Cm-1, may emit light with the reference brightness L0.

In addition, the second lens area LSA2 of each of the plurality of first pixels PX1, which is provided in the first area A1 and disposed in the m-th column Cm farthest from the boundary between the first area A1 and the second area A2, may emit light with the reference brightness L0. For example, the display device 100 may perform control so that the brightness of the first lens area LSA1 and the second lens area LSA2 of each of the plurality of first pixels PX1, which is disposed in the pixel column (the m-th column Cm) farthest from the boundary between the first area A1 and the second area A2 among the plurality of first pixels PX1 disposed in the first area A1, corresponds to the input image data IDATA.

As described above, in the first mode, the display device 100 may perform control so that the brightness of the second lens area LSA2 of each of the plurality of first pixels PX1 disposed in the first area A1 increases in the first direction DR1, e.g., increases, on a row-by-row basis of the pixels, as the distance from the boundary between the first area A1 and the second area A2 increases. For example, the display device 100 may perform control so that the brightness of the second lens area LSA2 of the plurality of first pixels PX1, which is disposed in the odd-numbered row, e.g., the first row R1 among the plurality of first pixels PX1 disposed in the odd-numbered columns, e.g., the first column C1 and the third column C3, increases from the first column C1 to the m-th column Cm, and the brightness of the second lens area LSA2 of the plurality of first pixels PX1, which is disposed in the even-numbered row, e.g., the second row R2 among the plurality of first pixels PX1 disposed in the even-numbered columns, e.g., the second column C2 and the fourth column C4, increases from the first column C1 to the m-th column Cm. For example, in the first mode, the display device 100 may perform control so that the brightness of the second lens area LSA2 of each of the plurality of first pixels PX1 disposed in the first area A1 in a zigzag shape increases in the first direction DR1 from the boundary between the first area A1 and the second area A2.

Therefore, it is possible to minimize or alleviate the problem in which the boundary between the first area A1 and the second area A2 is visually recognized when images are displayed in the first mode.

Substantially identically or similarly to the configuration described with reference to FIG. 12, the first brightness L1 of the second lens area LSA2 of each of the plurality of first pixels PX1, which is provided in the first area A1 and disposed in the odd-numbered row in the first column C1 closest to the boundary between the first area A1 and the second area A2, may be the brightness substantially corresponding to a black image, e.g., have a value of 0. Therefore, it is possible to more effectively solve or alleviate the problem in which the boundary between the first area A1 and the second area A2 is visually recognized when images are displayed in the first mode. However, the embodiment of the present specification is not limited thereto. The second lens area LSA2 of each of the plurality of first pixels PX1, which is provided in the first area A1 and disposed in the odd-numbered row in the first column C1 closest to the boundary between the first area A1 and the second area A2, may not emit light.

In addition, substantially identically or similarly to the configuration described with reference to FIG. 12, in the first mode, the display device 100 may perform control so that the brightness of the second lens area LSA2 of each of the plurality of first pixels PX1 disposed in the first area A1 linearly increases in the first direction DR1, e.g., increases as the distance from the boundary between the first area A1 and the second area A2 increases. Therefore, it is possible to minimize or alleviate a problem in which the change in brightness of the first area A1, e.g., the change in brightness in the first direction DR1 is visually recognized by the user.

Meanwhile, the configuration in FIG. 17 has been described in which in the first mode, the display device 100 performs control so that the brightness of the second lens area LSA2 of the plurality of first pixels PX1, which is disposed in the odd-numbered row among the plurality of first pixels PX1 disposed in the odd-numbered column, increases, and the brightness of the second lens area LSA2 of the plurality of first pixels PX1, which is disposed in the even-numbered row among the plurality of first pixels PX1 disposed in the even-numbered column, increases as the distance from the boundary between the first area A1 and the second area A2 increases. However, the present disclosure is not limited thereto. For example, in the first mode, the display device 100 may perform control so that the brightness of the second lens area LSA2 of the plurality of first pixels PX1, which is disposed in the even-numbered row among the plurality of first pixels PX1 disposed in the odd-numbered column, increases, and the brightness of the second lens area LSA2 of the plurality of first pixels PX1, which is disposed in the odd-numbered row among the plurality of first pixels PX1 disposed in the even-numbered column, increases as the distance from the boundary between the first area A1 and the second area A2 increases.

Figure 18:
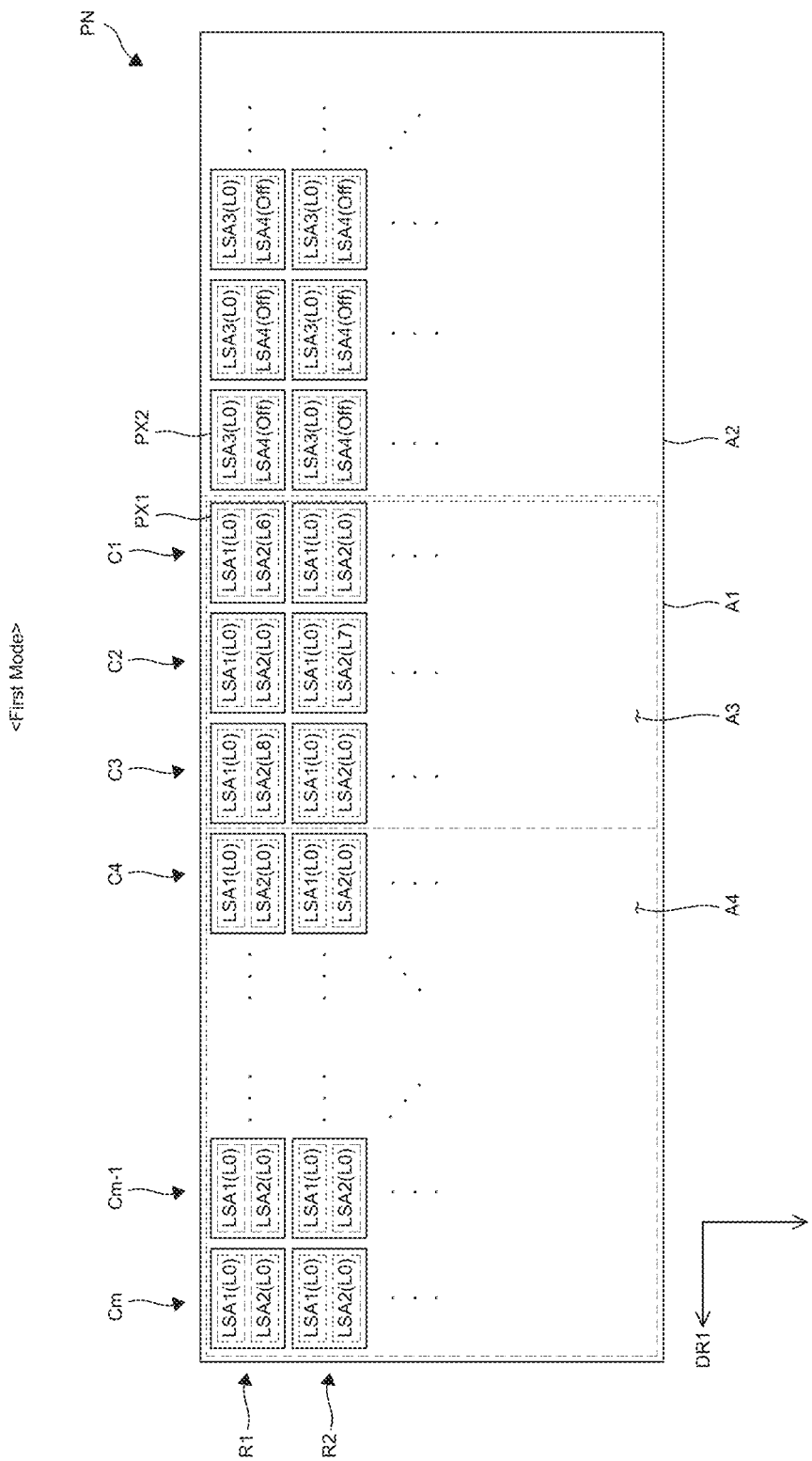
FIG. 18 is a view for explaining another example in which the display device according to the example embodiment of the present specification operates in the first mode.

FIG. 18 is a view for explaining another example in which the display device according to the embodiment of the present specification operates in the first mode.

FIG. 18 is an embodiment in which the display device 100 alternately controls, on a row-by-row basis of the pixels, the brightness of the second lens area LSA2 of the first pixel PX1 disposed in a partial area of the first area A1, e.g., the third area A3 in the first mode.

Meanwhile, FIG. 18 illustrates an example of the display panel PN in case that the display device 100 according to the embodiment of the present specification operates in the first mode.

With reference to FIG. 18, in the first mode, the display device 100 may control the brightness of the first area A1 of the display panel PN so that the brightness of a partial area, e.g., the third area A3 of the first area A1 increases as the distance from the boundary between the first area A1 and the second area A2 increases.

In the first mode, the display device 100, e.g., the brightness controller LD may perform control so that the brightness of the second lens area LSA2 of each of the plurality of first pixels PX1 disposed in the third area A3 increases, on a row-by-row basis of the pixels, as the distance from the boundary between the first area A1 and the second area A2 increases.

For example, in the first mode, the display device 100, e.g., the brightness controller LD may perform control so that the brightness of the second lens area LSA2 of the plurality of first pixels PX1, which is provided in the third area A3 and disposed in the odd-numbered row, e.g., a first row R1 among the plurality of first pixels PX1 disposed in the odd-numbered columns, e.g., the first column C1 and the third column C3, increases as the distance from the boundary between the first area A1 and the second area A2 increases.

In addition, in the first mode, the display device 100 may perform control so that the brightness of the second lens area LSA2 of the plurality of first pixels PX1, which is provided in the third area A3 and disposed in the even-numbered row, e.g., the second row R2 among the plurality of first pixels PX1 disposed in the even-numbered column, e.g., the second column C2, increases as the distance from the boundary between the first area A1 and the second area A2 increases.

More specifically, as illustrated in FIG. 18, the second lens area LSA2 of the first pixel PX1, which is provided in the first area A1 and disposed in the odd-numbered row, e.g., the first row R1 among the plurality of first pixels PX1 disposed in the first column C1 closest to the boundary between the first area A1 and the second area A2, may emit light with the sixth brightness L6 lower than the reference brightness L0.

Meanwhile, the second lens area LSA2 of the first pixel PX1, which is disposed in the even-numbered row, e.g., the second row R2 among the plurality of first pixels PX1 disposed in the first column C1, may emit light with the reference brightness L0.

In addition, the second lens area LSA2 of the first pixel PX1, which is provided in the first area A1 and disposed in the even-numbered row, e.g., the second row R2 among the plurality of first pixels PX1 disposed in the second column C2 adjacent to the first column C1 in the first direction DR1, may emit light with the seventh brightness L7 higher than the sixth brightness L6. In this case, the seventh brightness L7 may be lower than the reference brightness L0.

Meanwhile, the second lens area LSA2 of the first pixel PX1, which is disposed in the odd-numbered row, e.g., the first row R1 among the plurality of first pixels PX1 disposed in the second column C2, may emit light with the reference brightness L0.

Similarly, the second lens area LSA2 of the first pixel PX1, which is provided in the first area A1 and disposed in the odd-numbered row, e.g., the first row R1 among the plurality of first pixels PX1 disposed in the third column C3 adjacent to the second column C2 in the first direction DR1, may emit light with the eighth brightness L8 higher than the seventh brightness L7. In this case, the eighth brightness L8 may be lower than the reference brightness L0.

In addition, the second lens area LSA2 of each of the plurality of first pixels PX1, which is disposed in the remaining area of the first area A1, which excludes the third area A3 may emit light with the reference brightness L0. For example, the display device 100 may perform control so that the brightness of the second lens area LSA2 of each of the plurality of first pixels PX1, which is disposed in the remaining area, which excludes the third area A3, e.g., the fourth area A4 among the plurality of first pixels PX1 disposed in the first area A1, corresponds to the input image data IDATA.

As described above, in the first mode, the display device 100 may perform control so that the brightness of the second lens area LSA2 of each of the plurality of first pixels PX1 disposed in the third area A3 increases in the first direction DR1, e.g., increases, on a row-by-row basis of the pixels, as the distance from the boundary between the first area A1 and the second area A2 increases. Therefore, it is possible to minimize or alleviate the problem in which the boundary between the first area A1 and the second area A2 is visually recognized when images are displayed in the first mode.

Substantially identically or similarly to the configuration described with reference to FIG. 12, the sixth brightness L6 of the second lens area LSA2 of each of the plurality of first pixels PX1, which is provided in the first area A1 and disposed in the odd-numbered row, e.g., the first row R1 in the first column C1 closest to the boundary between the first area A1 and the second area A2, may be the brightness substantially corresponding to a black image, e.g., have a value of 0. Therefore, it is possible to more effectively solve or alleviate the problem in which the boundary between the first area A1 and the second area A2 is visually recognized when images are displayed in the first mode. However, the embodiment of the present specification is not limited thereto. The second lens area LSA2 of each of the plurality of first pixels PX1, which is provided in the first area A1 and disposed in the odd-numbered row, e.g., the first row R1 in the first column C1 closest to the boundary between the first area A1 and the second area A2, may not emit light.

In addition, substantially identically or similarly to the configuration described with reference to FIG. 12, in the first mode, the display device 100 may perform control so that the brightness of the second lens area LSA2 of each of the plurality of first pixels PX1 disposed in the first area A1 linearly increases in the first direction DR1, e.g., increases as the distance from the boundary between the first area A1 and the second area A2 increases. Therefore, it is possible to minimize or alleviate a problem in which the change in brightness of the first area A1, e.g., the change in brightness in the first direction DR1 is visually recognized by the user.

Meanwhile, the configuration in FIG. 18 has been described in which in the first mode, the display device 100 performs control so that the brightness of the second lens area LSA2 of the plurality of first pixels PX1, which is provided in the third area A3 and disposed in the odd-numbered row among the plurality of first pixels PX1 disposed in the odd-numbered column, increases, and the brightness of the second lens area LSA2 of the plurality of first pixels PX1, which is provided in the third area A3 and disposed in the even-numbered row among the plurality of first pixels PX1 disposed in the even-numbered column, increases as the distance from the boundary between the first area A1 and the second area A2 increases. However, the present disclosure is not limited thereto. For example, in the first mode, the display device 100 may perform control so that the brightness of the second lens area LSA2 of the plurality of first pixels PX1, which is provided in the third area A3 and disposed in the even-numbered row among the plurality of first pixels PX1 disposed in the odd-numbered column, increases, and the brightness of the second lens area LSA2 of the plurality of first pixels PX1, which is provided in the third area A3 and disposed in the odd-numbered row among the plurality of first pixels PX1 disposed in the even-numbered column, increases as the distance from the boundary between the first area A1 and the second area A2 increases.

Meanwhile, the configuration in FIG. 18 has been described in which the third area A3 of the first area A1 adjacent to the second area A2 includes the first to third columns C1, C2, and C3, for example, the three pixel columns. However, this configuration is provided for illustrative purposes only, and the embodiment of the present specification is not limited thereto. For example, the third area A3 may be designed to include two or fewer pixel columns or designed to include four or more pixel columns.

A display device according to the example embodiments of the present disclosure can also be described as follows:

A display device according to an example embodiment of the present disclosure includes a display panel divided into a first area comprising a plurality of first pixels, and a second area disposed adjacent to the first area in a direction opposite to a first direction and comprising a plurality of second pixels, and a brightness controller configured to control brightness of the first area, the plurality of first pixels each comprises a first light-emitting element disposed in a first optical area, a second light-emitting element disposed in a second optical area, a first optical member disposed in the first optical area and configured to emit light, which is generated from the first light-emitting element, at a first viewing angle and a second optical member disposed in the second optical area and configured to emit light, which is generated from the second light-emitting element, at the first viewing angle, the plurality of second pixels each comprises a third light-emitting element disposed in a third optical area a fourth light-emitting element disposed in a fourth optical area, a third optical member disposed in the third optical area and configured to emit light, which is generated from the third light-emitting element, at the first viewing angle and a fourth optical member configured to emit light, which is generated from the fourth light-emitting element disposed in the fourth optical area, at a second viewing angle smaller than the first viewing angle, and the brightness controller controls brightness of the second optical area included in each of the plurality of first pixels disposed in the first area.

In a first mode, the first light-emitting element, the second light-emitting element, and the third light-emitting element may emit light, and the fourth light-emitting element may not emit light, and in a second mode different from the first mode, the first light-emitting element, the second light-emitting element, and the fourth light-emitting element may emit light, and the third light-emitting element may not emit light.

In each of the first and second modes, each of the plurality of second pixels disposed in the second area may emit light with reference brightness.

In the first mode, the brightness of the second optical area included in each of the plurality of first pixels disposed in the first area may increase in the first direction.

In the first mode, the brightness of the second optical area included in each of the plurality of first pixels disposed in the first area may be equal to or lower than the reference brightness.

In the first mode, the brightness of the second optical area included in each of the plurality of first pixels, which may be disposed in a column closest to a boundary between the first area and the second area among the plurality of first pixels disposed in the first area, corresponds to a black image.

The brightness controller may further control brightness of the first optical area included in each of the plurality of first pixels disposed in the first area, and in the first mode, the brightness of the first optical area and the brightness of the second optical area included in each of the plurality of first pixels disposed in the first area each may increase in the first direction.

In the first mode, the brightness of the first optical area and the brightness of the second optical area included in each of the plurality of first pixels disposed in the first area may be each equal to or lower than the reference brightness.

In the first mode, the brightness of the first optical area and the brightness of the second optical area included in each of the plurality of first pixels, which is disposed in a column closest to a boundary between the first area and the second area among the plurality of first pixels disposed in the first area, may correspond to half the reference brightness.

The first area may comprise a third area adjacent to the second area in the first direction and a fourth area adjacent to the third area in the first direction.

In the first mode, the brightness of the second optical area included in each of the plurality of first pixels disposed in the third area may increase in the first direction.

In the first mode, the brightness of the second optical area included in each of the plurality of first pixels disposed in the third area may be equal to or lower than the reference brightness.

The brightness controller may further control brightness of the first optical area included in each of the plurality of first pixels disposed in the first area, and in the first mode, the brightness of the first optical area and the brightness of the second optical area included in each of the plurality of first pixels disposed in the third area each may increase in the first direction.

In the first mode, the brightness of the first optical area and the brightness of the second optical area included in each of the plurality of first pixels disposed in the third area may be each equal to or lower than the reference brightness.

In the first mode, the brightness of the second optical area included in each of the plurality of first pixels disposed in the fourth area may be equal to the reference brightness.

In the first mode, the brightness controller performs control so that the brightness of the second optical area included in each of the plurality of first pixels disposed in the first area may increase in the first direction on a row-by-row basis of the pixels.

The first optical member, the second optical member, and the third optical member each may have a first shape, and the fourth optical member may have a second shape different from the first shape.

The first light-emitting element emits light with the same color as the second light-emitting element, and the third light-emitting element may emit light with the same color as the fourth light-emitting element.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a display panel having a first area comprising a plurality of first pixels, and a second area disposed adjacent to the first area and comprising a plurality of second pixels; and
a brightness controller configured to control brightness of the first area,
wherein the plurality of first pixels each comprises:
a first light-emitting element disposed in a first optical area;
a second light-emitting element disposed in a second optical area;
a first optical member disposed in the first optical area and configured to emit light, which is generated from the first light-emitting element, at a first viewing angle; and
a second optical member disposed in the second optical area and configured to emit light, which is generated from the second light-emitting element, at the first viewing angle,
wherein the plurality of second pixels each comprises:
a third light-emitting element disposed in a third optical area;
a fourth light-emitting element disposed in a fourth optical area;
a third optical member disposed in the third optical area and configured to emit light, which is generated from the third light-emitting element, at the first viewing angle; and
a fourth optical member disposed in the fourth optical area and configured to emit light, which is generated from the fourth light-emitting element, at a second viewing angle smaller than the first viewing angle, and
wherein the brightness controller controls brightness of the second optical area included in each of the plurality of first pixels disposed in the first area.

2. The display device of claim 1, wherein in a first mode, the first light-emitting element, the second light-emitting element, and the third light-emitting element emit light, and the fourth light-emitting element does not emit light, and wherein in a second mode different from the first mode, the first light-emitting element, the second light-emitting element, and the fourth light-emitting element emit light, and the third light-emitting element does not emit light.

3. The display device of claim 2, wherein the second area is disposed to be adjacent to the first area in a direction opposite to a first direction, and
wherein in each of the first and second modes, each of the plurality of second pixels disposed in the second area emits light with a reference brightness.

4. The display device of claim 3, wherein in the first mode, the brightness of the second optical area included in each of the plurality of first pixels disposed in the first area increases in the first direction.

5. The display device of claim 4, wherein in the first mode, the brightness of the second optical area included in each of the plurality of first pixels disposed in the first area increases as a distance from a boundary between the first area and the second area increases.

6. The display device of claim 4, wherein in the first mode, the brightness of the second optical area included in each of the plurality of first pixels disposed in the first area is equal to or lower than the reference brightness.

7. The display device of claim 6, wherein in the first mode, the brightness of the second optical area included in each of the plurality of first pixels, which is disposed in a column closest to a boundary between the first area and the second area among the plurality of first pixels disposed in the first area, corresponds to a black image.

8. The display device of claim 3, wherein the brightness controller further controls brightness of the first optical area included in each of the plurality of first pixels disposed in the first area, and
wherein in the first mode, the brightness of the first optical area and the brightness of the second optical area included in each of the plurality of first pixels disposed in the first area each increase in the first direction.

9. The display device of claim 8, wherein in the first mode, the brightness of the first optical area and the brightness of the second optical area included in each of the plurality of first pixels disposed in the first area are each equal to or lower than the reference brightness.

10. The display device of claim 9, wherein in the first mode, the brightness of the first optical area and the brightness of the second optical area included in each of the plurality of first pixels, which is disposed in a column closest to a boundary between the first area and the second area among the plurality of first pixels disposed in the first area, correspond to half the reference brightness.

11. The display device of claim 3, wherein the first area comprises:
a third area adjacent to the second area in the first direction; and
a fourth area adjacent to the third area in the first direction.

12. The display device of claim 11, wherein in the first mode, the brightness of the second optical area included in each of the plurality of first pixels disposed in the third area increases in the first direction.

13. The display device of claim 12, wherein in the first mode, the brightness of the second optical area included in each of the plurality of first pixels disposed in the third area is equal to or lower than the reference brightness.

14. The display device of claim 11, wherein the brightness controller further controls brightness of the first optical area included in each of the plurality of first pixels disposed in the first area, and
wherein in the first mode, the brightness of the first optical area and the brightness of the second optical area included in each of the plurality of first pixels disposed in the third area each increase in the first direction.

15. The display device of claim 14, wherein in the first mode, the brightness of the first optical area and the brightness of the second optical area included in each of the plurality of first pixels disposed in the third area are each equal to or lower than the reference brightness.

16. The display device of claim 11, wherein in the first mode, the brightness of the second optical area included in each of the plurality of first pixels disposed in the fourth area is equal to the reference brightness.

17. The display device of claim 3, wherein in the first mode, the brightness controller performs control so that the brightness of the second optical area included in each of the plurality of first pixels disposed in the first area alternately increases in the first direction on a row-by-row basis of the pixels.

18. The display device of claim 17, wherein in the first mode, the brightness controller performs control so that the brightness of the second optical area included in each of the plurality of first pixels disposed in one of an odd-numbered row and an even-numbered row among the plurality of first pixels disposed in the first area and in an odd-numbered column increases in the first direction, and the brightness of the second optical area included in each of the plurality of first pixels disposed in the other one of the odd-numbered row and the even-numbered row among the plurality of first pixels disposed in the first area and in an even-numbered column increases in the first direction.

19. The display device of claim 3, wherein in the second mode, the brightness of the second optical area included in each of the plurality of first pixels disposed in the first area is equal to the reference brightness.

20. The display device of claim 1, wherein the first optical member, the second optical member, and the third optical member each have a first shape, and
wherein the fourth optical member has a second shape different from the first shape.

21. The display device of claim 20, wherein the first shape is a circular shape, and the second shape is a bar shape extending in one direction.

22. The display device of claim 1, wherein the first light-emitting element emits light with the same color as the second light-emitting element, and
wherein the third light-emitting element emits light with the same color as the fourth light-emitting element.

23. The display device of claim 1, wherein each of the first to fourth optical members has a larger size than a light-emitting area of the corresponding first to fourth light-emitting elements.

* * * * *